US012614914B2

(12) United States Patent
Wang et al.

(10) Patent No.: US 12,614,914 B2
(45) Date of Patent: Apr. 28, 2026

(54) METHOD FOR SWITCHING CONNECTION STATUS OF CELL, POWER SUPPLY SYSTEM, AND ELECTRONIC DEVICE

(71) Applicant: Honor Device Co., Ltd., Shenzhen (CN)

(72) Inventors: Xinghua Wang, Shenzhen (CN); Xiaoyang Wang, Shenzhen (CN); Yunchun Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 580 days.

(21) Appl. No.: 17/778,455

(22) PCT Filed: Sep. 17, 2021

(86) PCT No.: PCT/CN2021/119118
§ 371 (c)(1),
(2) Date: May 20, 2022

(87) PCT Pub. No.: WO2022/142491
PCT Pub. Date: Jul. 7, 2022

(65) Prior Publication Data
US 2023/0208156 A1 Jun. 29, 2023

(30) Foreign Application Priority Data
Dec. 29, 2020 (CN) .......................... 202011603865.9

(51) Int. Cl.
*H02J 7/00* (2006.01)
(52) U.S. Cl.
CPC .......... *H02J 7/0024* (2013.01); *H02J 7/0019* (2013.01)

(58) Field of Classification Search
CPC .............................. H02J 7/0019; H02J 7/0024
(Continued)

(56) References Cited

U.S. PATENT DOCUMENTS 6,034,506 A * 3/2000 Hall .......................... H02J 7/35
320/101
6,657,402 B2* 12/2003 Bron ....................... H02M 1/10
315/105
(Continued)

FOREIGN PATENT DOCUMENTS

CN 105471001 A 4/2016
CN 105896670 A 8/2016
(Continued)

OTHER PUBLICATIONS

EPO Machine Translation of KR20200117817A (Year: 2025).*
(Continued)

*Primary Examiner* — Drew A Dunn
*Assistant Examiner* — Frank Alexis Silva

(57) ABSTRACT
A power supply system is applied to the electronic device, where the electronic device includes at least two cell groups, an external interface, and a load; the power supply system includes a toggle switch circuit and a buck switch circuit; two poles of the cell group are respectively coupled to an input end of the toggle switch circuit; a first output end of the toggle switch circuit is coupled to an input end of the buck switch circuit, a second output end of the toggle switch circuit is coupled to an output end of the buck switch circuit, and the input end of the buck switch circuit is coupled to an external interface; and the output end of the buck switch circuit is further coupled to the load, and the external interface is configured to connect a charger.

13 Claims, 22 Drawing Sheets

(58) Field of Classification Search
USPC .......................................................... 320/117
See application file for complete search history.

(56) References Cited

U.S. PATENT DOCUMENTS

| | | | | |
|---|---|---|---|---|
| 9,257,859 B2* | 2/2016 | Nassar | ................... | H02J 7/0024 |
| 9,343,967 B2* | 5/2016 | Shao | ..................... | H02M 3/158 |
| 9,450,274 B2* | 9/2016 | Vo | .......................... | H02J 7/0016 |
| 9,662,986 B2* | 5/2017 | Lee | ........................... | B60L 58/21 |
| 10,074,997 B2* | 9/2018 | Vo | .......................... | H02J 7/342 |
| 10,122,201 B2* | 11/2018 | Zhang | ................. | H02J 7/00712 |
| 10,181,745 B2* | 1/2019 | Zhang | .............. | H02M 3/33523 |
| 10,263,433 B2* | 4/2019 | Onizuka | ................. | H02J 7/345 |
| 10,574,230 B1* | 2/2020 | Wu | .......................... | H02M 3/07 |
| 10,763,553 B2* | 9/2020 | Huang | ...................... | H02J 7/35 |
| 10,873,260 B2* | 12/2020 | Yan | ..................... | H02M 7/4837 |
| 10,910,849 B2* | 2/2021 | Lyons | ....................... | H02J 1/14 |
| 11,226,666 B2* | 1/2022 | Hsu | .......................... | H02M 1/36 |
| 11,258,273 B2* | 2/2022 | Huang | ................. | H02J 7/0014 |
| 11,296,518 B2* | 4/2022 | Park | ...................... | H01M 10/46 |
| 11,336,102 B2* | 5/2022 | Chen | .................... | H02J 7/0042 |
| 11,652,353 B2* | 5/2023 | Chen | ................... | H02J 7/00032 |
| | | | | 320/134 |
| 11,715,961 B2* | 8/2023 | Veselic | ............ | H02J 7/007194 |
| | | | | 320/134 |
| 11,837,957 B2* | 12/2023 | Ren | ......................... | H02M 1/08 |
| 11,881,737 B2* | 1/2024 | Tseng | .................. | H02J 7/00036 |
| 11,923,705 B2* | 3/2024 | Zhang | .................. | H02J 7/0068 |
| 11,923,706 B2* | 3/2024 | Jia | .......................... | H02J 7/0029 |
| 11,955,821 B2* | 4/2024 | Li | .......................... | H02J 7/0013 |
| 11,962,172 B2* | 4/2024 | Kunimitsu | .......... | H01M 10/441 |
| 11,967,843 B2* | 4/2024 | Jiang | .................... | H02J 7/0014 |
| 12,009,682 B2* | 6/2024 | Zhang | .................. | B60L 3/0069 |
| 12,224,605 B2* | 2/2025 | Li | .......................... | H02J 7/007182 |
| 12,230,985 B2* | 2/2025 | Jia | .......................... | H02J 7/0029 |
| 2010/0033128 A1* | 2/2010 | Densham | .............. | H02J 7/0016 |
| | | | | 320/116 |
| 2010/0090662 A1* | 4/2010 | Okuto | ................... | H02J 7/0018 |
| | | | | 320/164 |
| 2011/0133701 A1* | 6/2011 | Li | ............................ | H02J 7/04 |
| | | | | 320/160 |
| 2012/0206101 A1* | 8/2012 | Shilimkar | ................. | G06F 1/32 |
| | | | | 320/112 |
| 2014/0159495 A1* | 6/2014 | Nassar | ................. | H02J 7/0068 |
| | | | | 307/71 |
| 2014/0239896 A1 | 8/2014 | Takeshita | | |
| 2014/0312828 A1* | 10/2014 | Vo | ......................... | H02J 7/0016 |
| | | | | 429/7 |
| 2015/0214835 A1* | 7/2015 | Shao | ..................... | H02M 3/158 |
| | | | | 323/234 |
| 2016/0056663 A1* | 2/2016 | Deng | ....................... | H02J 7/02 |
| | | | | 320/108 |
| 2017/0054306 A1* | 2/2017 | Vo | ......................... | H02J 7/0016 |

| | | | | |
|---|---|---|---|---|
| 2018/0123383 A1* | 5/2018 | Tian | ................... | H02M 3/33523 |
| 2018/0145518 A1* | 5/2018 | Onizuka | .............. | H02J 7/0013 |
| 2018/0287504 A1* | 10/2018 | Parsekar | ............... | H02M 3/335 |
| 2019/0115769 A1* | 4/2019 | Chen | ..................... | H02J 7/0024 |
| 2019/0131667 A1* | 5/2019 | Huang | .................. | H02J 7/0018 |
| 2019/0280618 A1* | 9/2019 | Yan | ...................... | H02M 7/4837 |
| 2019/0359067 A1* | 11/2019 | Hu | ......................... | H02J 7/0019 |
| 2020/0220347 A1* | 7/2020 | Liu | ........................... | H02J 7/00 |
| 2020/0259342 A1* | 8/2020 | Chen | .................. | H02J 7/00034 |
| 2020/0313446 A1* | 10/2020 | Park | ...................... | H01M 10/46 |
| 2020/0358298 A1* | 11/2020 | Huang | .................. | H02J 7/0068 |
| 2021/0091576 A1* | 3/2021 | Zhang | ................. | H02J 7/00045 |
| 2021/0135575 A1* | 5/2021 | Ren | ...................... | H02M 3/335 |
| 2021/0167608 A1* | 6/2021 | Veselic | ................. | H02M 3/158 |
| 2021/0305837 A1* | 9/2021 | Hung | ................. | H01M 10/441 |
| 2021/0320505 A1* | 10/2021 | Kunimitsu | ............. | B60L 58/22 |
| 2021/0359535 A1* | 11/2021 | Tseng | .................... | H02J 7/0024 |
| 2021/0376618 A1 | 12/2021 | Chen et al. | | |
| 2021/0399555 A1* | 12/2021 | Zhu | ......................... | B60L 58/20 |
| 2021/0408808 A1 | 12/2021 | Zhang | | |
| 2022/0006308 A1* | 1/2022 | Zhang | ................. | B60L 3/0046 |
| 2022/0123564 A1* | 4/2022 | Jia | ......................... | H02J 7/0029 |
| 2022/0239116 A1* | 7/2022 | Chen | .................... | H02J 7/0024 |
| 2022/0263324 A1 | 8/2022 | Sun et al. | | |
| 2022/0352731 A1* | 11/2022 | Jiang | ........................ | H02H 7/18 |
| 2023/0268763 A1* | 8/2023 | Li | ........................... | H02J 7/342 |
| | | | | 320/116 |
| 2024/0162726 A1* | 5/2024 | Jia | ......................... | H02J 7/0029 |

FOREIGN PATENT DOCUMENTS

| | | | | | |
|---|---|---|---|---|---|
| CN | 205829227 U | 12/2016 | | | |
| CN | 108964184 A | 12/2018 | | | |
| CN | 110112805 A | 8/2019 | | | |
| CN | 110429673 A | 11/2019 | | | |
| CN | 110460125 A | 11/2019 | | | |
| CN | 111033933 A | 4/2020 | | | |
| CN | 111384762 A | 7/2020 | | | |
| JP | 2014168321 A | 9/2014 | | | |
| KR | 20160098863 A | 8/2016 | | | |
| KR | 20200117817 A | 10/2020 | | | |
| TW | 1558063 B | * | 11/2016 | ............... | H02J 7/34 |
| WO | 2020199833 A1 | 10/2020 | | | |

OTHER PUBLICATIONS

Battery Balancing: Techniques, Benefits, and How It Works. Liu, K. Renogy. (Nov. 5, 2024). https://www.renogy.com/academy/batteries/Lithium-Battery-Balancing?srsltid=AfmBOoqTRX1H5gyfIO1ZAAOXQHUNKKOAuoen_2uage8ezRXisVOgYhqo (Year: 2024).*
BU-304: Why are protection circuits needed ?. Buchmann, I. Battery University. (Apr. 14, 2023). https://batteryuniversity.com/article/bu-304-why-are-protection-circuits-needed (Year: 2023).*

* cited by examiner

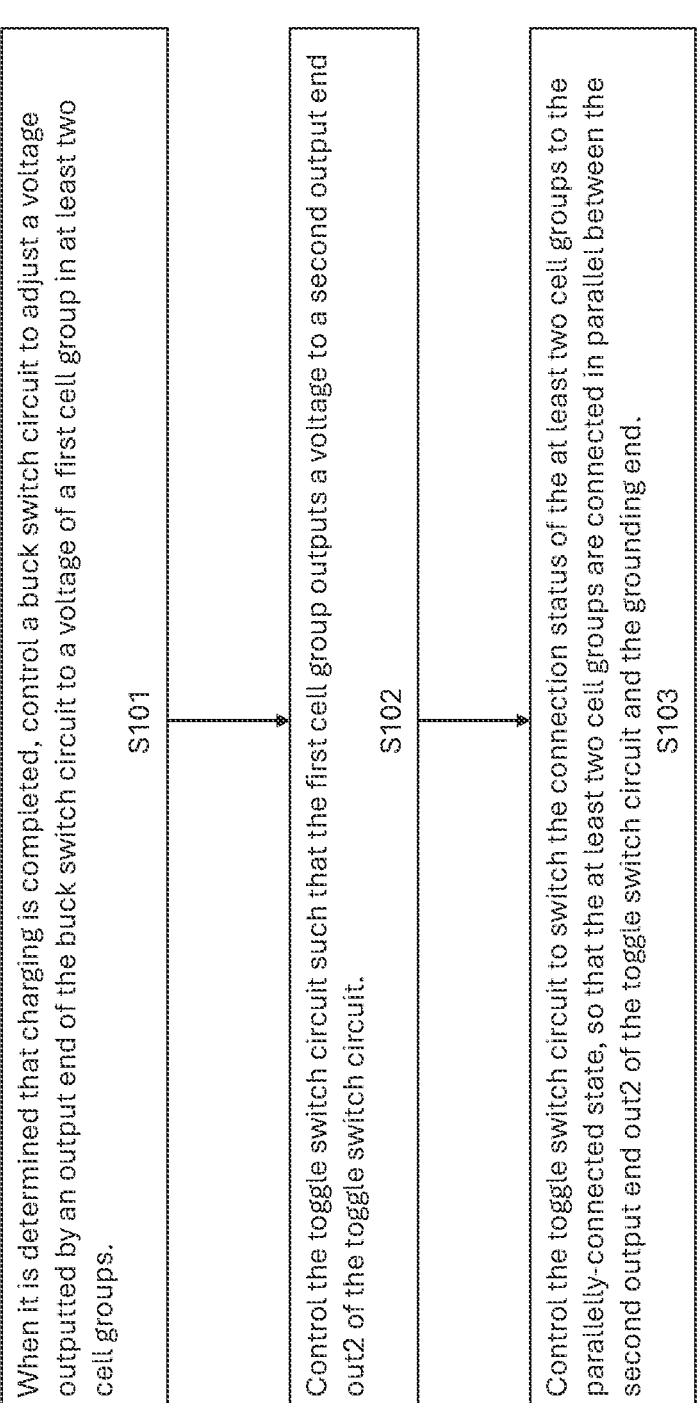

When it is determined that charging is completed, control a buck switch circuit to adjust a voltage outputted by an output end of the buck switch circuit to a voltage of a first cell group in at least two cell groups.

S101

Control the toggle switch circuit such that the first cell group outputs a voltage to a second output end out2 of the toggle switch circuit.

S102

Control the toggle switch circuit to switch the connection status of the at least two cell groups to the parallelly-connected state, so that the at least two cell groups are connected in parallel between the second output end out2 of the toggle switch circuit and the grounding end.

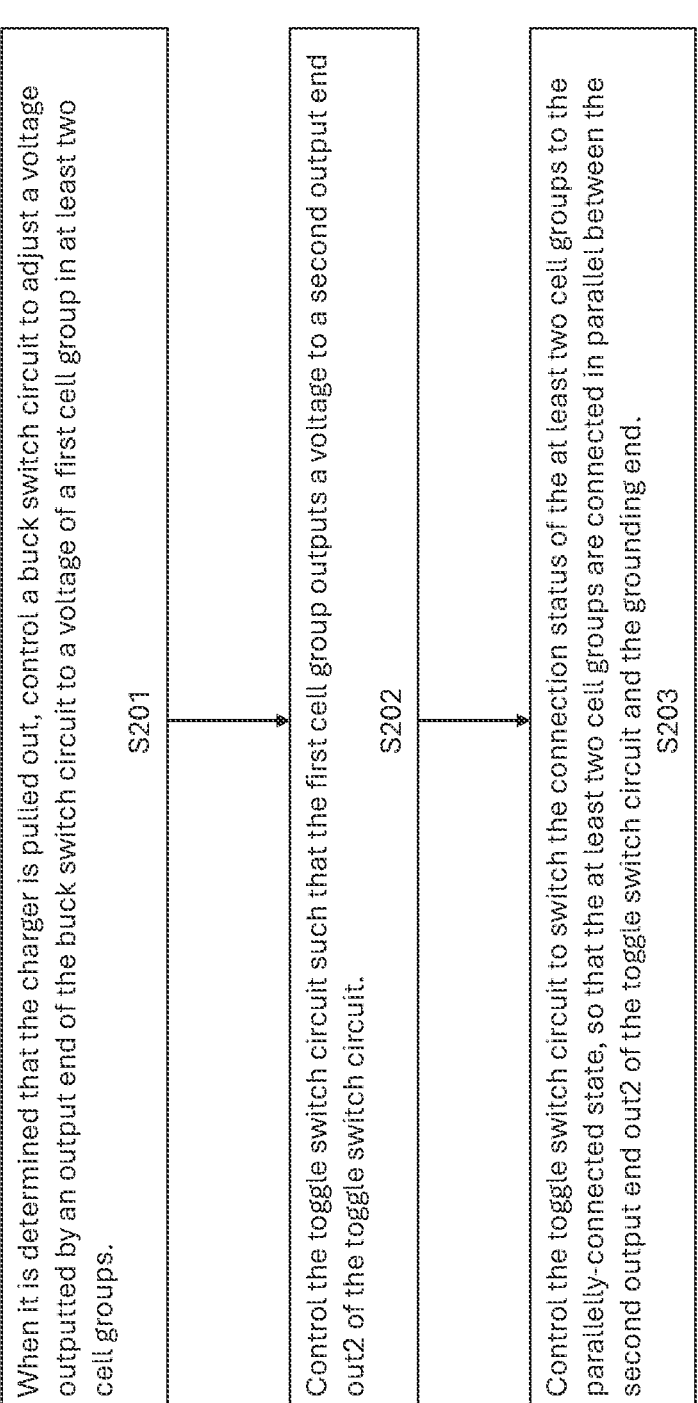

When it is determined that the charger is pulled out, control a buck switch circuit to adjust a voltage outputted by an output end of the buck switch circuit to a voltage of a first cell group in at least two cell groups.

S201

Control the toggle switch circuit such that the first cell group outputs a voltage to a second output end out2 of the toggle switch circuit.

S202

Control the toggle switch circuit to switch the connection status of the at least two cell groups to the parallelly-connected state, so that the at least two cell groups are connected in parallel between the second output end out2 of the toggle switch circuit and the grounding end.

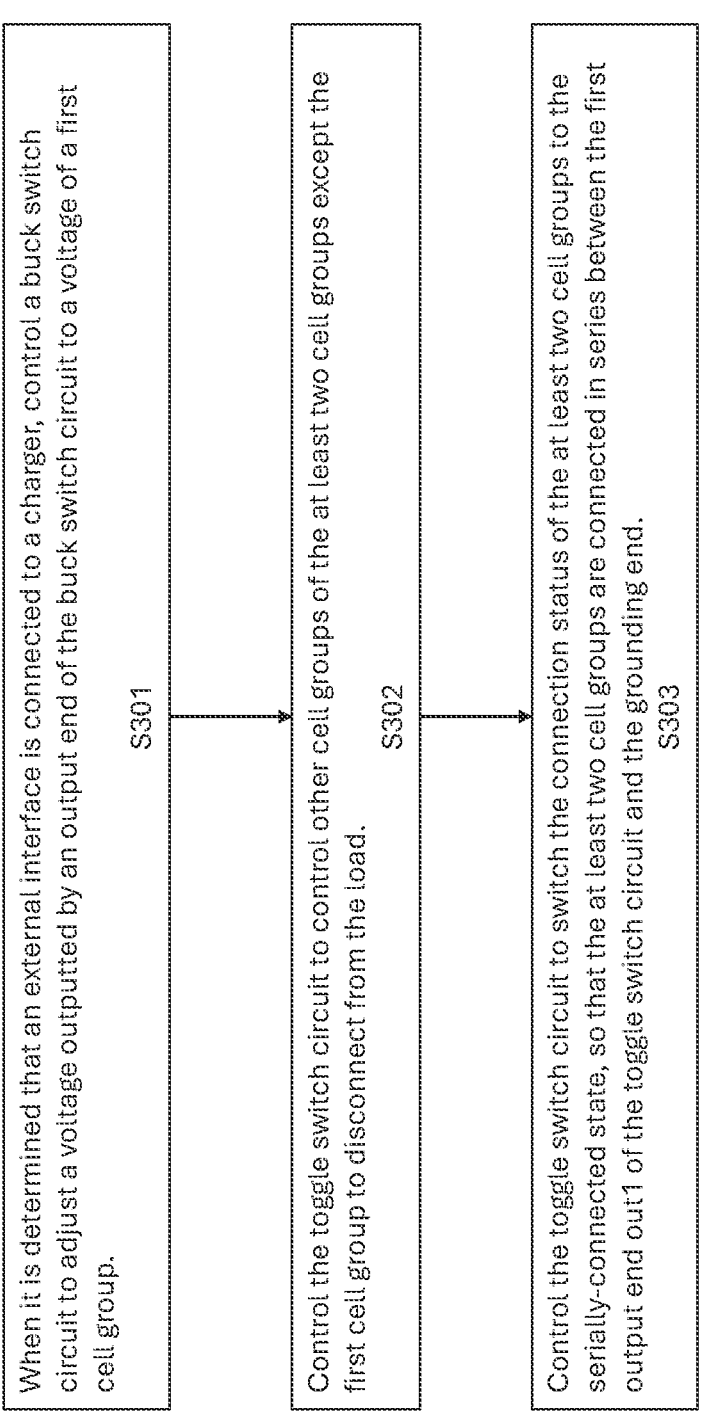

When it is determined that an external interface is connected to a charger, control a buck switch circuit to adjust a voltage outputted by an output end of the buck switch circuit to a voltage of a first cell group.

S301

Control the toggle switch circuit to control other cell groups of the at least two cell groups except the first cell group to disconnect from the load.

S302

Control the toggle switch circuit to switch the connection status of the at least two cell groups to the serially-connected state, so that the at least two cell groups are connected in series between the first output end and out1 of the toggle switch circuit and the grounding end.

METHOD FOR SWITCHING CONNECTION STATUS OF CELL, POWER SUPPLY SYSTEM, AND ELECTRONIC DEVICE

This application is a National Stage of International Application No. PCT/CN2021/119118, filed Sep. 17, 2021, which claims priority to Chinese Patent Application No. 202011603865 9, filed Dec. 29, 2020, both of which are hereby incorporated by reference in their entireties.

TECHNICAL FIELD

Embodiments of this application relates to the field of power supplies, and in particular, to a method for switching a connection status of a cell, a power supply system, and an electronic device.

BACKGROUND

At present, the emergence of various electronic products, such as mobile phones, tablets, smart wearable devices, electric tools, and electric automobiles, constantly provides convenience for our lives. Accompanied with the rapid development of the electronic products, portable power supply and mobility have increasingly become the development trend.

For rechargeable electronic products, users' demand for fast charging and long standby is becoming more and more intense. Taking the mobile phones as an example, buck switch circuits are used in all power supply systems of the mobile phones. As shown in FIG. 1 and FIG. 2, the schematic structural diagrams of the current two power supply systems are provided. FIG. 1 provides a buck charging solution, generally, a system rated voltage Vbat of a mobile phone does not exceed 6 V, and a plurality of cells in a mobile phone battery (the voltage of a single cell is 3-4 V) are connected in parallel to directly supply power to a load. The voltage outputted from the charger to an external interface of the mobile phone (for example, a USB interface) is 2-4 times of the voltage of the cell. Therefore, it is necessary to reduce the voltage of the charger by a buck switch circuit to charge the cells connected in parallel. FIG. 2 provides a buck power supply solution. In the solution, a plurality of cells (the voltage of a single cell is 3-4 V) in a mobile phone battery are connected in series. In this state, for example, the voltage of two cells connected in series may reach up to 6-8 V, and the voltage outputted from the charger to an external interface of the mobile phone (for example, a USB interface) may be used to directly charge the serially-connected cells. However, because the voltage of the serially-connected cells is higher than the system rated voltage Vbat of the mobile phone, it is necessary to connect a buck switch circuit between the serially-connected cells and a load and reduce the voltage of the serially-connected cells before inputting the voltage to the load.

In the buck charging solution, the loss caused by the buck switch circuit may lead to excessive heating of the mobile phone during charging and affect the charging efficiency of the mobile phone; and in the buck power supply solution, part of the capacity of the cells may be lost in the form of heat consumption during the buck process of the buck switch circuit, which leads to shorter standby time of the mobile phone.

SUMMARY

An embodiment of this application provides a method for switching a connection status of a cell, a power supply system, and an electronic device, which can switch the connection status of a cell group to be serially-connected when charging the cell group, and switch the connection status of the cell group to be parallelly-connected when the cell group supplies power to a load, so as to improve charging efficiency and reduce heat loss when the cell group supplies power.

A first aspect provides a power supply system, applicable to an electronic device. The electronic device includes at least two cell groups, an external interface, and a load, where each of the cell groups includes at least one cell, and the at least one cell is coupled between two poles of the cell group. The power supply system includes a toggle switch circuit and a buck switch circuit. The toggle switch circuit includes a first output end, a second output end, and a plurality of input ends. Two poles of the cell group are each coupled to an input end of the toggle switch circuit. The first output end of the toggle switch circuit is coupled to an input end of the buck switch circuit, the second output end of the toggle switch circuit is coupled to an output end of the buck switch circuit, and the input end of the buck switch circuit is coupled to an external interface. The output end of the buck switch circuit is further coupled to the load, and the external interface is configured to connect a charger. The toggle switch circuit is configured to switch a connection status of at least two cell groups to be serially-connected or parallelly-connected. When the external interface is inserted into the charger to charge the at least two cell groups, the toggle switch circuit is configured to switch the connection status of the at least two cell groups to be serially-connected, so that the at least two cell groups are connected in series between the first output end of the toggle switch circuit and a grounding end, and the buck switch circuit is configured to adjust a voltage of the charger to a system rated voltage and output the voltage to the output end of the buck switch circuit. When supplying power to the load by the at least two cell groups, the toggle switch circuit is configured to switch the connection status of the at least two cell groups to be parallelly-connected, so that the at least two cell groups are connected in parallel between the second output end of the toggle switch circuit and the grounding end. In this way, the toggle switch circuit can switch the connection status of the at least two cell groups to be serially-connected or parallelly-connected. When the external interface is inserted into the charger to charge the at least two cell groups, the toggle switch circuit is configured to switch the connection status of the at least two cell groups to be serially-connected, so that the at least two cell groups are connected in series between the first output end of the toggle switch circuit and the grounding end, and the buck switch circuit is configured to adjust the voltage of the charger to the system rated voltage and output the voltage to the output end of the buck switch circuit. In this way, the charger may directly charge the cell groups in a serially-connected state, which can avoid the situation of charging the cell groups that are in a parallelly-connected state by a charger through a buck switch circuit at present, reduce the loss in the charging process, and avoid the excessive heating of the mobile phone during charging, thereby improving the charging efficiency. In addition, in the charging process of the mobile phone, the voltage of the charger may be adjusted to the system rated voltage through the buck switch circuit and outputted to the output end of the buck switch circuit to supply power to the load, thereby avoiding power failure of the mobile phone in the charging process and ensuring normal operating of the mobile phone in the charging process. When supplying power to the load by the at least two cell groups, the toggle switch circuit is configured to switch the connection status of the at least two cell groups to be parallelly-connected, so that the at least two cell groups are connected in parallel between the second output end of the toggle switch circuit and the grounding end, to supply power to the load. Compared with the current solution of buck power supplying the serially-connected cell group through the buck switch circuit, the solution may directly enable the cell groups to be connected in parallel to supply power to the load, and the buck switch circuit is no longer used to reduce the voltage of the serially-connected cell groups in the process of supplying power to the load by using the cell group, so that the loss caused by the buck switch circuit to the cell groups in the buck process can be avoided, and standby time of the electronic device can be improved.

In a possible implementation, the toggle switch circuit includes a plurality of switches, and a control end of any one of the switches is coupled to a control end of the toggle switch circuit. The toggle switch circuit is specifically configured to control the status of one or more of the switches to switch the connection status of the at least two cell groups to be parallelly-connected, or the toggle switch circuit is specifically configured to control the status of one or more of the switches to switch the connection status of the at least two cell groups to be serially-connected.

In a possible implementation, the power supply system includes two cell groups; the toggle switch circuit includes a first switch, a second switch, a third switch, a fourth switch, and a fifth switch; a first end of the first switch is coupled to the second output end of the toggle switch circuit, a second end of the first switch is coupled to a third input end of the toggle switch circuit, and a control end of the first switch is coupled to a control end of the toggle switch circuit; a first end of the second switch is coupled to a fourth input end of the toggle switch circuit, a second end of the second switch is coupled to a second input end of the toggle switch circuit, and a control end of the second switch is coupled to a control end of the toggle switch circuit; a first end of the third switch is coupled to the second input end of the toggle switch circuit, a second end of the third switch is coupled to the third input end of the toggle switch circuit, and a control end of the third switch is coupled to a control end of the toggle switch circuit; a first end of the fourth switch is coupled to the first output end of the toggle switch circuit, a second end of the fourth switch is coupled to the first input end of the toggle switch circuit, and a control end of the fourth switch is coupled to a control end of the toggle switch circuit; a first end of the fifth switch is coupled to the second output end of the toggle switch circuit, a second end of the fifth switch is coupled to the first input end of the toggle switch circuit, and a control end of the fifth switch is coupled to a control end of the toggle switch circuit; where a positive pole of the first cell group is coupled to the third input end of the toggle switch circuit, a negative pole of the first cell group is coupled to the fourth input end of the toggle switch circuit, a positive pole of the second cell group is coupled to the first input end of the toggle switch circuit, a negative pole of the second cell group is coupled to the second input end of the toggle switch circuit, and the fourth input end of the toggle switch circuit is coupled to the grounding end. The third switch and the fourth switch are turned off, the first switch, the second switch, and the fifth switch are turned on, and the connection status of the at least two cell groups is switched to be parallelly-connected. Alternatively, the third switch and the fourth switch are turned on, the first switch, the second switch, and the fifth switch are turned off, and the connection status of the at least two cell groups is switched to be serially-connected.

A second aspect provides a power supply system, applicable to an electronic device, where the electronic device includes at least two cell groups, an external interface, and a load, each of the cell groups includes at least one cell, and the at least one cell is coupled between two poles of the cell group; and the power supply system includes a toggle switch circuit and a buck switch circuit. The toggle switch circuit includes a first output end, a second output end, and a plurality of input ends; the two poles of the cell group are each coupled to an input end of the toggle switch circuit; the first output end of the toggle switch circuit is coupled to an input end of the buck switch circuit, the second output end of the toggle switch circuit is coupled to an output end of the buck switch circuit, and the input end of the buck switch circuit is coupled to an external interface; the output end of the buck switch circuit is further coupled to a load, and the external interface is configured to connect a charger; where the toggle switch circuit is configured to switch a connection status of the at least two cell groups to be serially-connected or parallelly-connected; when the external interface is inserted into the charger to charge the at least two cell groups, the toggle switch circuit is configured to switch the connection status of the at least two cell groups to be serially-connected, so that the at least two cell groups are connected in series between the first output end of the toggle switch circuit and a grounding end, and the buck switch circuit is configured to adjust a voltage of the charger to a system rated voltage and output the voltage to the output end of the buck switch circuit. When it is determined that charging is completed or the charger is disconnected from the external interface, the buck switch circuit is configured to adjust the voltage outputted from the output end of the buck switch circuit to a voltage of a first cell group among the at least two cell groups; the toggle switch circuit is configured such that the first cell group outputs a voltage to the second output end of the toggle switch circuit; the toggle switch circuit is configured to switch the connection status of the at least two cell groups to be parallelly-connected, so that the at least two cell groups are connected in parallel between the second output end of the toggle switch circuit and the grounding end.

In the solution, when switching the connection status of the at least two cell groups from serially-connected to parallelly-connected, if the switching of the connection status is triggered due to completion of charging, the buck switch circuit is configured to adjust the voltage outputted from the output end of the buck switch circuit to the voltage of the first cell group of the at least two cell groups when it is determined that the charging is completed. In the process, the charger supplies power to the load through the buck switch circuit, and the at least two cell groups connected in series prepare power for the load through the buck switch circuit, to ensure that the load is continuously powered. Then, the toggle switch circuit is configured such that the first cell group output a voltage to the second output end of the toggle switch circuit. The charger still outputs the voltage of the first cell group to the load through the buck switch circuit to supply power to the load, the first cell group prepares power for the load, and the first cell group supplies power to the load only when the charger is suddenly powered off (for example, pulled out). In this way, in the process, the load is ensured to be continuously powered. Finally, the toggle switch circuit is configured to switch the connection status of the at least two cell groups to be parallelly-connected, so that the at least two cell groups are connected in parallel between the second output end of the toggle switch circuit and the grounding end. The charger outputs the voltage of the first cell group to the load through the buck switch circuit to supply power to the load, and the first cell group is connected in parallel with the load to prepare power for the load, to ensure that the load is continuously powered. At any stage in the above process, there is a standby power solution for the load, and therefore the load may not be powered off when the charger is pulled out at any time. It is ensured that the electronic device may not be powered off during the process of switching the connection status of the at least two cell groups from serially-connected to parallelly-connected. In a case that switching of the connection status is triggered by disconnection of the charger from the external interface, when it is determined that the charger is disconnected from the external interface, the buck switch circuit is configured to adjust the voltage outputted from the output end of the buck switch circuit to the voltage of the first cell group of the at least two cell groups. In the process, the at least two cell groups connected in series supply power to the load through the buck switch circuit, to ensure that the load is continuously powered. Then, the toggle switch circuit is configured such that the first cell group output a voltage to the second output end of the toggle switch circuit. Power is still supplied to the load by outputting the voltage of the first cell group by the at least two cell groups connected in series to the load through the buck switch circuit, and the first cell group prepares power for the load. In this way, in the process, the load is ensured to be continuously powered. Finally, the toggle switch circuit is configured to switch the connection status of the at least two cell groups to be parallelly-connected, so that the at least two cell groups are connected in parallel between the second output end of the toggle switch circuit and the grounding end. The first cell group and the load are connected in parallel as the load, to ensure that the load is continuously powered when the at least two cell groups connected in series are disconnected. The load may not be powered off during the above process. It is ensured that the electronic device may not be powered off during the process of switching the connection status of the at least two cell groups from serially-connected to parallelly-connected.

In a possible implementation, the toggle switch circuit includes a plurality of switches, and a control end of any one of the switches is coupled to a control end of the toggle switch circuit. The toggle switch circuit is controlled to be specifically configured to control a status of one or more of the switches such that the first cell group outputs a voltage of to the second output end of the toggle switch circuit. The toggle switch circuit is specifically configured to control the status of one or more of the switches to switch the connection status of the at least two cell groups to be parallelly-connected.

In a possible implementation, the power supply system includes two cell groups; the toggle switch circuit includes a first switch, a second switch, a third switch, a fourth switch, and a fifth switch; a first end of the first switch is coupled to the second output end of the toggle switch circuit, a second end of the first switch is coupled to a third input end of the toggle switch circuit, and a control end of the first switch is coupled to a control end of the toggle switch circuit; a first end of the second switch is coupled to a fourth input end of the toggle switch circuit, a second end of the second switch is coupled to a second input end of the toggle switch circuit, and a control end of the second switch is coupled to a control end of the toggle switch circuit; a first end of the third switch is coupled to the second input end of the toggle switch circuit, a second end of the third switch is coupled to the third input end of the toggle switch circuit, and a control end of the third switch is coupled to a control end of the toggle switch circuit; a first end of the fourth switch is coupled to the first output end of the toggle switch circuit, a second end of the fourth switch is coupled to the first input end of the toggle switch circuit, and a control end of the fourth switch is coupled to a control end of the toggle switch circuit; a first end of the fifth switch is coupled to the second output end of the toggle switch circuit, a second end of the fifth switch is coupled to the first input end of the toggle switch circuit, and a control end of the fifth switch is coupled to a control end of the toggle switch circuit; where a positive pole of the first cell group is coupled to the third input end of the toggle switch circuit, a negative pole of the first cell group is coupled to the fourth input end of the toggle switch circuit, a positive pole of the second cell group is coupled to the first input end of the toggle switch circuit, a negative pole of the second cell group is coupled to the second input end of the toggle switch circuit, and the fourth input end of the toggle switch circuit is coupled to the grounding end; when the external interface is inserted into the charger to charge the at least two cell groups, the third switch and the fourth switch are turned on, and the first switch, the second switch, and the fifth switch are turned off; the second switch and the fifth switch are turned off, the first switch, the third switch, and the fourth switch are controlled to be turned on, and the first cell group outputs the voltage to the second output end of the toggle switch circuit; and the third switch and the fourth switch are turned off, and the first switch, the second switch, and the fifth switch are turned on, to switch the connection status of the at least two cell groups to be parallelly-connected.

In a possible implementation, the power supply system further includes: a plurality of equalization circuits, two ends of one equalization circuit are each coupled to two poles of a cell group. When it is determined that the voltage difference between the first cell group and the second cell group satisfies a predetermined predetermined condition, an equalization circuit corresponding to the first cell group is configured to shunt the first cell group.

In a possible implementation, the equalization circuit includes a sixth switch and a first resistor. A series structure of the sixth switch and the first resistor is connected in parallel with a cell group. When it is determined that the voltage difference between the first cell group and the second cell group satisfies a first predetermined condition, a sixth switch in the equalization circuit corresponding to the first cell group is turned on.

In a possible implementation, the power supply system further includes an equalization circuit, where the equalization circuit includes an equalization switch circuit and a capacitor, a first input end of the equalization switch circuit is coupled to the positive pole of the first cell group, a second input end of the equalization switch circuit is coupled to the negative pole of the first cell group, a third input end of the equalization switch circuit is coupled to the positive pole of the second cell group, and a fourth input end of the equalization switch circuit is coupled to the negative pole of the second cell group; the capacitor is coupled between the first output end and the second output end of the equalization switch circuit; the first cell group and the second cell group are adjacent cell groups when the at least two cell groups are connected in series; when it is determined that the voltage difference between the first cell group and the second cell group satisfies the first predetermined condition, the equalization switch circuit is configured to connect the capacitor in parallel with the first cell group; and when it is determined that the voltage of the capacitor is equal to the voltage of the first cell group, the equalization switch circuit is configured to connect the capacitor in parallel with the second cell group.

In a possible implementation, the equalization switch circuit includes a sixth switch, a seventh switch, an eighth switch, and a ninth switch; a first end of the sixth switch is coupled to the first input end of the equalization switch circuit, a second end of the sixth switch is coupled to the first output end of the equalization switch circuit, and a control end of the sixth switch is coupled to a control end of the equalization switch circuit; a first end of the seventh switch is coupled to the second input end of the equalization switch circuit, a second end of the seventh switch is coupled to the first output end of the equalization switch circuit, and a control end of the seventh switch is coupled to a control end of the equalization switch circuit; a first end of the eighth switch is coupled to the third input end of the equalization switch circuit, a second end of the eighth switch is coupled to the second output end of the equalization switch circuit, and a control end of the eighth switch is coupled to a control end of the equalization switch circuit; a first end of the ninth switch is coupled to the fourth input end of the equalization switch circuit, a second end of the ninth switch is coupled to the second output end of the equalization switch circuit, and a control end of the eighth switch is coupled to a control end of the equalization switch circuit; when it is determined that the voltage difference between the first cell group and the second cell group satisfies the first predetermined predetermined condition, the sixth switch and the eighth switch are turned on, and the seventh switch and the ninth switch are turned off; and when it is determined that the voltage of the capacitor is equal to the voltage of the first cell group, the sixth switch and the eighth switch are turned off, and the seventh switch and the ninth switch are turned on.

In a possible implementation, the power supply system further includes a first battery connector and a second battery connector, where the input end of the buck switch circuit and the output end of the buck switch circuit are respectively coupled to terminals of the first battery connector; the first output end of the toggle switch circuit and the second output end of the toggle switch circuit are respectively coupled to the terminals of the first battery connector; and when the first battery connector and the second battery connector are plugged together, the first battery connector is coupled to terminals in the second battery connector.

In a possible implementation, the power supply system further includes a protection circuit, where a control end of the toggle switch circuit is coupled to an output end of the protection circuit; and protection circuit is configured to sample a working parameter of the cell group, and when a working status of any one of the cell groups is determined to be abnormal based on the working parameter, the protection circuit controls the toggle switch circuit to disconnect any one of the cell groups.

A third aspect provides a power supply system, applicable to an electronic device. The electronic device includes at least two cell groups, an external interface, and a load, where each of the cell groups includes at least one cell, and the at least one cell is coupled between two poles of the cell group. The power supply system includes a toggle switch circuit and a buck switch circuit. The toggle switch circuit includes a first output end, a second output end, and a plurality of input ends. Two poles of the cell group are each coupled to an input end of the toggle switch circuit. The first output end of the toggle switch circuit is coupled to an input end of the buck switch circuit, the second output end of the toggle switch circuit is coupled to an output end of the buck switch circuit, and the input end of the buck switch circuit is coupled to an external interface. The output end of the buck switch circuit is further coupled to the load of the electronic device, and the external interface is configured to connect a charger. The toggle switch circuit is configured to switch the connection status of the at least two cell groups to be serially-connected or parallelly-connected. When supplying power to the load by the at least two cell groups, the toggle switch circuit is configured to switch the connection status of the at least two cell groups to be parallelly-connected, so that the at least two cell groups are connected in parallel between the second output end of the toggle switch circuit and the grounding end. When it is determined that the external interface is connected to the charger, the buck switch circuit is configured to adjust the voltage outputted from the output end of the buck switch circuit to the voltage of the first cell group. The toggle switch circuit is configured to disconnect a cell group of the at least two cells except the first cell group from the load. The toggle switch circuit is configured to switch the connection status of at least two cell groups to the serially-connected state, so that the at least two cell groups are connected in series between the first output end of the toggle switch circuit and the grounding end.

In the solution, in the process of switching the connection status of at least two electric cell groups from the parallelly-connected state to the serially-connected state, because switching of the connection status is mainly triggered by connection of the external interface to the charger, when it is determined that the external interface is connected to the charger, the buck switch circuit is configured to adjust the voltage outputted by the output end of the buck switch circuit to the voltage of the first cell group. In the process, the charger outputs the voltage of the first cell group to the load through the buck switch circuit to supply power to the load, and the at least two cell groups are connected in parallel to prepare power for the load. Then, the toggle switch circuit is configured to disconnect other cell groups of the at least two cells except the first cell group from the load. In the process, the charger outputs the voltage of the first cell group to the load through the buck switch circuit to supply power to the load, and the first cell group prepares power for the load, in which way the load is also ensured to be continuously powered. Finally, the toggle switch circuit is configured to switch the connection status of the at least two cell groups to be serially-connected, so that the at least two cell groups are connected in series between the first output end of the toggle switch circuit and the grounding end. In the process, the charger continuously supplies power to the load by outputting the voltage of the first cell group to the load through the buck switch circuit. In addition, the charger directly charges the at least two cell groups connected in series, and the at least two cell groups connected in series prepare power for the load through bucking by the buck switch circuit, to ensure that the load is continuously powered. The load may not be powered off during the above process. It is ensured that the electronic device may not be powered off during the process of switching the connection status of the at least two cell groups from the parallelly-connected state to the serially-connected state.

In a possible implementation, the toggle switch circuit includes a plurality of switches, and a control end of any one of the switches is coupled to a control end of the toggle switch circuit. The toggle switch circuit is specifically configured to control the status of one or more of the switches, to disconnect other cell groups of the at least two cells except the first cell group from the load. The toggle switch circuit is controlled to be specifically configured to control the status of one or more of the switches to switch the connection status of the at least two cell groups to be serially-connected.

In a possible implementation, the power supply system includes two cell groups; the toggle switch circuit includes a first switch, a second switch, a third switch, a fourth switch, and a fifth switch; a first end of the first switch is coupled to the second output end of the toggle switch circuit, a second end of the first switch is coupled to a third input end of the toggle switch circuit, and a control end of the first switch is coupled to a control end of the toggle switch circuit; a first end of the second switch is coupled to a fourth input end of the toggle switch circuit, a second end of the second switch is coupled to a second input end of the toggle switch circuit, and a control end of the second switch is coupled to a control end of the toggle switch circuit; a first end of the third switch is coupled to the second input end of the toggle switch circuit, a second end of the third switch is coupled to the third input end of the toggle switch circuit, and a control end of the third switch is coupled to a control end of the toggle switch circuit; a first end of the fourth switch is coupled to the first output end of the toggle switch circuit, a second end of the fourth switch is coupled to the first input end of the toggle switch circuit, and a control end of the fourth switch is coupled to a control end of the toggle switch circuit; a first end of the fifth switch is coupled to the second output end of the toggle switch circuit, a second end of the fifth switch is coupled to the first input end of the toggle switch circuit, and a control end of the fifth switch is coupled to a control end of the toggle switch circuit; where a positive pole of the first cell group is coupled to the third input end of the toggle switch circuit, a negative pole of the first cell group is coupled to the fourth input end of the toggle switch circuit, a positive pole of the second cell group is coupled to the first input end of the toggle switch circuit, a negative pole of the second cell group is coupled to the second input end of the toggle switch circuit, and the fourth input end of the toggle switch circuit is coupled to the grounding end; when the at least two cell groups supply power to the load, the third switch and the fourth switch are turned off, and the first switch, the second switch, and the fifth switch are turned on; the first switch is turned on, the second switch, the third switch, the fourth switch, and the fifth switch are turned off, and other cell groups of the at least two cell groups except the first cell group are disconnected from the load; and the third switch and the fourth switch are turned on, and the first switch, the second switch, and the fifth switch are turned off, so that the connection status of the at least two cell groups is switched to be serially-connected.

In a possible implementation, the power supply system further includes: a plurality of equalization circuits, two ends of one equalization circuit are each coupled to two poles of a cell group. When it is determined that the voltage difference between the first cell group and the second cell group satisfies a predetermined predetermined condition, an equalization circuit corresponding to the first cell group is configured to shunt the first cell group. Because properties such as internal resistance of all the cell groups are not completely consistent, unbalanced power may occur in the cell groups after charge and discharge cycles in a long run. When a plurality of cell groups are connected in series, because the properties such as the internal resistance are different, when the plurality of cell groups are connected in series and charged, the voltages of the cell groups may not be equal. In a general state, when a charger charges a plurality of cell groups connected in series, the equalization circuit does not work. When it is determined that the voltage difference between the first cell group and the second cell group exceeds a first voltage difference threshold, for example, when the voltage of the first cell group exceeds the voltage of the second cell group by a value greater than the first voltage difference threshold, it indicates that there is severe imbalance between the plurality of cell groups in the charging process, and a charging current of the first cell group may be shunted by enabling the equalization circuit corresponding to the first cell group, thereby reducing the charging current and reducing the charging speed. When the voltage difference between the first cell group and the second cell group is less than a second voltage difference threshold, in particular, the voltage of the first cell group is less than the voltage of the second cell group, the voltage difference is less than the second voltage difference threshold, or the voltage of the second cell group is less than the voltage of the first cell group, and the voltage difference is less than the second voltage difference threshold, the equalization circuit is controlled to stop shunting the charging current of the first cell group, where the first voltage difference threshold is greater than the second voltage difference threshold.

In a possible implementation, the equalization circuit includes a sixth switch and a first resistor. A series structure of the sixth switch and the first resistor is connected in parallel with a cell group, and a control end of the sixth switch is coupled to the control end of the equalization circuit. When it is determined that the voltage difference between the first cell group and the second cell group satisfies a first predetermined condition, a sixth switch in the equalization circuit corresponding to the first cell group is turned on. In the solution, shunting of the first cell group by the equalization circuit is implemented by controlling the status of the sixth switch.

In a possible implementation, the power supply system further includes an equalization circuit, where the equalization circuit includes an equalization switch circuit and a capacitor, a first input end of the equalization switch circuit is coupled to the positive pole of the first cell group, a second input end of the equalization switch circuit is coupled to the negative pole of the first cell group, a third input end of the equalization switch circuit is coupled to the positive pole of the second cell group, and a fourth input end of the equalization switch circuit is coupled to the negative pole of the second cell group; the capacitor is coupled between the first output end and the second output end of the equalization switch circuit; and the first cell group and the second cell group are adjacent cell groups when the at least two cell groups are connected in series. When it is determined that the voltage difference between the first cell group and the second cell group satisfies a first predetermined condition, for example, when the voltage of the first cell group exceeds the voltage of the second cell group by a value greater than the first voltage difference threshold, it indicates that there is severe imbalance between the plurality of cell groups in the charging process, the equalization switch circuit connects the capacitor in parallel with the first cell group. In this case, the capacitor shunts a charging current of the first cell group, thereby reducing the charging current of the first cell group and reducing the charging speed of the first cell group. When it is determined that the voltage of the capacitor is equal to the voltage of the first cell group, it indicates that the capacitor is charged to saturation, and the equalization switch circuit is controlled to connect the capacitor in parallel with the second cell group. In this way, the capacitor may charge the second cell group. The foregoing process is repeated to switch the capacitor to be connected in parallel with the first cell group and to be connected in parallel with the second cell group, until when the voltage difference between the first cell group and the second cell group is less than a second voltage difference threshold, in particular, the voltage of the first cell group is less than the voltage of the second cell group, the voltage difference is less than the second voltage difference threshold, or the voltage of the second cell group is less than the voltage of the first cell group, and the voltage difference is less than the second voltage difference threshold, the equalization circuit is controlled to stop shunting the charging current of the first cell group, where the first voltage difference threshold is greater than the second voltage difference threshold.

In a possible implementation, the equalization switch circuit includes a sixth switch, a seventh switch, an eighth switch, and a ninth switch; a first end of the sixth switch is coupled to the first input end of the equalization switch circuit, a second end of the sixth switch is coupled to the first output end of the equalization switch circuit, and a control end of the sixth switch is coupled to a control end of the equalization switch circuit; a first end of the seventh switch is coupled to the second input end of the equalization switch circuit, a second end of the seventh switch is coupled to the first output end of the equalization switch circuit, and a control end of the seventh switch is coupled to a control end of the equalization switch circuit; a first end of the eighth switch is coupled to the third input end of the equalization switch circuit, a second end of the eighth switch is coupled to the second output end of the equalization switch circuit, and a control end of the eighth switch is coupled to a control end of the equalization switch circuit; a first end of the ninth switch is coupled to the fourth input end of the equalization switch circuit, a second end of the ninth switch is coupled to the second output end of the equalization switch circuit, and a control end of the eighth switch is coupled to a control end of the equalization switch circuit; when it is determined that the voltage difference between the first cell group and the second cell group satisfies the first predetermined predetermined condition, the sixth switch and the eighth switch are turned on, and the seventh switch and the ninth switch are turned off; and when it is determined that the voltage of the capacitor is equal to the voltage of the first cell group, the sixth switch and the eighth switch are turned off, and the seventh switch and the ninth switch are turned on.

In a possible implementation, the power supply system further includes a first battery connector and a second battery connector, where the input end of the buck switch circuit and the output end of the buck switch circuit are respectively coupled to terminals of the first battery connector; the first output end of the toggle switch circuit and the second output end of the toggle switch circuit are respectively coupled to the terminals of the first battery connector; and when the first battery connector and the second battery connector are plugged together, the first battery connector is coupled to terminals in the second battery connector. In this way, modularization of a battery can be implemented. For example, when a battery needs to be replaced, the first battery connector and the second battery connector may be directly disconnected to replace the battery.

In a possible implementation, the power supply system further includes a protection circuit, where a control end of the toggle switch circuit is coupled to an output end of the protection circuit; and protection circuit is configured to sample a working parameter of the cell group, and when a working status of any one of the cell groups is determined to be abnormal based on the working parameter, the protection circuit controls the toggle switch circuit to disconnect any one of the cell groups. Specifically, the protection circuit may sample working parameters such as a current I and a voltage V of the cell group, and control a status of a switch in the toggle switch circuit to disconnect the cell group when it is determined that there are abnormal working states such as undervoltage, overvoltage, and overcurrent short circuit based on the working parameters of the cell group. In this way, the switches in the toggle switch circuit are directly reused in the abnormal protection process such as undervoltage, overvoltage, and overcurrent short circuit, which can save devices and reduce costs as much as possible.

A fourth aspect provides a method for switching a connection status of a cell, applicable to a power supply system of an electronic device. The electronic device includes at least two cell groups, an external interface, and a load, each of the cell groups includes at least one cell, and the at least one cell is coupled between two poles of the cell group. The power supply system includes a toggle switch circuit and a buck switch circuit. Two poles of the cell group are each coupled to an input end of the toggle switch circuit; a first output end of the toggle switch circuit is coupled to an input end of the buck switch circuit, a second output end of the toggle switch circuit is coupled to an output end of the buck switch circuit, and the input end of the buck switch circuit is coupled to an external interface. The output end of the buck switch circuit is further coupled to a load, and the external interface is configured to connect a charger. The toggle switch circuit is configured to switch the connection status of the at least two cell groups to be serially-connected or parallelly-connected. When the connection status of the at least two cell groups is being serially-connected, the method includes: when it is determined that charging is completed or the charger is disconnected from the external interface, controlling the buck switch circuit to adjust a voltage outputted by the output end of the buck switch circuit to a voltage of the first cell group in the at least two cell groups; controlling the toggle switch circuit such that the first cell group outputs a voltage to the second output end of the toggle switch circuit; controlling the toggle switch circuit to switch the connection status of the at least two cell groups be parallelly-connected, so that the at least two cell groups are connected in parallel between the second output end of the toggle switch circuit and a grounding end. When the external interface is inserted into the charger to charge the at least two cell groups, the toggle switch circuit is configured to switch the connection status of the at least two cell groups to be serially-connected, so that the at least two cell groups are connected in series between the external interface and the grounding end, and the buck switch circuit is configured to adjust the voltage of the charger to a system rated voltage and output the voltage to the load.

In a possible implementation, the toggle switch circuit includes a plurality of switches, and a control end of any one of the switches is coupled to a control end of the toggle switch circuit; the controlling the toggle switch circuit such that the first cell group outputs a voltage to the second output end of the toggle switch circuit includes: controlling the status of one or more of the switches in the toggle switch circuit, such that the first cell group outputs the voltage to the second output end of the toggle switch circuit; and the controlling the toggle switch circuit to switch the connection status of the at least two cell groups to be parallelly-connected includes: controlling the status of one or more of the switches in the toggle switch circuit to switch the connection status of the at least two cell groups to be parallelly-connected.

In a possible implementation, the power supply system includes two cell groups; the toggle switch circuit includes a first switch, a second switch, a third switch, a fourth switch, and a fifth switch; a first end of the first switch is coupled to the second output end of the toggle switch circuit, a second end of the first switch is coupled to a third input end of the toggle switch circuit, and a control end of the first switch is coupled to a control end of the toggle switch circuit; a first end of the second switch is coupled to a fourth input end of the toggle switch circuit, a second end of the second switch is coupled to a second input end of the toggle switch circuit, and a control end of the second switch is coupled to a control end of the toggle switch circuit; a first end of the third switch is coupled to the second input end of the toggle switch circuit, a second end of the third switch is coupled to the third input end of the toggle switch circuit, and a control end of the third switch is coupled to a control end of the toggle switch circuit; a first end of the fourth switch is coupled to the first output end of the toggle switch circuit, a second end of the fourth switch is coupled to the first input end of the toggle switch circuit, and a control end of the fourth switch is coupled to a control end of the toggle switch circuit; a first end of the fifth switch is coupled to the second output end of the toggle switch circuit, a second end of the fifth switch is coupled to the first input end of the toggle switch circuit, and a control end of the fifth switch is coupled to a control end of the toggle switch circuit; where a positive pole of the first cell group is coupled to the third input end of the toggle switch circuit, a negative pole of the first cell group is coupled to the fourth input end of the toggle switch circuit, a positive pole of the second cell group is coupled to the first input end of the toggle switch circuit, a negative pole of the second cell group is coupled to the second input end of the toggle switch circuit, and the fourth input end of the toggle switch circuit is coupled to the grounding end; when the external interface is inserted into the charger to charge the at least two cell groups, the third switch and the fourth switch are turned on, and the first switch, the second switch, and the fifth switch are turned off; the controlling the toggle switch circuit such that the first cell group outputs a voltage to the second output end of the toggle switch circuit includes: controlling the second switch and the fifth switch to be turned off, controlling the first switch, the third switch, and the fourth switch to be turned on, and outputting, by the first cell group, the voltage to the second output end of the toggle switch circuit; the control the toggle switch circuit to switch the connection status of the at least two cell groups to be parallelly-connected includes: controlling the third switch and the fourth switch to be turned off, controlling the first switch, the second switch, and the fifth switch to be turned on, and switching the connection status of the at least two cell groups to be parallelly-connected.

In a possible implementation, the power supply system further includes: a plurality of equalization circuits, two ends of one equalization circuit are each coupled to two poles of a cell group. The method further includes: when it is determined that the voltage difference between the first cell group and the second cell group satisfies a predetermined predetermined condition, controlling an equalization circuit corresponding to the first cell group to shunt the first cell group.

In a possible implementation, the equalization circuit includes a sixth switch and a first resistor; a series structure of the sixth switch and the first resistor is connected in parallel with a cell group, and a control end of the sixth switch is coupled to a control end of the equalization circuit. When it is determined that the voltage difference between the first cell group and the second cell group satisfies the predetermined predetermined condition, the controlling the equalization circuit corresponding to the first cell group to shunt the first cell group includes: when it is determined that the voltage difference between the first cell group and the second cell group satisfies the first predetermined condition, controlling the sixth switch in the equalization circuit corresponding to the first cell group to be turned on.

In a possible implementation, the power supply system further includes an equalization circuit, where the equalization circuit includes an equalization switch circuit and a capacitor, a first input end of the equalization switch circuit is coupled to a first electrode of the first cell group, a second input end of the equalization switch circuit is coupled to a second electrode of the first cell group, a third input end of the equalization switch circuit is coupled to the first electrode of the second cell group, and a fourth input end of the equalization switch circuit is coupled to the second electrode of the second cell group; the capacitor is coupled between the first output end and the second output end of the equalization switch circuit; the method further includes: when it is determined that the voltage difference between the first cell group and the second cell group satisfies the first predetermined condition, controlling the equalization switch circuit to connect the capacitor in parallel with the first cell group; and when it is determined that the voltage of the capacitor is equal to the voltage of the first cell group, controlling the equalization switch circuit to connect the capacitor in parallel with the second cell group.

In a possible implementation, the equalization switch circuit includes a sixth switch, a seventh switch, an eighth switch, and a ninth switch; a first end of the sixth switch is coupled to the first input end of the equalization switch circuit, a second end of the sixth switch is coupled to the first output end of the equalization switch circuit, and a control end of the sixth switch is coupled to a control end of the equalization switch circuit; a first end of the seventh switch is coupled to the second input end of the equalization switch circuit, a second end of the seventh switch is coupled to the first output end of the equalization switch circuit, and a control end of the seventh switch is coupled to a control end of the equalization switch circuit; a first end of the eighth switch is coupled to the third input end of the equalization switch circuit, a second end of the eighth switch is coupled to the second output end of the equalization switch circuit, and a control end of the eighth switch is coupled to a control end of the equalization switch circuit; a first end of the ninth switch is coupled to the fourth input end of the equalization switch circuit, a second end of the ninth switch is coupled to the second output end of the equalization switch circuit, and a control end of the eighth switch is coupled to a control end of the equalization switch circuit; the controlling the equalization switch circuit to connect the capacitor in parallel with the first cell group when it is determined that the voltage difference between the first cell group and the second cell group satisfies the first predetermined condition includes: when it is determined that the voltage difference between the first cell group and the second cell group satisfies the first predetermined predetermined condition, controlling the sixth switch and the eighth switch to be turned on, and the seventh switch and the ninth switch to be turned off; and the controlling the equalization switch circuit to connect the capacitor in parallel with the second cell group when it is determined that the voltage of the capacitor is equal to the voltage of the first cell group includes: when it is determined that the voltage of the capacitor is equal to the voltage of the first cell group, controlling the sixth switch and the eighth switch to be turned off, and controlling the seventh switch and the ninth switch to be turned on.

A fifth aspect provides a method for switching a connection status of a cell, applicable to a power supply system of an electronic device. The electronic device includes at least two cell groups, an external interface, and a load, each of the cell groups includes at least one cell, and the at least one cell is coupled between two poles of the cell group. The power supply system includes a toggle switch circuit and a buck switch circuit. Two poles of the cell group are each coupled to an input end of the toggle switch circuit; a first output end of the toggle switch circuit is coupled to an input end of the buck switch circuit, a second output end of the toggle switch circuit is coupled to an output end of the buck switch circuit, and the input end of the buck switch circuit is coupled to an external interface. The output end of the buck switch circuit is further coupled to a load, and the external interface is configured to connect a charger. The toggle switch circuit is configured to switch the connection status of the at least two cell groups to be serially-connected or parallelly-connected. When the connection status of the at least two cell groups is being parallelly-connected, the method includes: when it is determined that the external interface is connected to the charger, controlling the buck switch circuit to adjust a voltage outputted by the output end of the buck switch circuit to a voltage of the first cell group; controlling the toggle switch circuit to disconnect other cell groups of the at least two cells except the first cell group from the load; controlling the toggle switch circuit to switch the connection status of the at least two cell groups be serially-connected, so that the at least two cell groups are connected in series between the first output end of the toggle switch circuit and a grounding end. When supplying power to the load through the at least two cell groups, the toggle switch circuit is configured to switch the connection status of the at least two cell groups to be parallelly-connected, so that the at least two cell groups are connected in parallel between the second output end of the toggle switch circuit and the grounding end.

In a possible implementation, the toggle switch circuit includes a plurality of switches, and a control end of any one of the switches is coupled to a control end of the toggle switch circuit; the controlling the toggle switch circuit to disconnect other cell groups of the at least two cells except the first cell group from the load includes: controlling the status of one or more of the switches in the toggle switch circuit to disconnect the other cell groups of the at least two cells except the first cell group from the load; the controlling the toggle switch circuit to switch the connection status of the at least two cell groups to a serially-connected state includes: controlling the status of one or more of the switches in the toggle switch circuit to switch the connection status of the at least two cell groups to be serially-connected.

In a possible implementation, the power supply system includes two cell groups; the toggle switch circuit includes a first switch, a second switch, a third switch, a fourth switch, and a fifth switch; a first end of the first switch is coupled to the second output end of the toggle switch circuit, a second end of the first switch is coupled to a third input end of the toggle switch circuit, and a control end of the first switch is coupled to a control end of the toggle switch circuit; a first end of the second switch is coupled to a fourth input end of the toggle switch circuit, a second end of the second switch is coupled to a second input end of the toggle switch circuit, and a control end of the second switch is coupled to a control end of the toggle switch circuit; a first end of the third switch is coupled to the second input end of the toggle switch circuit, a second end of the third switch is coupled to the third input end of the toggle switch circuit, and a control end of the third switch is coupled to a control end of the toggle switch circuit; a first end of the fourth switch is coupled to the first output end of the toggle switch circuit, a second end of the fourth switch is coupled to the first input end of the toggle switch circuit, and a control end of the fourth switch is coupled to a control end of the toggle switch circuit; a first end of the fifth switch is coupled to the second output end of the toggle switch circuit, a second end of the fifth switch is coupled to the first input end of the toggle switch circuit, and a control end of the fifth switch is coupled to a control end of the toggle switch circuit; where a positive pole of the first cell group is coupled to the third input end of the toggle switch circuit, a negative pole of the first cell group is coupled to the fourth input end of the toggle switch circuit, a positive pole of the second cell group is coupled to the first input end of the toggle switch circuit, a negative pole of the second cell group is coupled to the second input end of the toggle switch circuit, and the fourth input end of the toggle switch circuit is coupled to the grounding end; when the at least two cell groups supply power to the load, the third switch and the fourth switch are turned off, and the first switch, the second switch, and the fifth switch are turned on; the controlling the toggle switch circuit to disconnect other cell groups of the at least two cells except the first cell group from the load includes: controlling the first switch to be turned on, controlling the second switch, the third switch, the fourth switch, and the fifth switch to be turned off, and disconnecting the other cell groups of the at least two cell groups other the first cell group from the load; the controlling the toggle switch circuit to switch the connection status of the at least two cell groups to a serially-connected state includes: controlling the third switch and the fourth switch to be turned on, controlling the first switch, the second switch, and the fifth switch to be turned off, and switching the connection status of the at least two cell groups to be serially-connected.

In a possible implementation, the power supply system further includes: a plurality of equalization circuits, two ends of one equalization circuit are each coupled to two poles of a cell group. The method further includes: when it is determined that the voltage difference between the first cell group and the second cell group satisfies a predetermined predetermined condition, controlling an equalization circuit corresponding to the first cell group to shunt the first cell group.

In a possible implementation, the equalization circuit includes a sixth switch and a first resistor; a series structure of the sixth switch and the first resistor is connected in parallel with a cell group, and a control end of the sixth switch is coupled to a control end of the equalization circuit. When it is determined that the voltage difference between the first cell group and the second cell group satisfies the predetermined predetermined condition, the controlling the equalization circuit corresponding to the first cell group to shunt the first cell group includes: when it is determined that the voltage difference between the first cell group and the second cell group satisfies the first predetermined condition, controlling the sixth switch in the equalization circuit corresponding to the first cell group to be turned on.

In a possible implementation, the power supply system further includes an equalization circuit, where the equalization circuit includes an equalization switch circuit and a capacitor, a first input end of the equalization switch circuit is coupled to a first electrode of the first cell group, a second input end of the equalization switch circuit is coupled to a second electrode of the first cell group, a third input end of the equalization switch circuit is coupled to the first electrode of the second cell group, and a fourth input end of the equalization switch circuit is coupled to the second electrode of the second cell group; the capacitor is coupled between the first output end and the second output end of the equalization switch circuit; the method further includes: when it is determined that the voltage difference between the first cell group and the second cell group satisfies the first predetermined condition, controlling the equalization switch circuit to connect the capacitor in parallel with the first cell group; and when it is determined that the voltage of the capacitor is equal to the voltage of the first cell group, controlling the equalization switch circuit to connect the capacitor in parallel with the second cell group.

In a possible implementation, the equalization switch circuit includes a sixth switch, a seventh switch, an eighth switch, and a ninth switch; a first end of the sixth switch is coupled to the first input end of the equalization switch circuit, a second end of the sixth switch is coupled to the first output end of the equalization switch circuit, and a control end of the sixth switch is coupled to a control end of the equalization switch circuit; a first end of the seventh switch is coupled to the second input end of the equalization switch circuit, a second end of the seventh switch is coupled to the first output end of the equalization switch circuit, and a control end of the seventh switch is coupled to a control end of the equalization switch circuit; a first end of the eighth switch is coupled to the third input end of the equalization switch circuit, a second end of the eighth switch is coupled to the second output end of the equalization switch circuit, and a control end of the eighth switch is coupled to a control end of the equalization switch circuit; a first end of the ninth switch is coupled to the fourth input end of the equalization switch circuit, a second end of the ninth switch is coupled to the second output end of the equalization switch circuit, and a control end of the eighth switch is coupled to a control end of the equalization switch circuit; the controlling the equalization switch circuit to connect the capacitor in parallel with the first cell group when it is determined that the voltage difference between the first cell group and the second cell group satisfies the first predetermined condition includes: when it is determined that the voltage difference between the first cell group and the second cell group satisfies the first predetermined predetermined condition, controlling the sixth switch and the eighth switch to be turned on, and the seventh switch and the ninth switch to be turned off; and the controlling the equalization switch circuit to connect the capacitor in parallel with the second cell group when it is determined that the voltage of the capacitor is equal to the voltage of the first cell group includes: when it is determined that the voltage of the capacitor is equal to the voltage of the first cell group, controlling the sixth switch and the eighth switch to be turned off, and controlling the seventh switch and the ninth switch to be turned on.

A sixth aspect provides an apparatus for switching a connection status of a cell, including: a processor and a memory. The processor is coupled to a memory, and the processor executes one or more computer programs stored in the memory to cause the apparatus for switching the connection status of the cell to perform the method for switching the connection status of the cell according to any one of the fourth aspect or the fifth aspect.

A seventh aspect provides an electronic device. The electronic device includes at least two cell groups, an external interface, and a load. Each of the cell groups includes at least one cell, and the at least one cell is coupled between two poles of the cell group. The electronic device further includes the power supply system according to any one of the first aspect to the third aspect, and the apparatus for switching the connection status of the cell according to the sixth aspect.

An eighth aspect provides a computer-readable storage medium, for storing computer program code, where the computer program code includes instructions for executing the method for switching the connection status of the cell.

A ninth aspect provides a computer program product, including computer program code, where the computer instructions, when run on a computer, cause the computer to perform the method for switching the connection status of the cell.

The technical effects brought by any one of the possible implementations of the fourth aspect to the ninth aspect can be referred to the technical effects brought by different implementations of the first aspect to the third aspect above, and are not repeated herein.

BRIEF DESCRIPTION OF DRAWINGS

FIG. 29 shows a flowchart comprising S101-S103, according to an embodiment of this application.

FIG. 30 shows a flowchart comprising S201-S203, according to an embodiment of this application.

FIG. 31 shows a flowchart comprising S301-S303, according to an embodiment of this application.

DETAILED DESCRIPTION OF THE PREFERRED EMBODIMENT

The following describes the technical solutions in the embodiments of this application with reference to the accompanying drawings in the embodiments of this application. In the description of the embodiments of this application, unless otherwise specified, the character "I" indicates "or". For example, A/B may indicate A or B. In the text, "and/or" merely describes an association relationship between associated objects, and indicates that three relationships may exist. For example, A and/or B may indicate the following cases: Only A exists, both A and B exist, and only B exists. In addition, in the description of the embodiments of this application, "a plurality of" refers to two or more.

In the following, the terms "first" and "second" are used for descriptive purposes only and cannot be understood as indicating or implying relative importance or implying the number of technical features indicated. Therefore, a feature defined as "first" or "second" may explicitly or implicitly include one or more of such feature. In the description of this embodiment, "a plurality of" means two or more unless otherwise specified. In this application, the term "coupled" may be either a direct electrical connection or an indirect electrical connection via an intermediate medium, unless otherwise expressly specified and limited.

The following describes the technical solutions in the embodiments of this application with reference to the accompanying drawings in the embodiments of this application. Apparently, the described embodiments are only a part of, other than all of, the embodiments of this application.

The method for switching a connection status of a cell, the power supply system, and the electronic device according to the embodiments of this application may be applicable to electronic devices such as mobiles phones, tablet computers, notebook computers, ultra-mobile personal computers (ultra-mobile personal computer, UMPC), hand-held computers, netbooks, personal digital assistants (personal digital assistant, PDA), wearable electronic devices, virtual reality devices, or electric automobiles. The electronic device according to the embodiments of this application is mainly a portable power supply or a movable electronic device, and the electronic device includes at least a battery and a load that uses electricity.

Figure 3:
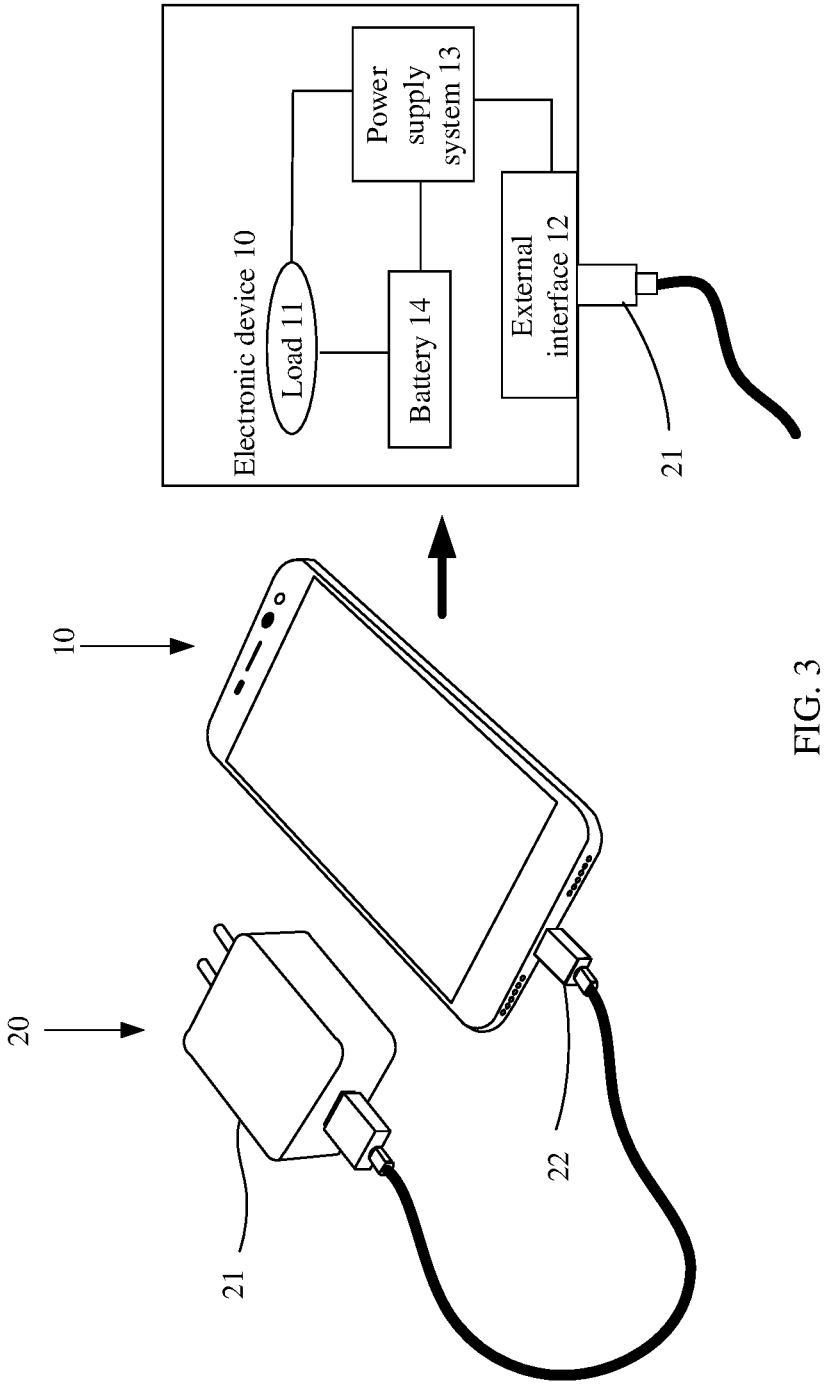
FIG. 3 is a schematic structural diagram of a system composed of a charger and an electronic device according to an embodiment of this application.

In this way, the solutions according to the embodiments of this application may be applied to a system shown in FIG. 3. The system includes an electronic device 10 and a charger 20. A battery 14 in the electronic device 10 may be charged by the charger 20 connected externally. Referring to FIG. 3 the charger 20 includes a charger body 21 and a plug 22 connected to the charger body 21 and the electronic device 10 further includes an external interface 12, a load 11, and a power supply system 13. The battery 14 includes a plurality of cells. In the embodiment of this application, the plurality of cells in the battery are described in a form of a plurality of cell groups. Generally, cells used in an electronic product are of the same specification (for example, the cells may have the same voltage and capacity), each cell group includes at least one cell, and at least one cell is coupled between two poles (positive+ and negative−) of the cell group. In the embodiments of this application, the cell group may be one cell. For example, in a small electronic device such as a mobile phone or a tablet computer, the voltage of one cell is enough to meet the system rated voltage Vbat of electronic device, and generally a similar small electronic device usually includes a small number of cells, such as 2-4 cells, and the cells are connected in parallel to supply power to the load. Therefore, connecting a plurality of cells in parallel mainly aims at providing a larger capacity to meet the requirement for prolonging the standby time of the device. For some large-scale devices requiring a higher system rated voltage Vbat such as electric automobiles and electric tools, the system rated voltage Vbat may have one or more high voltages, which may be several times of the voltage of one cell. Therefore, it is necessary to connect a plurality of cells in series in the cell group to reach the system rated voltage Vbat of the device, and then the plurality of cell groups are connected in parallel to supply power to the load. Therefore, the embodiment of this application does not limit the number of cell groups in the battery, the number of cells in the cell group, and the connection mode of the cells in the cell group. It can be understood that when a plurality of cells are included in the cell group, the cells may be connected in parallel or in series. The battery 14 is connected to the external interface 12 and the load 11 through the power supply system 13 according to the embodiment of this application. The embodiment of this application mainly describes switching of the connection status of the cell groups by the power supply system 13 during switching between a state in which the charger 20 charges the plurality of cell groups and a state in which the plurality of cell groups discharges to the load 11, so as to adapt to charging or discharging of the cell groups.

Figure 4:
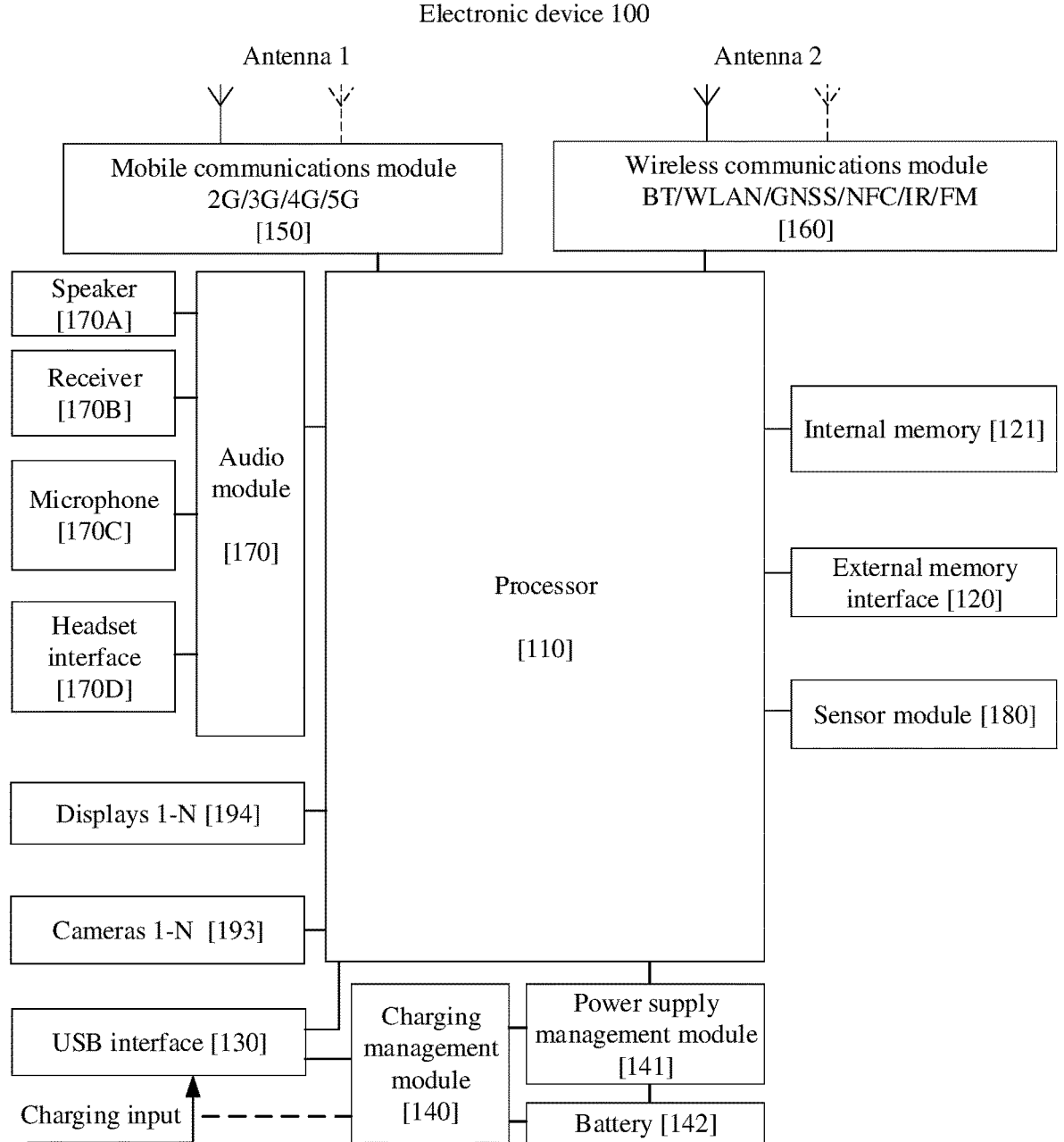
FIG. 4 is a schematic structural diagram of an electronic device according to an embodiment of this application.

For example, FIG. 4 shows a schematic structural diagram of an electronic device 100.

The electronic device 100 may include a processor 110, an external memory interface 120, an internal memory 121, a universal serial bus (universal serial bus, USB) interface 130, a charge management module 140, a power supply management module 141, a battery 142, an antenna 1, an antenna 2, a mobile communications module 150, a wireless communications module 160, an audio module 170, a speaker 170A, a receiver 170B, a microphone 170C, an headphone interface 170D, a sensor module 180, a camera 193, and a display 194, or the like.

It may be understood that, the schematic structure provided in the embodiments of the present invention does not constitute specific limitation to the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

For example, the processor 110 may include one or more processing units. For example, the processor 110 may include an application processor (application processor, AP), a modulation and demodulation processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The processor 110 may be further provided with a memory for storing instructions and data. In some embodiments the memory in processor 110 is a cache memory. The memory may store instructions or data that have just been used or recycled by the processor 110. If the processor 110 needs to reuse the instructions or data, the processor 110 may invoke the instructions or data directly from the memory. Repeated accesses are avoided and waiting time of the processor 110 is reduced thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The charge management module 140 is configured to receive a charge input from the charger. The charger may be a wireless charger or a wired charger. In some embodiments of wired charging, the charge management module 140 may receive a charging input from a wired charger through a USB interface 130. In some embodiments of wireless charging, the charge management module 140 may receive a wireless charging input through a wireless charging coil of the electronic device 100. When charging the battery 142, the charge management module 140 may further supply power to the electronic device through the power supply management module 141.

The power supply management module 141 is configured to connect the battery 142, the charge management module 140, and the processor 110. The power supply management module 141 receives an input from the battery 142 and/or the charge management module 140 to supply power to the processor 110, the internal memory 121, the display 194, the camera 193, and the wireless communications module 160. The power supply management module 141 may further be configured to monitor parameters such as battery capacity, battery cycle times, battery health status (leakage or impedance), and the like. In other embodiments, the power supply management module 141 may alternatively be disposed in the processor 110. In other embodiments, the power supply management module 141 and the charge management module 140 may alternatively be disposed in the same device.

The wireless communication function of the Electronic Device 100 may be implemented by the antenna 1, the antenna 2, the mobile communications module 150, the wireless communications module 160, the modulation and demodulation processor, and the baseband processor, or the like.

The antenna 1 and the antenna 2 are configured to transmit and receive electromagnetic wave signals. Each antenna in the electronic device 100 may be used to cover a single or a plurality of communication frequency bands. Different antennas may further be multiplexed to improve the utilization rate of the antennas. For example, the antenna 1 may be multiplexed to a diversity antenna of a wireless local area network. In other embodiments, the antennas may be used in combination with a tuning switch.

The mobile communications module 150 may provide a solution including wireless communication such as 2G/3G/4G/5G applied on the electronic device 100. The mobile communications module 150 may include one or more filters, switches power amplifiers, low noise amplifiers (low noise amplifier, LNA), and the like. The mobile communications module 150 may receive electromagnetic waves by the antenna 1, filter and amplify the received electromagnetic waves, and transmit the electromagnetic waves to the modulation and demodulation processor for demodulation. The mobile communications module 150 may alternatively amplify the signal modulated by the modulation and demodulation processor and convert the signal into electromagnetic waves through the antenna 1 to be radiated. In some embodiments, at least some of the functional modules of the mobile communications module 150 may be disposed in the processor 110. In some embodiments, at least some of the functional modules of the mobile communications module 150 may be disposed in the same device as at least some of the modules of the processor 110.

The modulation and demodulation processor may include a modulator and a demodulator. The modulator is configured to modulate a low frequency baseband signal to be sent into a medium and high frequency signal. The demodulator is configured to demodulate the received electromagnetic wave signal to a low frequency baseband signal. Then the demodulator transmits the demodulated low frequency baseband signal to the baseband processor for processing. After being processed by the baseband processor, the low frequency baseband signal is transmitted to the application processor. The application processor outputs a sound signal through an audio device (not limited to the speaker 170A and the receiver 170B or the like) or displays an image or video through the display 194. In some embodiments, the modulation and demodulation processor may be an independent device. In other embodiments, the modulation and demodulation processor may be independent of the processor 110 and may be located in the same device as the mobile communications module 150 or other functional modules.

The wireless communications module 160 may provide a wireless communication solution including a wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like, applied to the electronic device 100. The wireless communications module 160 may be one or more devices integrating one or more communication processing modules. The wireless communications module 160 receives electromagnetic waves via the antenna 2, modulates and filters the electromagnetic wave signal and transmits the processed signal to the processor 110. The wireless communications module 160 may alternatively receive a signal to be sent from the processor 110, modulate and amplify the signal, and convert the signal into electromagnetic waves through the antenna 2 to be radiated.

In some embodiments, the antenna 1 of the electronic device 100 is coupled to the mobile communications module 150 and the antenna 2 is coupled to the wireless communications module 160, so that the electronic device 100 may communicate with a network and other devices through the wireless communication technology. The wireless communication technologies may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include global positioning system (global positioning system, GPS), global navigation satellite system (global navigation satellite system, GLONASS), beidou navigation satellite system (beidou navigation satellite system, BDS), quasi-zenith satellite system (quasi-zenith satellite system, QZSS) and/or satellite based augmentation systems (satellite based augmentation systems, SBAS).

The electronic device 100 implements a display function through a GPU, a display 194, an application processor or the like. The GPU is a microprocessor for image processing and connects the display 194 and the application processor. The GPU is configured to perform mathematical and geometric calculations and to render graphics. The processor 110 may include one or more GPUs that execute program instructions to generate or change display information.

The display 194 is configured to display an image, a video, and the like. The display 194 includes a display panel. The display panel may adopt a liquid crystal display (liquid crystal display, LCD), organic light-emitting diodes (organic light-emitting diode, OLED), active matrix organic light-emitting diodes (active matrix organic light-emitting diodes, AMOLED) or active-matrix organic light-emitting diodes (active-matrix organic light-emitting diodes, AMOLED), flexible light-emitting diodes (flexible light-emitting diodes, FLED), Minilized, MicroLed, Micro-oLed, quantum dot light-emitting diodes (quantum dot light-emitting diodes, QLED), or the like. In some embodiments, the electronic device 100 may include one or N displays 194. N is a positive integer greater than 1. The electronic device 100 may implement a photographing function through an ISP, a camera 193, a video codec, a GPU, a display 194, an application processor, or the like.

The ISP is configured to process data fed back by the camera 193. For example, when taking a picture, a shutter is opened, light is transmitted to a camera photosensitive element through a lens, and an optical signal is converted into an electrical signal, which is transmitted to the ISP for processing and converted into an image visible to naked eyes. The ISP may further perform algorithm optimization on the noise, brightness, and skin color of the image. The ISP may further perform parameter optimization on exposure, color temperature, or a like of the photographing scene. In some embodiments, the ISP may be disposed in the camera 193.

The camera 193 is configured to capture a still image or video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal to an electrical signal, which is then transmitted to the ISP for conversion into a digital image signal. The ISP outputs the digital image signal to the DSP for processing. The DSP converts the digital image signal into an image signal of a standard RGB or YUV format. In some embodiments, the electronic device 100 may include one or N cameras 193. N is a positive integer greater than 1.

The external memory interface 120 may be configured to connect an external memory card such as a Micro SD card, to enable extension of the storage capacity of the electronic device 100. The external memory card communicates with the processor 110 through the external memory interface 120 to implement a data storage function. For example, music, video, and other files are saved in the external memory card.

The internal memory 121 may be configured to store one or more computer programs, and the one or more computer programs include an instruction. The processor 110 may run the foregoing instructions stored in the internal memory 121, so that the electronic device 100 performs the method, various functional applications, data processing, and the like provided in some embodiments of this application. The internal memory 121 may include a program storage area and a data storage area. The stored program area may store an operating system; and the stored program area may further store one or more applications (such as galleries or contacts). The storage data area may store data (for example, photos or contacts) created during use of the electronic device 101. In addition, the internal memory 121 may include a high-speed random access memory and may further include a non-volatile memory such as one or more disk storage devices, flash memory devices, or universal flash storage (universal flash storage, UFS). In other embodiments, the processor 110 causes the electronic device 100 to perform the methods provided in embodiments of this application, as well as various functional applications and data processing, by executing the instructions stored in the internal memory 121 and/or the instructions stored in the memory disposed in the processor.

The electronic device 100 may implement an audio function through an audio module 170, a speaker 170A, a receiver 170B, a microphone 170C, an earphone interface 170D, an application processor, or the like, for example, music playing or recording.

The audio module 170 is configured to convert a digital audio information into an analog audio signal to output and is further configured to convert an analog audio input into a digital audio signal. The audio module 170 may further be configured to encode and decode an audio signal. In some embodiments, the audio module 170 may be disposed in the processor 110 or some of functional modules of the audio module 170 may be disposed in the processor 110.

The speaker 170A, also referred to as a "horn", is configured to convert an audio electrical signal into a sound signal. The electronic device 100 may be used to listen to music or listen to a hands-free call through the speaker 170A.

The receiver 170B, also referred to as a "handset", is configured to convert an audio electrical signal into a sound signal. When the electronic device 100 is used to answer a call or a voice message, the receiver 170B may be brought close to a human ear for listening.

The microphone 170C, also referred to as "MIC" and "mike", is configured to convert a sound signal into an electrical signal. When making a call or sending a voice message, a user may make a sound by approaching the microphone 170C through the human mouth and input a voice signal to the microphone 170C. The electronic device 100 may be provided with one or more microphones 170C. In other embodiments, the electronic device 100 may be provided with two microphones 170C which in addition to collecting sound signals may also implement a noise reduction function. In other embodiments, the electronic device 100 may also be provided with three, four, or more microphones 170C to implement acquisition of sound signals, noise reduction, recognition of sound sources, directional recording functions, and the like.

The headphone interface 170D is configured to connect a wired headphone. The headphone interface 170D may be a USB interface 130, or a 3.5 mm open mobile terminal platform (open mobile terminal platform, OMTP) standard interface, or a cellular telecommunications industry association of the USA (cellular telecommunications industry association of the USA, CTIA) standard interface.

The sensor module 180 may include a pressure sensor, a gyro sensor, an air pressure sensor, a magnetic sensor, an acceleration sensor, a distance sensor, a proximity light sensor, a fingerprint sensor, a temperature sensor, a touch sensor, an ambient light sensor, a bone conduction sensor, or the like.

In embodiments of this application, a touch sensor is also referred to as a "touch device". The touch sensor may be disposed on the display 194, and a touch screen, also referred to as a "touch control screen", is formed by the touch sensor and the display 194. The touch sensor is configured to detect a touch operation acting on or near the touch sensor. The touch sensor may pass a detected touch operation to the application processor to determine a touch event type. Visual output related to touch operation may be provided through the display. In other embodiments, a touch panel provided with a touch sensor array formed by a plurality of touch sensors may be attached to the surface of the display panel in an external form. In other embodiments, the touch sensor may alternatively be in a position different from that of the display 194. In the embodiment of this application, the form of the touch sensor is not limited, for example, the touch sensor may be a device such as a capacitor or a piezoresistor.

In addition, the above-mentioned electronic device may further include one or more components such as a key 190, a motor 191, an indicator 192, and a subscriber identification module (subscriber identification module, SIM) card interface 195, which are not limited by the embodiments of this application.

Figure 5:
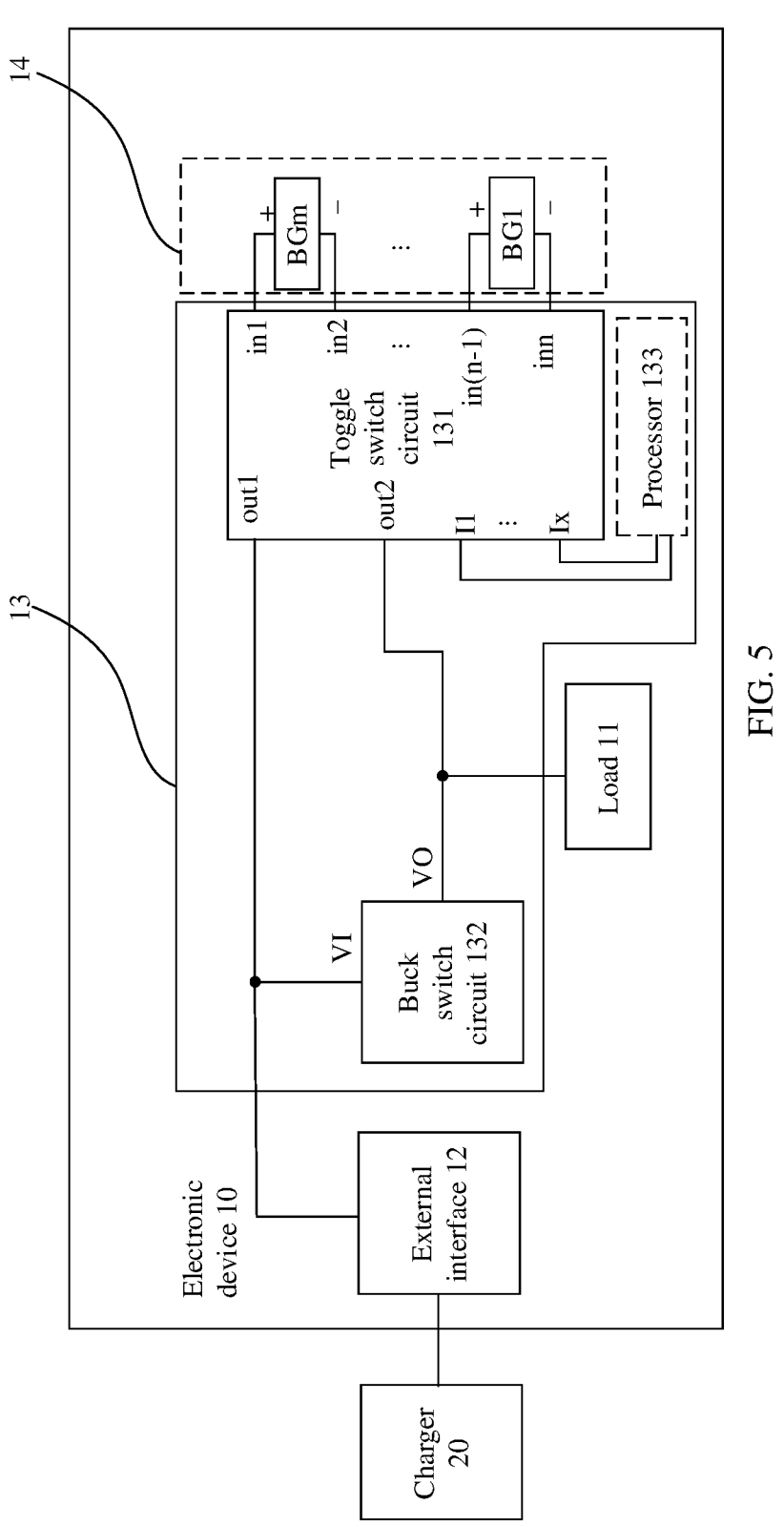
FIG. 5 is a schematic structural diagram of a power supply system according to still another embodiment of this application.

In combination with FIG. 5, an embodiment of this application provides a power supply system 13, applicable to an electronic device 10. The electronic device 10 includes a battery 14, an external interface 12, and a load 11. The battery 14 includes a plurality of cell groups (BG1, BG2, . . . , BGn), the load 11 may be any one of the electrical devices shown in FIG. 4, and the external interface 12 may be the USB interface described above. The load 11 may be any of the electrical devices shown in FIG. 4.

Referring to FIG. 5 the power supply system 13 includes a toggle switch circuit 131 and a buck switch circuit 132.

The toggle switch circuit 131 includes a first output end out1, a second output end out2, a plurality of input ends (in1, in2, . . . inn) and a plurality of control ends I (I1-Ix). Two poles (+,–) of the cell group (BG1, BG2, . . . , BGm) are each coupled to an input end (in1, in2, . . . , inn) of the toggle switch circuit 131. The first output end out1 of the toggle switch circuit 131 is coupled to an input end VI of the buck switch circuit 132, the second output end out2 of the toggle switch circuit 131 is coupled to an output end VO of the buck switch circuit 132, and the input end VI of the buck switch circuit 132 is coupled to the external interface 12. The output end VO of the buck switch circuit 132 is further coupled to the load 11 of the electronic device 10, and the external interface 12 is configured to connect the charger 20. For example, as shown in FIG. 3, the plug 22 of the charger 20 can be inserted into the external interface 12. Related functions of the toggle switch circuit 131 may be configured or controlled by the processor 133, for example, the processor 133 sends a control signal to the control ends I (I1-Ix) of the toggle switch circuit 131 for configuration. In this way, as shown in FIG. 5, the control end I of the toggle switch circuit 131 is coupled to the control end I/O of the processor 133. The processor 133 includes a plurality of control ends I/O, and the plurality of control ends I of the toggle switch circuit 131 and the plurality of control ends I/O of the processor 133 may be one-to-one coupled. The processor 133 may be the processor 110 provided in FIG. 3 or a separately disposed processor and the control end I/O of the processor 133 may be an interface to the processor 110. The processor 133 may also be an electrical device in the load 11.

Figure 1:
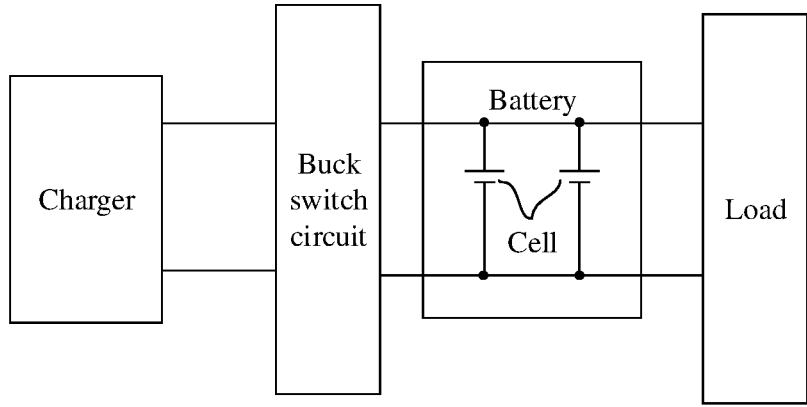
FIG. 1 is a schematic structural diagram of a power supply system according to an embodiment of this application.
Figure 2:
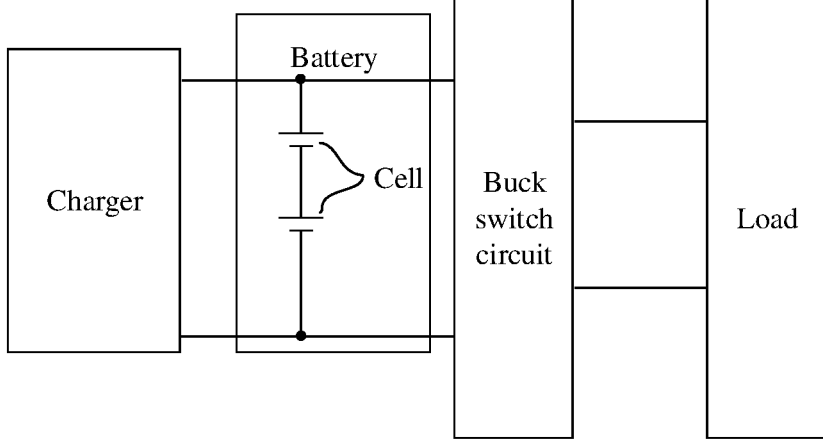
FIG. 2 is a schematic structural diagram of a power supply system according to another embodiment of this application.

The operation principle of the power supply system provided in FIG. 5: The toggle switch circuit 131 is configured to switch the connection status of the at least two cell groups (BG1, BG2, . . . , BGm) to be serially-connected or parallelly-connected. When the external interface 12 is inserted into the charger 20 to charge the at least two cell groups (BG1, BG2, . . . , BGm), the toggle switch circuit 131 is configured to switch the connection status of the at least two cell groups (BG1, BG2, . . . , BGm) to be serially-connected, so that the at least two cell groups (BG1, BG2, . . . , BGm) are connected in series between the first output end out1 of the toggle switch circuit 131 and the grounding end GND, and the buck switch circuit 132 is configured to adjust the voltage of the charger to the system rated voltage Vbat and output the voltage to the output end VO of the buck switch circuit 132. In this way, the charger 20 may directly charge the cell groups (BG1, BG2, . . . , BGm) in the serially-connected state, which, as compared with the solution provided in FIG. 1, can avoid the situation of charging the cell groups (BG1, BG2, . . . , BGm) that are in a parallelly-connected state by a charger through a buck switch circuit, reduce the loss in the charging process, and avoid the excessive heating of the mobile phone during charging, thereby improving the charging efficiency. In addition, in the charging process of the mobile phone, the voltage of the charger may be adjusted to the system rated voltage Vbat through the buck switch circuit 132 and outputted to the output end VO of the buck switch circuit 132 to supply power to the load, thereby avoiding power failure of the mobile phone in the charging process and ensuring normal operating of the mobile phone in the charging process. When supplying power to the load 14 by the at least two cell groups, the toggle switch circuit 131 is configured to switch the connection status of the at least two cell groups (BG1, BG2, . . . , BGm) to be parallelly-connected, so that the at least two cell groups (BG1, BG2, . . . , BGm) are connected in parallel between the second output end out2 of the toggle switch circuit 131 and the grounding end GND, to supply power to the load. Compared with the solution provided in FIG. 2, the solution may directly enable the cell groups (BG1, BG2, . . . , BGm) to be connected in parallel to supply power to the load, and the buck switch circuit is no longer used to reduce the voltage of the serially-connected cell groups in the process of supplying power to the load by using the cell group, so that the loss caused by the buck switch circuit to the cell groups in the buck process can be avoided, and standby time of the mobile phone can be improved.

Based on the power supply system shown in FIG. 5, in order to switch the connection status of the cell groups (BG1, BG2, . . . , BGm), the toggle switch circuit 132 includes a plurality of switches, and a control end of any one of the switches is coupled to an control end I (I1-Ix) of the toggle switch circuit 132. The toggle switch circuit 131 is configured to control the status of one or more of the switches to switch the connection status of the at least two cell groups to a serially-connected state or a parallelly-connected state.

Figure 6:
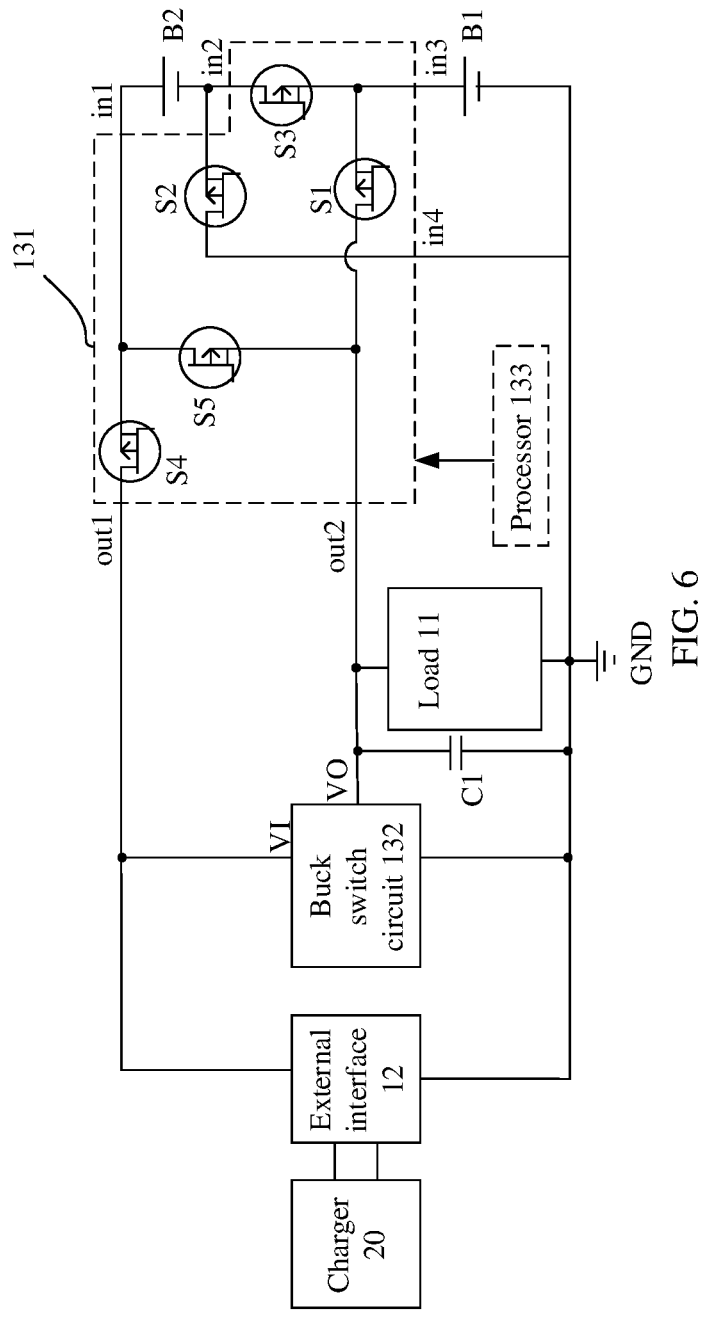
FIG. 6 is a schematic structural diagram of a power supply system according to yet another embodiment of this application.

Specifically, referring to FIG. 6, for example, the toggle switch circuit 131 includes five switches (S1-S5) and the battery includes two battery packs, each of which includes one cell. Two cells (B1, B2) are shown in FIG. 6. A first end of the switch S1 is coupled to the second output end out2 of the toggle switch circuit 131, a second end of the switch S1 is coupled to the third input end in3 of the toggle switch circuit 131, and a control end of the switch S1 is coupled to a control end I1 of the toggle switch circuit 131. A first end of the switch S2 is coupled to the fourth input end in4 of the toggle switch circuit 131, a second end of the switch S2 is coupled to the second input end in2 of the toggle switch circuit 131, and a control end of the switch S2 is coupled to a control end I2 of the toggle switch circuit 131. A first end of the switch S3 is coupled to the second input end in2 of the toggle switch circuit 131, a second end of the switch S3 is coupled to the third input end in3 of the toggle switch circuit 131, and a control end of the switch S3 is coupled to a control end I3 of the toggle switch circuit 131. A first end of the switch S4 is coupled to the first output end out1 of the toggle switch circuit 131, a second end of the switch S4 is coupled to the first input end in1 of the toggle switch circuit 131, and a control end of the switch S4 is coupled to a control end I4 of the toggle switch circuit 131. A first end of the switch S5 is coupled to the second output end out of the toggle switch circuit 131, a second end of the switch S5 is coupled to the first input end in1 of the toggle switch circuit 131, and a control end of the switch S5 is coupled to a control end I5 of the toggle switch circuit 131. A positive pole (+) of the first cell B1 is coupled to the third input end in3 of the toggle switch circuit 131, a negative pole (−) of the first cell B1 is coupled to the fourth input end in4 of the toggle switch circuit 131, a positive pole (+) of the second cell B2 is coupled to the first input end in1 of the toggle switch circuit 131, a negative pole (−) of the second cell B2 is coupled to the second input end in2 of the toggle switch circuit 131, and the fourth input end in4 of the toggle switch circuit 131 is coupled to the grounding end GND. In this way, as shown in FIG. 6, S1, S2, and S5 in the toggle switch circuit 131 may be controlled to be turned on, and S3 and S4 in the toggle switch circuit 131 may be controlled to be turned off, so that the connection status of the cells B1 and B2 is switched to be parallelly-connected. Alternatively, S1, S2, and S5 in the toggle switch circuit 131 are controlled to be turned off and S3 and S4 in the toggle switch circuit 131 are controlled to be turned on, so that the connection status of the cells B1 and B2 is switched to be parallelly-connected.

The switches in the toggle switch circuit 131 are mainly switched between two states, i.e., turned on and turned off, under the control of the respective control ends. When one of the switches is in the turned-on state, the first end of the switch is short-circuited (conductive) with the second end. When a switch is in a turned-off state, the first end of the switch is open from the second end. Specifically, in this embodiment and the following embodiments, the switch may adopt a switch transistor, where the first end of the switch may be a source of the switch transistor and the second end of the switch may be a drain of the switch transistor; or the first end may be the drain of the switch transistor and the second end of the switch may be the source of the switch transistor; and the control end of the switch is a gate of the switch transistor. In a case in which the switch transistor is an N-type transistor, when the gate is at a high level, the switch is turned on, and when the gate is at a low level, the switch is turned off. In case in which the switch transistor is a P-type transistor, when the gate is at a low level, the switch is turned on, and when the gate is at a high level, the switch is turned off. The switches in the embodiment corresponding to FIG. 6 and in the following embodiments are mainly described with an N-type transistor as an example. Specifically, when the processor 133 controls the status of the switch, for example, when the switch is an N-type transistor, the processor 133 may control the switch to be turned on by outputting a high-level signal to the gate of the N-type transistor or outputting a low-level signal to the gate of the N-type transistor, to control the switch to be turned off. Referring to FIG. 6, generally in order to ensure the stability of the voltage outputted to the load 11 by the buck switch circuit 132 or the parallelly-connected cell groups, the output end VO of the buck switch circuit 132 is further connected to a first capacitor C1, where C1 is connected in series between the output end VO of the buck switch circuit 132 and the grounding end GND, and a voltage-resistance value of C1 is greater than or equal to the system rated voltage Vbat.

Figure 7:
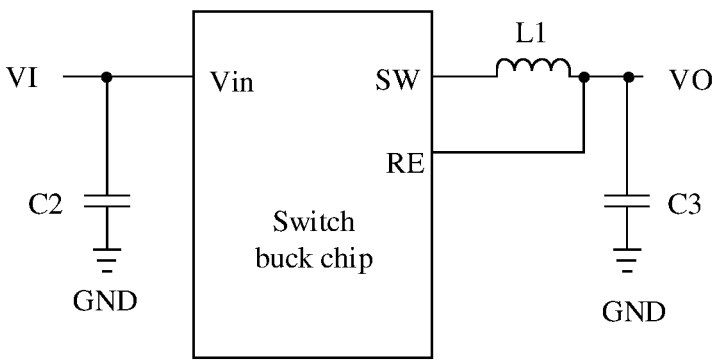
FIG. 7 is a schematic structural diagram of a switch buck circuit according to an embodiment of this application.
Figure 8:
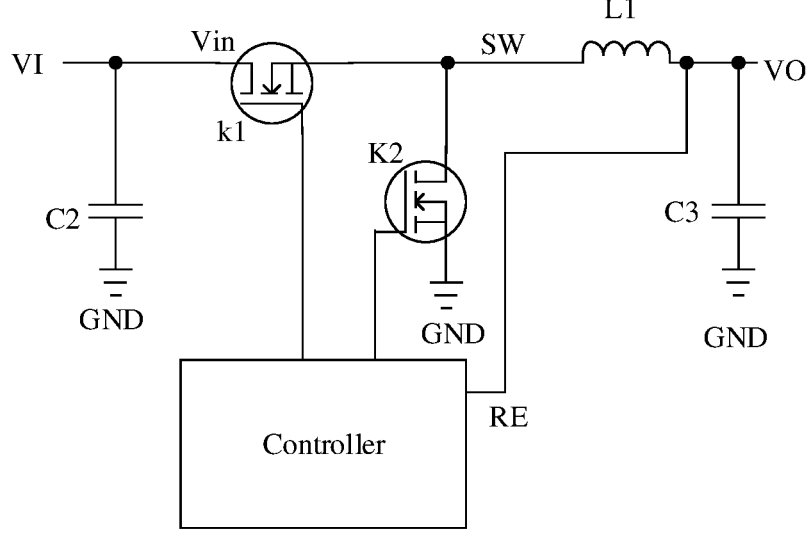
FIG. 8 is a schematic structural diagram of a switch buck circuit according to another embodiment of this application.

FIG. 7 provides a specific structure of the buck switch circuit 132, including a switch buck chip, capacitors C2, C3, and an inductor L1. The switch buck chip is mainly integrated with a switch tube and a controller of the switch tube, where a power supply end Vin of the switch buck chip serves as the input end VI of the buck switch circuit 132, and the output end SW of the switch buck chip is connected to the output end VO of the buck switch circuit 132 through the inductor L1. The capacitor C2 is coupled between the power supply end Vin of the switch buck chip and the grounding end GND, the capacitor C3 is coupled between the output end VO of the buck switch circuit 132 and the grounding end GND, and the output end VO of the buck switch circuit 132 is further coupled to a feedback end RE of the switch buck chip. The switch buck chip mainly controls the status of the internal integrated switch tube through the controller to reduce the voltage of the input end VI and output the voltage to the output end VO. In addition, the voltage outputted from the output end VO may be sampled to implement closed loop processing of buck control. Specifically, as shown in FIG. 8, the switch buck chip is mainly integrated with switch tubes k1, k2, and a controller of the switch tubes, where the switch tubes may adopt MOSFET or IGBT. As shown in FIG. 8, both k1 and k2 adopt N-type MOSFET, where a source of k1 is connected to the SW, a drain of k1 is connected to Vin, a source of k2 is connected to the grounding end GND, and a drain of k2 is connected to the SW. The grids of K1 and K2 are each connected to a controller and the feedback end RE is connected to the controller. In some examples, k2 may alternatively be replaced by a reverse-connected diode D, where an anode of the diode is connected to the grounding end GND and a cathode of the diode D is connected to the SW.

Figure 9:
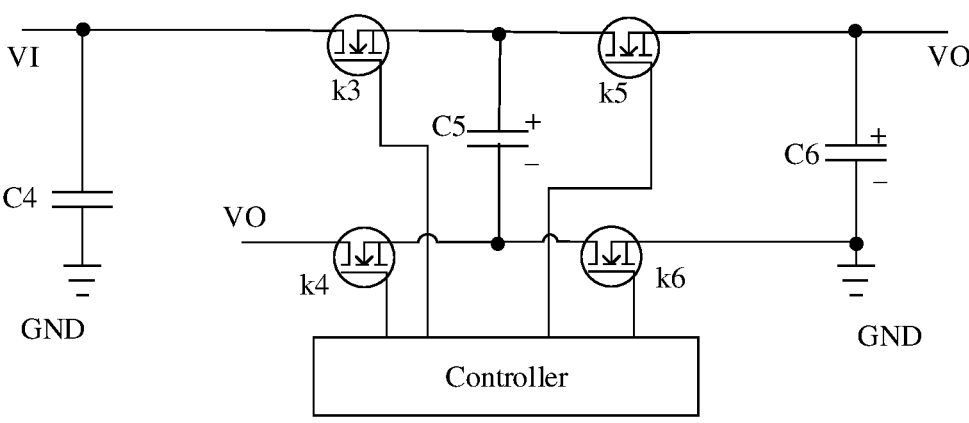
FIG. 9 is a schematic structural diagram of a switch buck circuit according to still another embodiment of this application.

The buck switch circuit 132 may adopt a buck charge pump. FIG. 9 provides a typical 2:1 buck charge pump. The buck switch circuit 132 includes a controller, switches k3, k4, k5, k6, and capacitors C4, C5, C6, where a first end of k3 is coupled to the input end VI of the buck switch circuit 132, a second end of k3 is coupled to a first end of k5, and a second end of k5 is coupled to the output end VO of the buck switch circuit 132; C4 is coupled between the input end VI of the buck switch circuit 132 and the grounding end GND; a first end of k4 is coupled to the output end VO of the buck switch circuit 132, a second end of k4 is coupled to a first end of k6, and the second end of k6 is coupled to the grounding end GND; a positive pole of C5 is coupled to a first end of k5 and a negative pole of C5 is coupled to a first end of k6; a positive pole of C6 is coupled to the output end VO of the buck switch circuit 132, and a negative pole of C6 is coupled to the grounding end GND. The control ends of the switches k3, k4, k5 and k6 are coupled to a controller. The controller can generate two timing signals, i.e., a first driving timing signal and a second driving timing signal, with a non-overlapping phases. The first driving timing signal and the second driving timing signal being with non-overlapping phases indicates that the first driving timing signal and the second driving timing signal do not simultaneously be at a high level or at a low level. The first driving timing signal is outputted to the control ends of k3 and k4, and the second driving timing signal is outputted to the control ends of k5 and k6, so that in the first stage, when the first driving timing signal controls k3 and k4 to be turned on and the second driving timing signal controls k5 and k6 to be turned off, the positive pole of C5 is connected to VI, and the negative pole of C5 is connected to VO. C6 is coupled between VO and the grounding end GND, and therefore the voltage inputted to VI charges C5 and C6 connected in series. In this case, part of the current through the capacitor C5 flows through C6 and the other part flows to the load through VO. In the second stage, when the first driving timing signal controls k3 and k4 to be turned off and the second driving timing signal controls k5 and k6 to be turned on, the positive pole of C5 is connected to VO and the negative pole of C5 is connected to the grounding end, then C5 and C6 are connected in parallel, and charge may be transmitted on C5 and C6 until the voltages of C5 and C6 are equal, and C5 and C6 are connected in parallel to provide a voltage to the load through VO. Therefore, in the first stage, a relationship between the voltage $V_{VI}$ of VI with the voltage $V_{C5}$ of C5 and the voltage $V_{C6}$ of C6 is expressed as $V_{VI}=V_{C5}+V_{C6}$. In the second stage, $V_{C5}=V_{C6}$. If the voltage at two ends of the capacitor is constant, for the voltage VO, $V_{VO}=V_{C5}=V_{C6}=V_{VI}/2$. Therefore, 2:1 voltage reduction is implemented. Certainly, FIG. 9 describes only a typical buck voltage pump, and it can be understood that any buck switch circuit based on the principle is suitable for this application.

Figure 10:
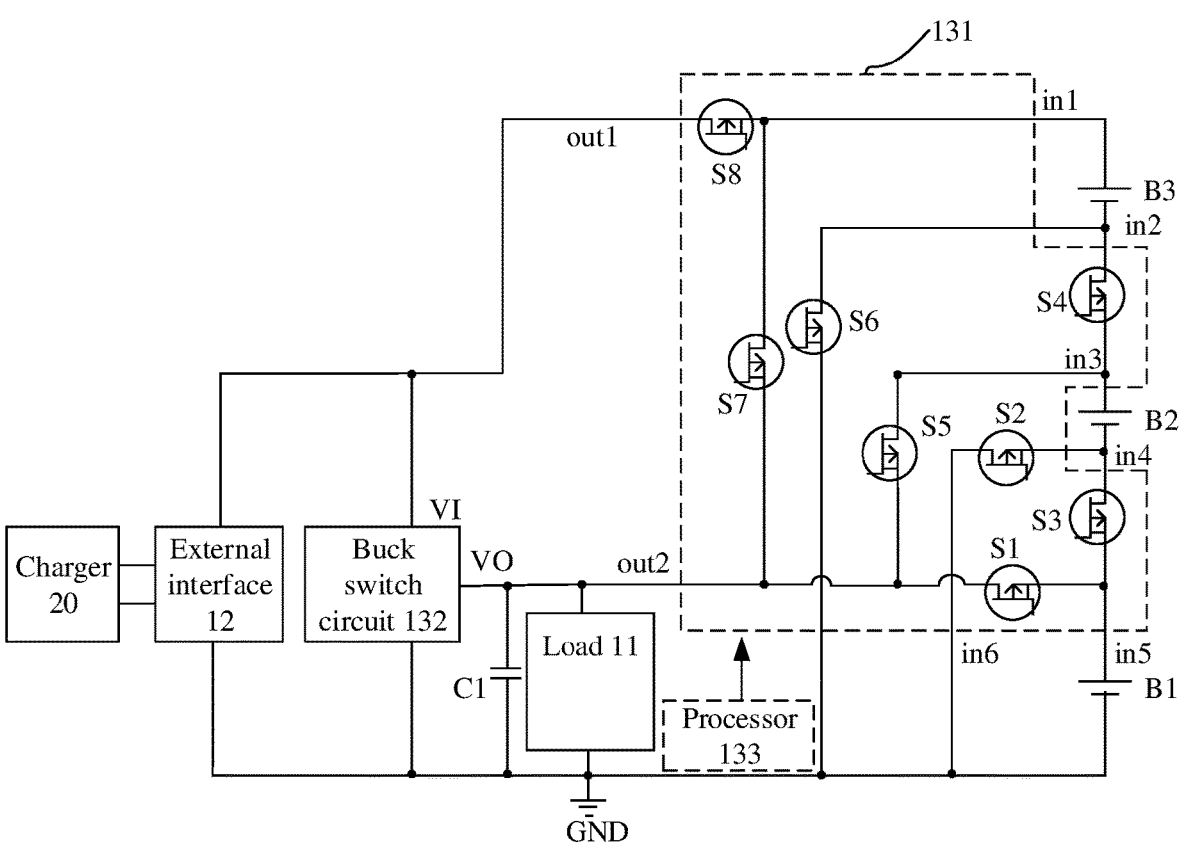
FIG. 10 is a schematic structural diagram of a power supply system according to another embodiment of this application.

In addition, for example, the toggle switch circuit includes eight switches and three cell groups. Referring to FIG. 10, the toggle switch circuit 131 includes eight switches (S1-S8), the battery includes three battery packs, each of which includes one cell. Three cells (B1, B2, B3) are shown in FIG. 10. A first end of the switch S1 is coupled to the second output end out2 of the toggle switch circuit 131, a second end of the switch S1 is coupled to a fifth input end in5 of the toggle switch circuit 131, and a control end of the switch S1 is coupled to a control end I1 of the toggle switch circuit 131. A first end of the switch S2 is coupled to a sixth input end in6 of the toggle switch circuit 131, a second end of the switch S2 is coupled to the fourth input end in4 of the toggle switch circuit 131, and a control end of the switch S2 is coupled to a control end I2 of the toggle switch circuit 131. A first end of the switch S3 is coupled to the fourth input end in4 of the toggle switch circuit 131, a second end of the switch S3 is coupled to the fifth input end in5 of the toggle switch circuit 131, and a control end of the switch S3 is coupled to a control end I3 of the toggle switch circuit 131. A first end of the switch S4 is coupled to the second input end in2 of the toggle switch circuit 131, a second end of the switch S4 is coupled to the third input end in3 of the toggle switch circuit 131, and a control end of the switch S4 is coupled to a control end I4 of the toggle switch circuit 131. A first end of the switch S5 is coupled to the second output end out2 of the toggle switch circuit 131, a second end of the switch S5 is coupled to the third input end in3 of the toggle switch circuit 131, and a control end of the switch S5 is coupled to a control end I5 of the toggle switch circuit 131. A first end of the switch S6 is coupled to the sixth input end in6 of the toggle switch circuit 131, a second end of the switch S6 is coupled to the second input end in2 of the toggle switch circuit 131, and a control end of the switch S6 is coupled to a control end I6 of the toggle switch circuit 131. A first end of the switch S7 is coupled to a second output end out2 of the toggle switch circuit 131, a second end of the switch S7 is coupled to the first input end in1 of the toggle switch circuit 131, and a control end of the switch S7 is coupled to a control end I7 of the toggle switch circuit 131. A first end of the switch S8 is coupled to the first output end out1 of the toggle switch circuit 131, a second end of the switch S8 is coupled to the first input end in1 of the toggle switch circuit 131, and a control end of the switch S8 is coupled to a control end I8 of the toggle switch circuit 131. A positive pole (+) of the first cell B1 is coupled to the fifth input end in5 of the toggle switch circuit 131, a negative pole (−) of the first cell B1 is coupled to the sixth input end in6 of the toggle switch circuit 131, a positive pole (+) of the second cell B2 is coupled to the third input end in3 of the toggle switch circuit 131, a negative pole (−) of the second cell B2 is coupled to the fourth input end in4 of the toggle switch circuit 131, a positive pole (+) of the third cell B3 is coupled to the first input end in1 of the toggle switch circuit 131, a negative pole (−) of the third cell B3 is coupled to the second input end in2 of the toggle switch circuit 131, and the sixth input end in6 of the toggle switch circuit 131 is coupled to the grounding end GND.

In this way, as shown in FIGS. 10, S1, S2, S5, S6, and S7 in the toggle switch circuit 131 may be controlled to be turned on, and S3, S4, and S8 in the toggle switch circuit 131 may be controlled to be turned off, so that the connection status of the cells B1, B2, and B3 is switched to be parallelly-connected. Alternatively, S1, S2, S5, S6, and S7 in the toggle switch circuit 131 are controlled to be turned off and S3, S4, and S8 in the toggle switch circuit 131 are controlled to be turned on, so that the connection status of the cells B1, B2, and B3 is switched to be parallelly-connected.

When the connection status of each cell group is directly switched between serially-connected and parallelly-connected according to the solution provided in the embodiment, because there is a response time for switching between serially-connected and parallelly-connected states, the load power-off situation may occur when a plurality of cell groups are switched between serially-connected and parallelly-connected states. For example, in a case that the connection status of the cell groups is serially-connected state and the charger charges the cell groups, if the charger is suddenly pulled out or the cell groups are fully charged and the charger is pulled out, the charger stops supplying power to the buck switch circuit. In this case, the cell groups are connected in series and then supplies power to the buck switch circuit. If the status of the switches in the toggle switch circuit is controlled to switch the connection status of the cell groups to the parallelly-connected state to supply power to the load, the load power-off situation may occur because there is a response time for switching between turned-on and turned-off states of the switches. As shown in FIG. 6, when S1, S2 and S5 are turned off and S3 and S4 are turned on, the cell groups are in the serially-connected state, and the charger charges the cell group. When the charger is pulled out, it is necessary to turn on S1, S2, and S5 and turn off S3 and S4. At the moment of switching, for example, after S3 and S4 are turned off, S1, S2, and S5 are delayed to be turned on, the cell groups stop supplying power to the buck switch circuit, no cell group is connected to the load during the period, and therefore the load may be powered off.

In addition, in a case that the cell groups are connected in parallel to supply power to the load, if the charger is inserted into the external interface, the status of the switches in the toggle switch circuit is triggered and controlled to switch the connection status of the cell groups to be serially-connected for charging, and in this case, the charger supplies power to the load through the buck switch circuit. In the process of controlling the status of the switches in the toggle switch circuit to switch the connection status of the cell groups to be serially-connected, if the charger is pulled out, the charger stops supplying power to the buck switch circuit. In this case, if no cell group is connected to the load to supply power to the load, the load may be powered off. As shown in FIG. 6, when S1, S2, and S5 are turned on and S3 and S4 are turned off, the cell groups are in the parallelly-connected state. In this case, the charger is inserted to charge the cell groups, and the charger supplies power to the load through the buck switch circuit at the same time. In addition, it is necessary to control S1, S2, and S5 to be turned off and S3 and S4 to be turned on, so as to switch the connection status of the cell groups to be serially-connected, so that S3 and S4 are delayed to be turned on at the instant of switching, such as when S1, S2, and S5 are turned off, and during the period, if the charger is pulled out and no cell group is connected to the load to supply power to the load, the load may be powered off.

To resolve the problem that the load is powered off when the connection mode of the cell groups is switched between serially-connected state and parallelly-connected state, an embodiment of this application further provides a method for switching a connection status of a cell, which can prevent power-off of the load during the process of switching the cell groups between the serially-connected state and the parallelly-connected state. The details are in the following.

First, an example in which the cell groups are switched from the serially-connected state to the parallelly-connected state is used for description in the following.

Scenario 1: When the cell groups are fully charged, the connection status of the cell groups is triggered to switch from the serially-connected state to the parallelly-connected state.

As shown in FIG. 5, when the external interface 12 is inserted into the charger 20 to charge the at least two cell groups, the toggle switch circuit 131 is configured to switch the connection status of the at least two cell groups (BG1, BG2, . . . , BGm) to be serially-connected, so that the at least two cell groups (BG1, BG2, . . . , BGm) are connected in series between the first output end out1 of the toggle switch circuit 131 and the grounding end GND, and the buck switch circuit 132 is configured to adjust a voltage of the charger 20 to a system rated voltage Vbat and output the voltage to the output end VO of the buck switch circuit 132. In this case, the charger 20 charges the cell groups (BG1, BG2, . . . , BGm) connected in series, and the charger 20 supplies power to the load 11 through the buck switch circuit 132. Subsequently, if it is determined that the cell groups (BG1, BG2, . . . , BGm) are fully charged, switching of the connection status of the cell groups (BG1, BG2, . . . , BGm) from the serially-connected state to the parallelly-connected state is triggered, specifically including the following steps:

S101: When it is determined that charging is completed, control a buck switch circuit 132 to adjust a voltage outputted by an output end VO of the buck switch circuit 132 to a voltage of a first cell group BG1 in at least two cell groups (BG1, BG2, . . . , BGm).

The first cell group BG1 may be any cell group. In step S101, a processor 133 may detect a charging current of a first output end out1 of the toggle switch circuit 131 and determine that charging is completed when the charging current remains at a predetermined constant value for a predetermined period of time and does not become small again. In this case, the charger 20 outputs the voltage of the first cell group BG1 to the load 11 through a buck switch circuit 132 to supply power to the load 11. In the process, the charger 20 supplies power to the load 11 through the buck switch circuit 132, and the at least two cell groups (BG1, BG2, . . . , BGm) connected in series prepare power for the load 11 for the load through the buck switch circuit 132, to ensure that the load 11 is continuously powered.

S102: Control the toggle switch circuit 131 such that the first cell group BG1 outputs a voltage to a second output end out2 of the toggle switch circuit 131.

In step S102, the processor 133 controls the toggle switch circuit 131 to output the voltage by the first cell group BG1 to the second output end out2 of the toggle switch circuit 131. Therefore, the first cell group BG1 is connected in parallel with the load 11. In step S102, the voltage outputted by the second output end out2 of the toggle switch circuit 131 is equal to the voltage of the first cell group BG1, and the charger 20 still outputs the voltage of the first cell group BG1 to the load 11 through the buck switch circuit 132 to supply power to the load 11. The first cell group BG1 prepares power for the load, and only when the charger 20 is suddenly powered off (for example, pulled out), the first cell group BG1 supplies power to the load 11. In this way, in the process, the load 11 is ensured to be continuously powered.

S103: Control the toggle switch circuit 131 to switch the connection status of the at least two cell groups (BG1, BG2, . . . , BGm) to the parallelly-connected state, so that the at least two cell groups (BG1, BG2, . . . , BGm) are connected in parallel between the second output end out2 of the toggle switch circuit 131 and the grounding end GND.

In step S103, when the connection status of the two cell groups (BG1, BG2, . . . , BGm) is switched to the parallelly-connected state, only other cell groups (BG2, . . . , BGm) except the first cell group BG1 need be connected in parallel between the second output end out2 of the toggle switch circuit 131 and the grounding end GND. In the switching process of step S103, the charger 20 outputs the voltage of the first cell group BG1 to the load 11 through the buck switch circuit 132 to supply power to the load 11, and the first cell group BG1 is connected in parallel with the load to prepare power for the load, to ensure that the load 11 is continuously powered.

Figure 11:
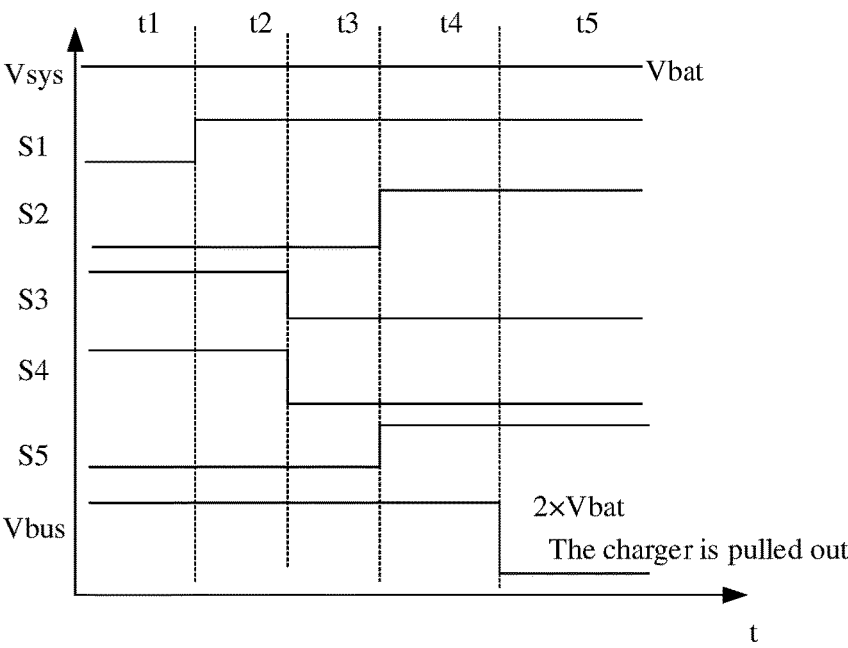
FIG. 11 is a timing diagram of a signal at a control end of a switch according to an embodiment of this application.
Figure 12:
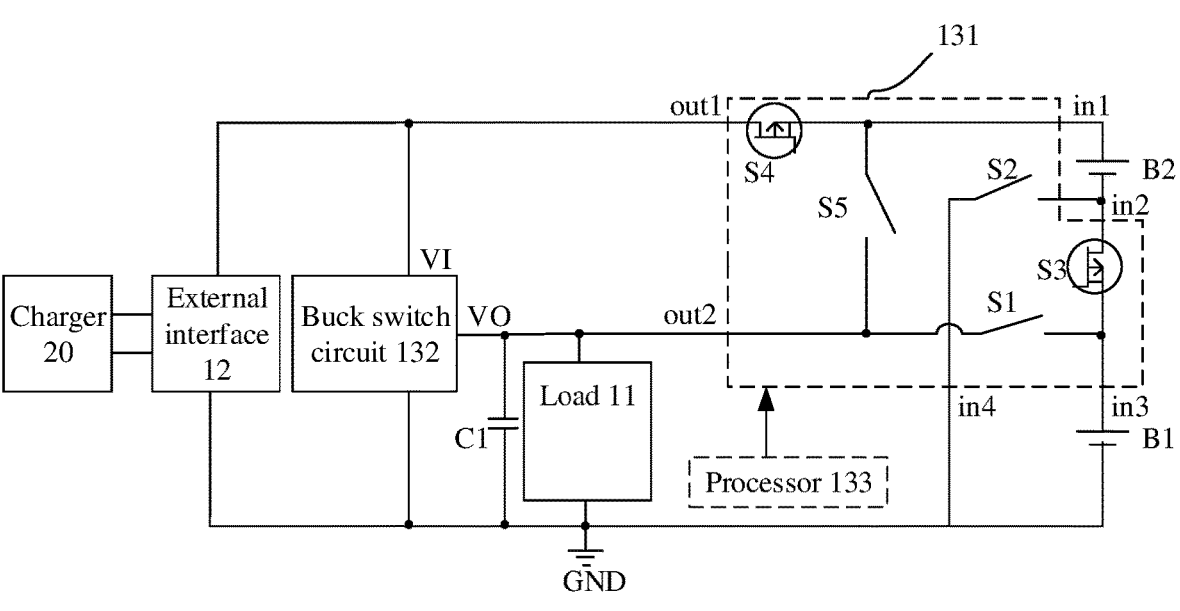
FIG. 12 is a schematic diagram 1 of a switch status in a toggle switch circuit according to an embodiment of this application.
Figure 13:
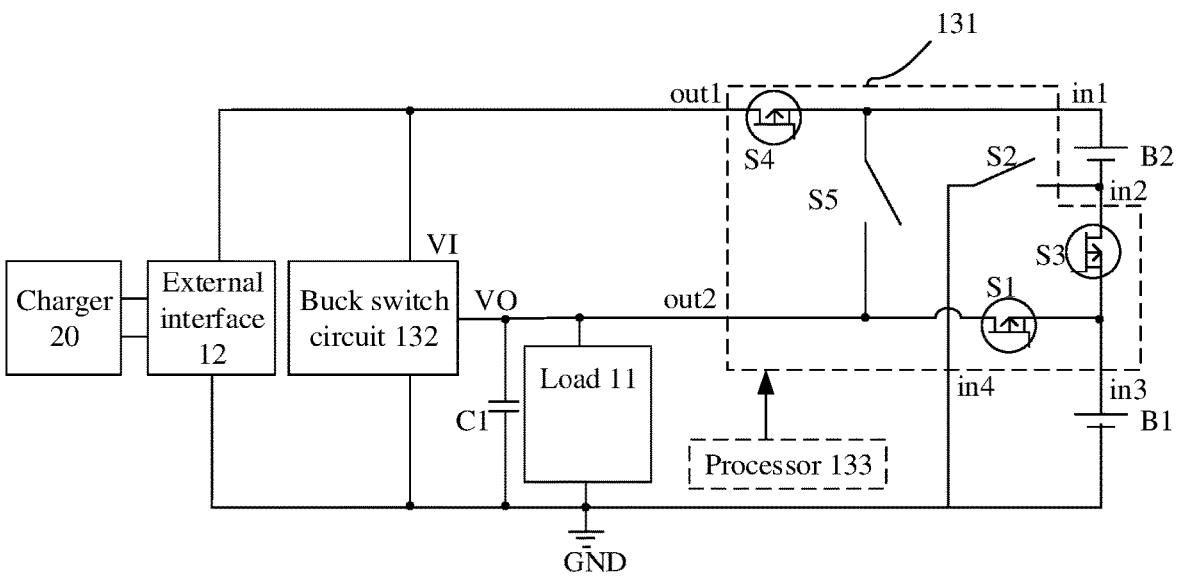
FIG. 13 is a schematic diagram 2 of a switch status in a toggle switch circuit according to another embodiment of this application.
Figure 14:
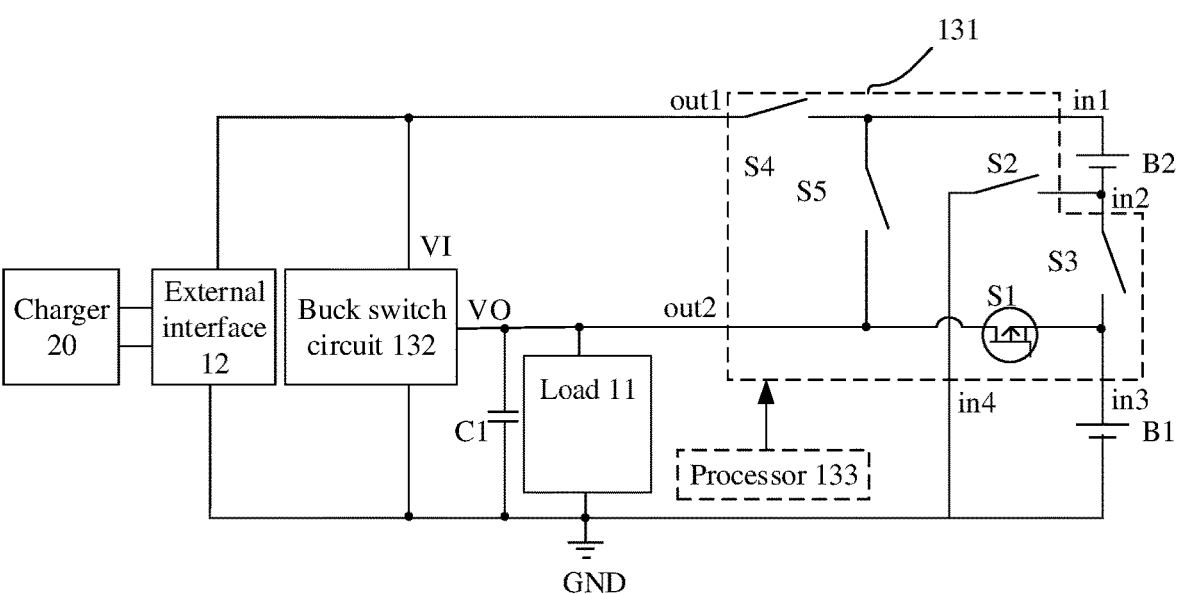
FIG. 14 is a schematic diagram 3 of a switch status in a toggle switch circuit according to still another embodiment of this application.
Figure 15:
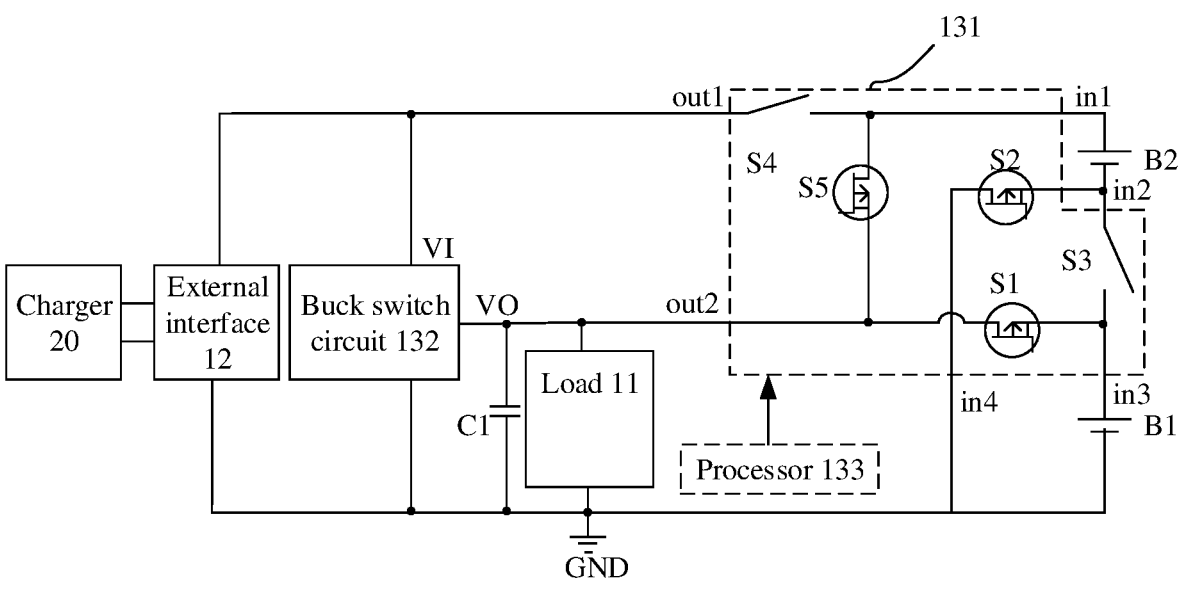
FIG. 15 is a schematic diagram 4 of a switch status in a toggle switch circuit according to yet another embodiment of this application.

Specifically, the circuit shown in FIG. 6 and the timing diagrams of the signals at the control ends of the switches shown in FIG. 11 are described in detail in the following (in which the switches are represented by different signs in on and off states):

In a period of time t1, the external interface 12 is inserted into the charger 20 to charge the cells B1 and B2, the processor 133 controls S1, S2, and S5 in the toggle switch circuit 131 to be turned on and S3 and S4 in the toggle switch circuit 131 to be turned off, to switch the connection status of the cells B1 and B2 to the serially-connected state (referring to FIG. 12), so that the cells B1 and B2 are connected in series between the first output end out1 of the toggle switch circuit 131 and the grounding end GND. The processor 133 controls the buck switch circuit 132 to adjust the voltage of the charger 20 to the system rated voltage Vbat and output the voltage to the output end VO of the buck switch circuit 132. In the period of time t1, the charger 20 supplies a charging voltage Vbus negotiated with the processor 133 of the electronic device to the input end VI of the buck switch circuit 132. The cells B1 and B2 are connected in series, the charging voltage Vbus is at least twice of the system rated voltage Vbat. In the period of time t1, if the processor 133 determines that the charging is completed, the buck switch circuit 132 is controlled to adjust the voltage outputted by the output end VO of the buck switch circuit 132 to the voltage of the cell B1, for example, Vbat. In a period of time t2, referring to FIG. 13, the processor 133 controls S1 to be turned on, and in this case, the cell group B1 is connected to the second output end out2 of the toggle switch circuit 131 to output the voltage to the second output end out2 of the toggle switch circuit 131. The voltage outputted by the second output end out2 of the toggle switch circuit 131 is equal to the voltage of the cell B1, the charger 20 still outputs Vbat to the load 11 through the buck switch circuit 132 to supply power to the load 11, and the cell B1 prepares power for the load. In a period of time t3, as shown in FIG. 14, the processor 133 controls S3 and S4 to be turned off, so that the cells B1 and B2 are disconnected from the serially-connected circuit. Then, in t4 period of time, referring to FIGS. 15, S5 and S2 are controlled to be turned on, so that the cells B2 and B1 are connected in parallel. In this case, the cells B1 and B2 are connected in parallel between the second output end out2 of the toggle switch circuit 131 and the grounding end GND. If the charger 20 is not pulled out, the charger 20 still outputs Vbat to the load 11 through the buck switch circuit 132 to supply power to the load 11. The cells B1 and B2 prepare power for the load. In t5 period of time, the charger 20 is pulled out, and the cells B1 and B2 are connected in parallel to supply power to the load 11.

Scenario 2: In the process of charging the cell groups by the charger in the serially-connected state, the charger is pulled out to stop charging the cell groups, which triggers the switching of the connection status of the cell groups from the serially-connected state to the parallelly-connected state.

As shown in FIG. 5, when the external interface 12 is inserted into the charger 20 to charge the at least two cell groups, the toggle switch circuit 131 is configured to switch the connection status of the at least two cell groups (BG1, BG2, . . . , BGm) to be serially-connected, so that the at least two cell groups (BG1, BG2, . . . , BGm) are connected in series between the first output end out1 of the toggle switch circuit 131 and the grounding end GND, and the buck switch circuit 132 is configured to adjust a voltage of the charger 20 to a system rated voltage Vbat and output the voltage to the output end VO of the buck switch circuit 132. In this case, the charger charges the cell groups connected in series. Subsequently, if it is determined that the charger is pulled out, switching of the connection status of the cell groups from the serially-connected state to the parallelly-connected state is triggered, which specifically includes the following steps:

S201: When it is determined that the charger 20 is pulled out, control a buck switch circuit 132 to adjust a voltage outputted by an output end VO of the buck switch circuit 132 to a voltage of a first cell group BG1 in at least two cell groups (BG1, BG2, . . . , BGm).

The first cell group BG1 may be any cell group. In step S201, whether the charger 20 is pulled out may be determined by measuring the voltage of the external interface 12. In this case, the at least two cell groups (BG1, BG2, . . . , BGm) are connected in series between a first output end out1 of a toggle switch circuit 131 and a grounding end GND. Therefore, the at least two cell groups (BG1, BG2, . . . , BGm) are connected in series to output a voltage of the first cell group BG1 to a load 11 through the buck switch circuit 132 to supply power to the load 11. In the process, the at least two cell groups (BG1, BG2, . . . , BGm) are connected in series to supply power to the load 11 through the buck switch circuit 132, to ensure that the load 11 is continuously powered.

S202: Control the toggle switch circuit 131 such that the first cell group BG1 outputs a voltage to a second output end out2 of the toggle switch circuit 131.

In step S202, the processor 133 controls the toggle switch circuit 131 to output the voltage by the first cell group BG1 to the second output end out2 of the toggle switch circuit 131. Therefore, the first cell group BG1 is connected in parallel with the load 11. Then, in step S202, the voltage outputted by the second output end out2 of the toggle switch circuit 131 is equal to the voltage of the first cell group BG1, and the voltage of the first cell group BG1 is still outputted to the load 11 by the at least two cell groups (BG1, BG2, . . . , BGm) connected in series through the buck switch circuit 132 to supply power to the load 11. The first cell group BG1 prepares power to the load. In this way, in the process, the load 11 is ensured to be continuously powered.

S203: Control the toggle switch circuit 131 to switch the connection status of the at least two cell groups (BG1, BG2, . . . , BGm) to the parallelly-connected state, so that the at least two cell groups (BG1, BG2, . . . , BGm) are connected in parallel between the second output end out2 of the toggle switch circuit 131 and the grounding end GND.

In step S202, the at least two cell groups (BG1, BG2, . . . , BGm) are connected in series to output the voltage of the first cell group BG1 to the load 11 through the buck switch circuit 132 to supply power to the load 11, and the first cell group BG1 is connected in parallel with the load as a standby power supply. Therefore, in step S203, when the connection status of the at least two cell groups (BG1, BG2, . . . , BGm) is switched to be parallelly-connected, only other cell groups (BG2, . . . , BGm) except the first cell group BG1 need to be connected in parallel between the second output end out2 of the toggle switch circuit 131 and the grounding end GND. In the switching process in step S203, in a case that the first cell group BG1 is connected in parallel with the load to supply power to the load, when the series connection of the at least two cell groups (BG1, BG2, . . . , BGm) is disconnected, the load 11 is ensured to be continuously powered.

Figure 16:
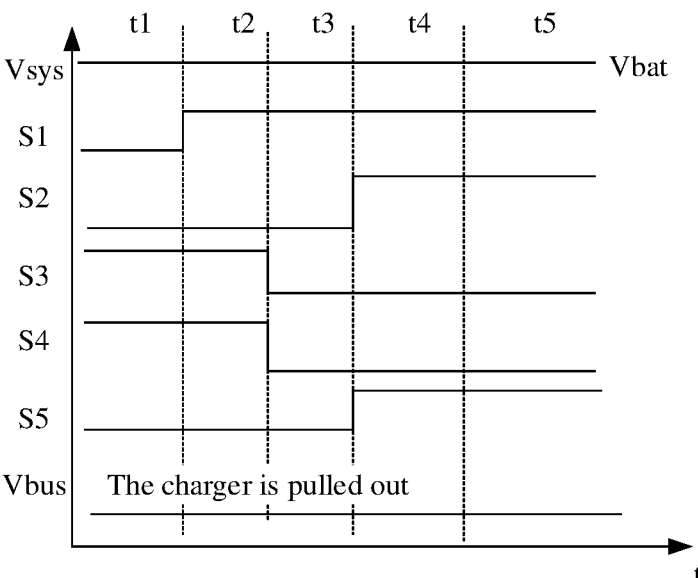
FIG. 16 is a timing diagram of a signal at a control end of a switch according to an embodiment of this application.

Specifically, the circuit shown in FIG. 6 and the timing diagram of the signal at the control end of the switch shown in FIG. 16 are described in detail in the following.

Before the period of time t1, the external interface 12 is inserted into the charger 20 to charge the cells B1 and B2, the processor 133 controls S1, S2, and S5 in the toggle switch circuit 131 to be turned on and S3 and S4 in the toggle switch circuit 131 to be turned off, to switch the connection status of the cells B1 and B2 to the serially-connected state (referring to FIG. 12), so that the cells B1 and B2 are connected in series between the first output end out1 of the toggle switch circuit 131 and the grounding end GND. The processor 133 controls the buck switch circuit 132 to adjust the voltage of the charger 20 to the system rated voltage Vbat and output the voltage to the output end VO of the buck switch circuit 132. In the period of time t1, after the charger 20 is pulled out, the charger 20 stops supplying voltage to the input end VI of the buck switch circuit 132 and the charging voltage Vbus becomes 0. The cells B1 and B2 are connected in series between the first output end out1 of the toggle switch circuit 131 and the grounding end GND, and therefore at the stage, the processor 133 determines that the charger is pulled out, and controls the buck switch circuit 132 to adjust the voltage outputted by the output end VO of the buck switch circuit 132 to the voltage of the cell B1. The cells B1 and B2 are connected in series to output the voltage of the cell B1 to the load 11 through the buck switch circuit 132. For example, the voltage may be Vbat. In a period of time t2, referring to FIG. 13, the processor 133 controls S1 to be turned on, and in this case, the cell group B1 is connected to the second output end out2 of the toggle switch circuit 131 to output the voltage to the second output end out2 of the toggle switch circuit 131. The voltage outputted by the second output end out2 of the toggle switch circuit 131 is equal to the voltage of the cell B1, the cells B1 and B2 connected in series still output Vbat to the load 11 through the buck switch circuit 132 to supply power to the load 11, and the cell B1 prepares power for the load. In a period of time t3, as shown in FIG. 14, the processor 133 controls S3 and S4 to be turned off, so that the cells B1 and B2 exit the serially-connected state. Then, in t4 period of time, referring to FIGS. 15, S5 and S2 are controlled to be turned on, so that the cells B2 and B1 are connected in parallel. In this case, the cells B1 and B2 are connected in parallel between the second output end out2 of the toggle switch circuit 131 and the grounding end GND, to supply power to the load 11.

Second, an example in which the connection status of the cell groups is switched from the parallelly-connected state to the serially-connected state is used for description in the following.

Scenario 3: After the external interface is inserted into the charger, the connection status of the cell groups is triggered to switch from the parallelly-connected state to the serially-connected state.

Referring to FIG. 5, when the at least two cell groups (BG1, BG2, . . . , BGm) supplies power to the load 11, the toggle switch circuit 131 is configured to switch the connection status of the at least two cell groups (BG1, BG2, . . . , BGm) to be parallelly-connected, so that the at least two cell groups (BG1, BG2, . . . , BGm) are connected in parallel between the second output end out2 of the toggle switch circuit 131 and the grounding end GND to directly supply power to the load 11. When the battery is discharged until it is necessary to replenish electric energy, a user inserts the charger 20 into the electronic device to charge the electrode device. In this case, the charger 20 charges the cell groups (BG1, BG2, . . . , BGm) in the serially-connected state. Subsequently, if it is determined that the cell groups (BG1, BG2, . . . , BGm) are fully charged, the switching of the cell groups from the serially-connected state to the parallelly-connected state is triggered, specifically including the following steps:

S301: When it is determined that an external interface 12 is connected to a charger 20, control a buck switch circuit 132 to adjust a voltage outputted by an output end VO of the buck switch circuit 132 to a voltage of a first cell group BG1.

The first cell group BG1 may be any cell group. In step S301, the processor 133 detects the voltage of the external interface to identify insertion of the charger 20, for example, based on the voltage of the external interface 12, it may be determined a 5-V charger is inserted into the external interface. In the embodiment, the at least two cell groups (BG1, BG2, . . . , BGm) are connected in series in the charging state, so that the charging voltage Vbus is at least twice of the system rated voltage Vbat (2×Vbat). Then, the processor 133 and the charger 20 may negotiate the charging voltage Vbus and adjust the charging voltage to 2×Vbat to implement fast charging of the plurality of cell groups (BG1, BG2, . . . , BGm) connected in series. In step 301, after the charging voltage is adjusted to 2×Vbat, the buck switch circuit 132 is controlled to adjust the voltage outputted by the output end VO of the buck switch circuit 132 to the voltage of the first cell group BG1. In this way, the charger 20 outputs the voltage of the first cell group BG1 to the load 11 through the buck switch circuit 132 to supply power to the load 11. In the process, the charger 20 supplies power to the load 11 through the buck switch circuit 132, and the at least two cell groups (BG1, BG2, . . . , BGm) are connected in parallel to prepare power for the load.

S302: Control the toggle switch circuit 131 to control other cell groups (BG2, . . . , BGm) of the at least two cell groups (BG1, BG2, . . . , BGm) except the first cell group BG1 to disconnect from the load 11.

The first cell group BG1 may be any cell group. In step S301, when the other cell groups (BG2, . . . , BGm) are disconnected from the load 11, the first cell group BG1 remains to be connected in parallel with the load 11. In step S202, the voltage outputted by the second output end out2 of the toggle switch circuit 131 is equal to the voltage of the first cell group BG1, and the charger 20 still outputs the voltage of the first cell group BG1 to the load 11 through the buck switch circuit 132 to supply power to the load 11. The first cell group BG1 prepares power for the load, and only when the charger 20 is suddenly powered off, the first cell group BG1 supplies power to the load 11. In this way, in the process, the load 11 is ensured to be continuously powered. It should be noted that, the embodiments of this application are not limited to the order of step S301 and step 302, and after inserting the charger, step 302 may alternatively be performed before step 301. For example, after the processor 133 detects the voltage of the external interface to identify that the charger 20 is inserted, first, the toggle switch circuit 131 is controlled to disconnect the other cell groups (BG2, . . . , BGm) of the at least two cell groups (BG1, BG2, . . . , BGm) except the first cell group BG1 to disconnect from the load 11. In this way, the first cell group BG1 supplies power to the load, and after the charging voltage is adjusted to 2×Vbat, and the buck switch circuit 132 is controlled so that the voltage outputted by the output end VO of the buck switch circuit 132 is adjusted to the voltage of the first cell group BG1. The first cell group BG1 is the load standby power. In the process, the voltage outputted by the output end VO of the buck switch circuit 132 is the voltage of the first cell group BG1, and therefore the first cell group BG1 is configured to prepare power for the load. In this way, the load 11 may also be ensured to be continuously powered.

S303: Control the toggle switch circuit 131 to switch the connection status of the at least two cell groups (BG1, BG2, . . . , BGm) to the serially-connected state, so that the at least two cell groups (BG1, BG2, . . . , BGm) are connected in series between the first output end out1 of the toggle switch circuit 131 and the grounding end GND.

In step S303, when the connection status of the at least two cell groups (BG1, BG2, . . . , BGm) is switched to be serially-connected, the charger 20 continues to output the voltage of the first cell group BG1 to the load 11 through the buck switch circuit 132 to supply power to the load 11. In addition, the charger 20 directly charges the at least two cell groups (BG1, BG2, . . . , BGm) connected in series, and the at least two cell groups (BG1, BG2, . . . , BGm) connected in series reduces the voltage through the buck switch circuit 132 to prepare power for the load, to ensure that the load 11 is continuously powered.

Figure 17:
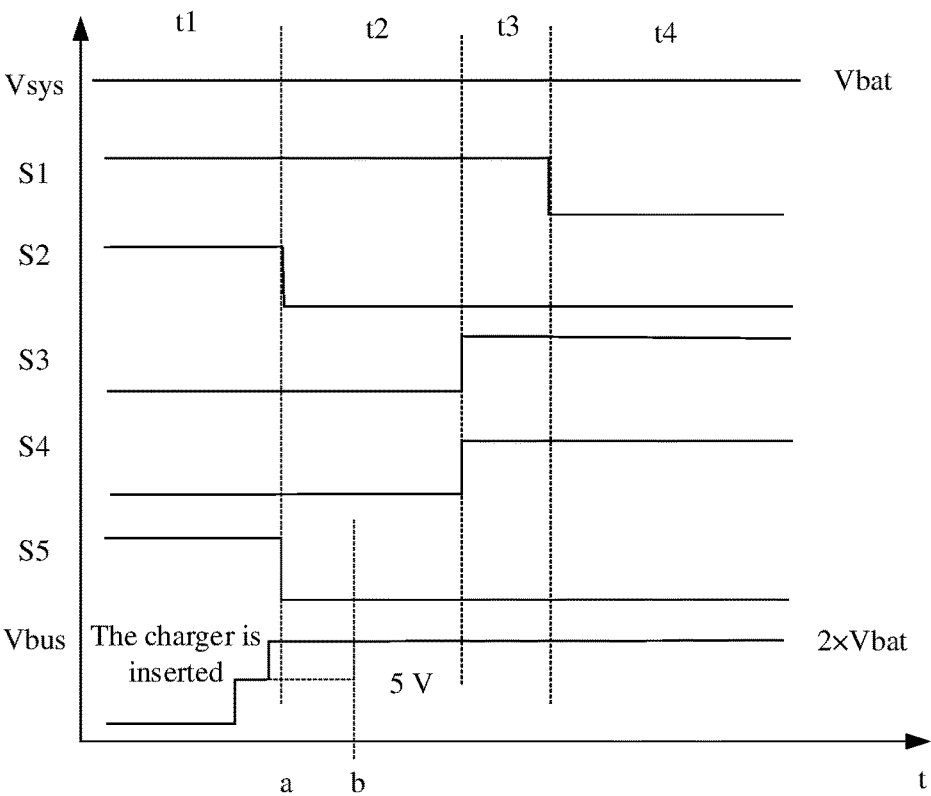
FIG. 17 is a timing diagram of a signal at a control end of a switch according to an embodiment of this application.

Specifically, the circuit shown in FIG. 6 and the timing diagram of the signal at the control end of the switch shown in FIG. 17 are described in detail in the following.

Figure 18:
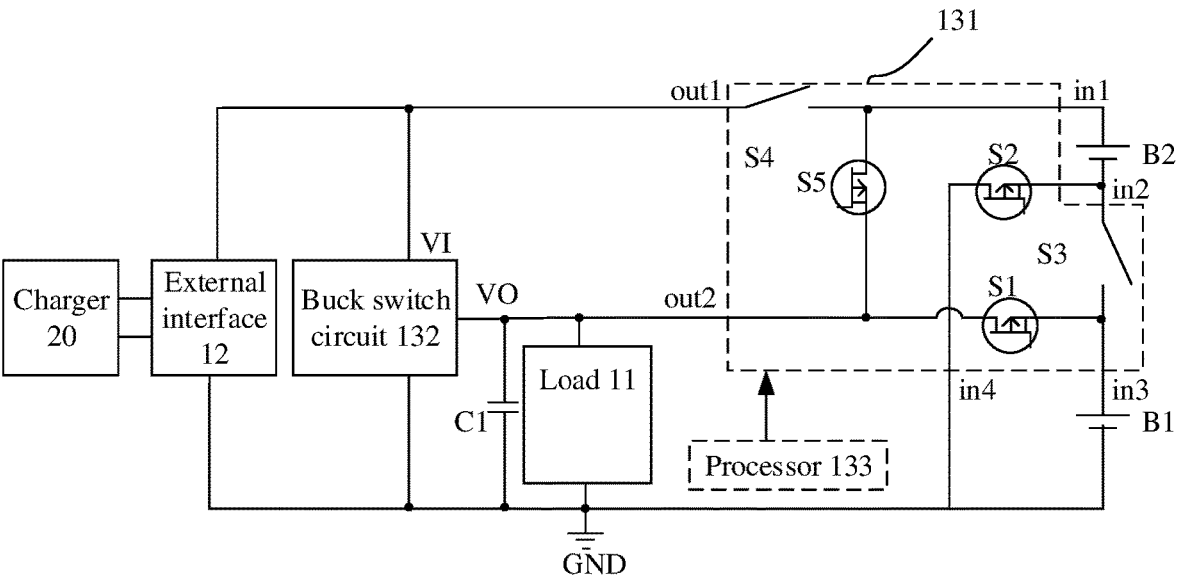
FIG. 18 is a schematic diagram 5 of a switch status in a toggle switch circuit according to another embodiment of this application.
Figure 19:
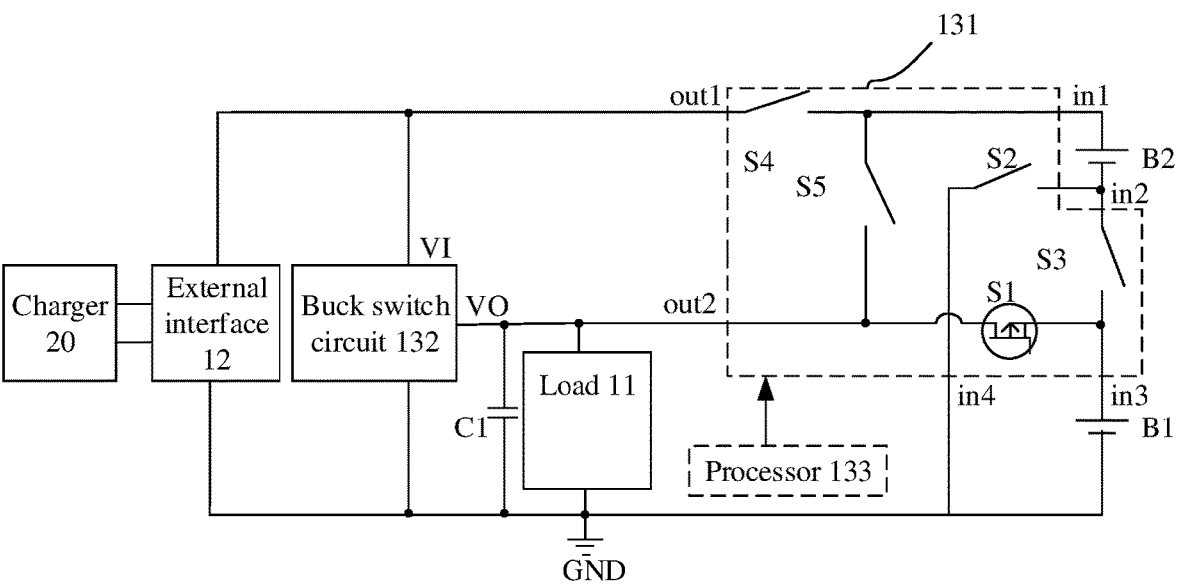
FIG. 19 is a schematic diagram 6 of a switch status in a toggle switch circuit according to still another embodiment of this application.
Figure 20:
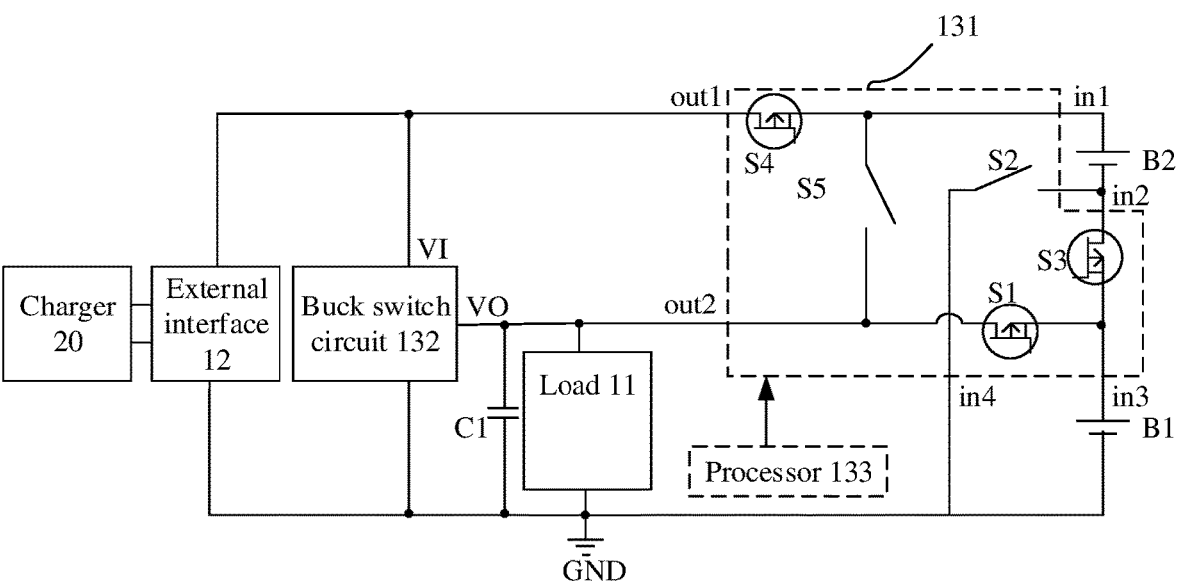
FIG. 20 is a schematic diagram 7 of a switch status in a toggle switch circuit according to yet another embodiment of this application.
Figure 21:
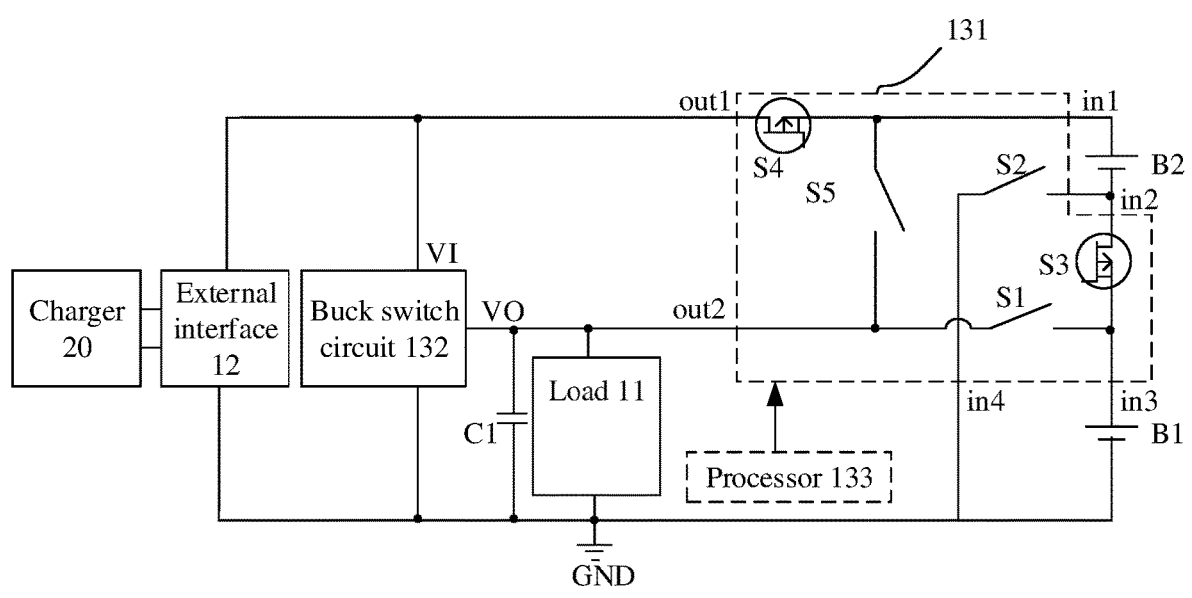
FIG. 21 is a schematic diagram 8 of a switch status in a toggle switch circuit according to another embodiment of this application.

In the period of time t1, the cells B1 and B2 connected in parallel supply power to the load 11, and the processor 133 controls S1, S2, and S5 in the toggle switch circuit 131 to be turned on and S3 and S4 to be turned off, so that the connection status of the cells B1 and B2 is switched to be parallelly-connected (referring to FIG. 18), so that the cells B1 and B2 are connected in parallel between the second output end out2 of the toggle switch circuit 131 and the grounding end GND. When the battery is discharged until it is necessary to replenish electric energy, a user inserts the charger 20 into the electronic device to charge the electrode device. By default, the output voltage of the charger 20 is 5 V (close to the voltage of a single cell), and the processor may determine, based on the voltage of the external interface, that a 5-V charger is inserted into the external interface. In the embodiment, the cells B1 and B2 are connected in series in the charging state. To implement fast charging, the processor 133 negotiates with the charger 20 that the charging voltage Vbus is at least twice of the system rated voltage Vbat (2×Vbat). In the period of time t1, the processor 133 controls the buck switch circuit 132 to adjust the voltage outputted by the output end VO of the buck switch circuit 132 to the voltage of the cell B1, for example, Vbat. In the period of time t2, the processor 133 controls S2, S3, S4, and S5 in the toggle switch circuit 131 to be turned off and S1 to be turned on (referring to FIG. 19), so that B2 is disconnected from the load. In this case, the voltage outputted by the output end VO of the buck switch circuit 132 is the voltage of B1, and therefore the buck switch circuit 132 supplies power to the load and B1 prepares power for the load. It should be noted that, as shown in FIG. 17, the voltage outputted by the output end VO of the buck switch circuit 132 may be adjusted to the voltage of the cell B1 in the period of time t1 (point a in FIG. 17), and then S2, S3, S4, and S5 in the toggle switch circuit 131 are controlled to be turned off and S1 to be turned on in the period of time t2, or S2, S3, S4, and S5 in the toggle switch circuit 131 are controlled to be turned off and S1 to be turned on in the period of time t2, and then the voltage outputted from the output end VO of the buck switch circuit 132 is adjusted to the voltage of the cell B1. In the period of time t3, referring to FIG. 20, the processor 133 controls S3 and S4 to be turned on, switches the cells B1 and B2 to be serially-connected, the charger starts to charge the cells B1 and B2, and the cells B1 and B2 connected in series reduce the voltage through the buck switch circuit 132 to prepare power for the load. In the period of time t4, referring to FIG. 21, the processor 133 controls S1 to be turned off, the cell B1 stops supplying power to the load, and the cells B1 and B2 connected in series reduce the voltage through the buck switch circuit 132 to prepare power for the load. In the period of time t5, the electronic device and the charger may adjust the output voltage of the charger and control the charging current to charge the cells B1 and B2 through a protocol.

Figure 22:
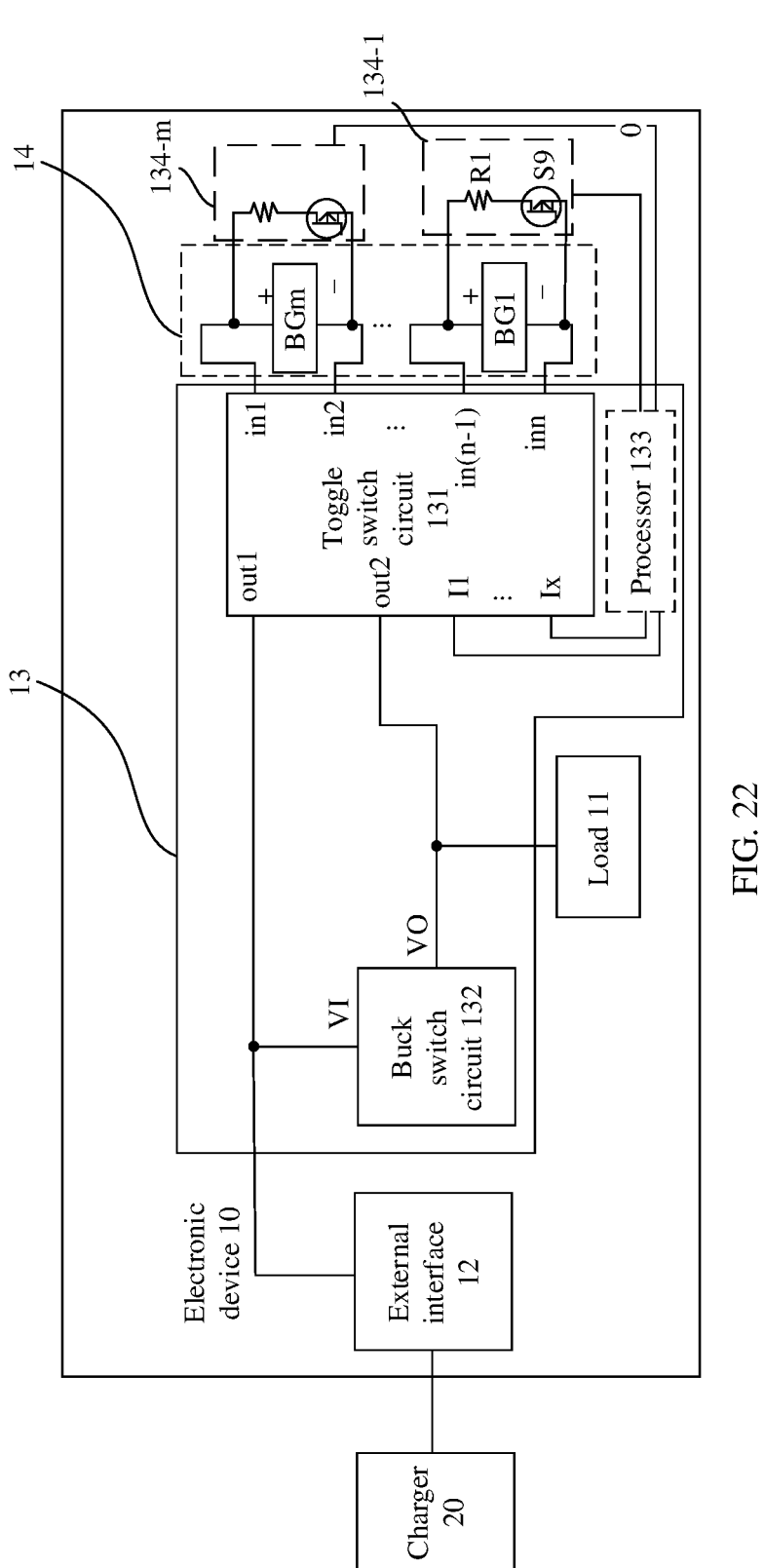
FIG. 22 is a schematic structural diagram of a power supply system according to still another embodiment of this application.

In addition, in the embodiment of this application, because properties such as internal resistance of all the cell groups are not completely consistent, unbalanced power may occur in the cell groups after charge and discharge cycles in a long run. Therefore, the embodiment of this application further provides an equalization mode for the cell groups during the charging process. Referring to FIG. 22, the power supply system 13 further includes a plurality of equalization circuits 134 (134-1, . . . , 134-m), two ends of one equalization circuit being respectively coupled to two poles of a cell group. Control ends of the equalization circuits are coupled to the control end of the processor 133.

The control mode of the equalization circuits (134-1, . . . , 134-m) is described as follows: when it is determined that the voltage difference between the first cell group BG1 and the second cell group BG2 satisfies the predetermined predetermined condition, the equalization circuit 134-1 corresponding to the first cell group BG1 is controlled to shunt the first cell group BG1. For example, as described above, when a plurality of cell groups are connected in series, because the properties such as the internal resistance are different, when the plurality of cell groups are connected in series and charged, the voltages of the cell groups may not be equal. In a general state, when a charger charges a plurality of cell groups connected in series, the equalization circuit (134-1, . . . , 134-m) does not work. When it is determined that the voltage difference between the first cell group BG1 and the second cell group BG2 exceeds a first voltage difference threshold, for example, when the voltage of the first cell group BG1 exceeds the voltage of the second cell group BG2 by a value greater than the first voltage difference threshold, it indicates that there is severe imbalance between the plurality of cell groups in the charging process, and a charging current of the first cell group BG1 may be shunted by enabling the equalization circuit 134-1 corresponding to the first cell group BG1, thereby reducing the charging current of BG1 and reducing the charging speed of BG1. When the voltage difference between BG1 and BG2 is less than a second voltage difference threshold, in particular, the voltage of BG1 is less than the voltage of BG2, the voltage difference is less than the second voltage difference threshold, or the voltage of BG2 is less than the voltage of BG1, and the voltage difference is less than the second voltage difference threshold, the control equalization circuit 134-1 is controlled to stop shunting the charging current of the first cell group BG1, where the first voltage difference threshold is greater than the second voltage difference threshold.

Specifically, as shown in FIG. 22, each of the equalization circuits (134-1, . . . , 134-m) includes a switch and a resistor; a series structure of the switch and the resistor is connected in parallel with a cell group, and a control end of the switch is coupled to a control end of the equalization circuit. For example, the equalization circuit 134-1 includes a switch S9 and a resistor R1; the series structure of the switch S9 and the resistor R1 is connected in parallel with the cell group BG1, and a control end of the switch S9 is coupled to the control end of the equalization circuit 134-1. When it is determined that the voltage difference between the first cell group BG1 and the second cell group BG2 satisfies the predetermined predetermined condition, the switch S9 in the equalization circuit 134-1 corresponding to the first cell group BG1 may be controlled to be turned on. Specifically, the processor 133 may output a square wave signal to the control end of the switch S9 to control the switch S9 to be intermittently turned on for a period of time. When the processor 133 determines that the voltage difference between the first cell group BG1 and the second cell group BG2 satisfies the second predetermined condition, the switch S9 in the equalization circuit 134-1 corresponding to the first cell group BG1 is turned off.

Figure 23:
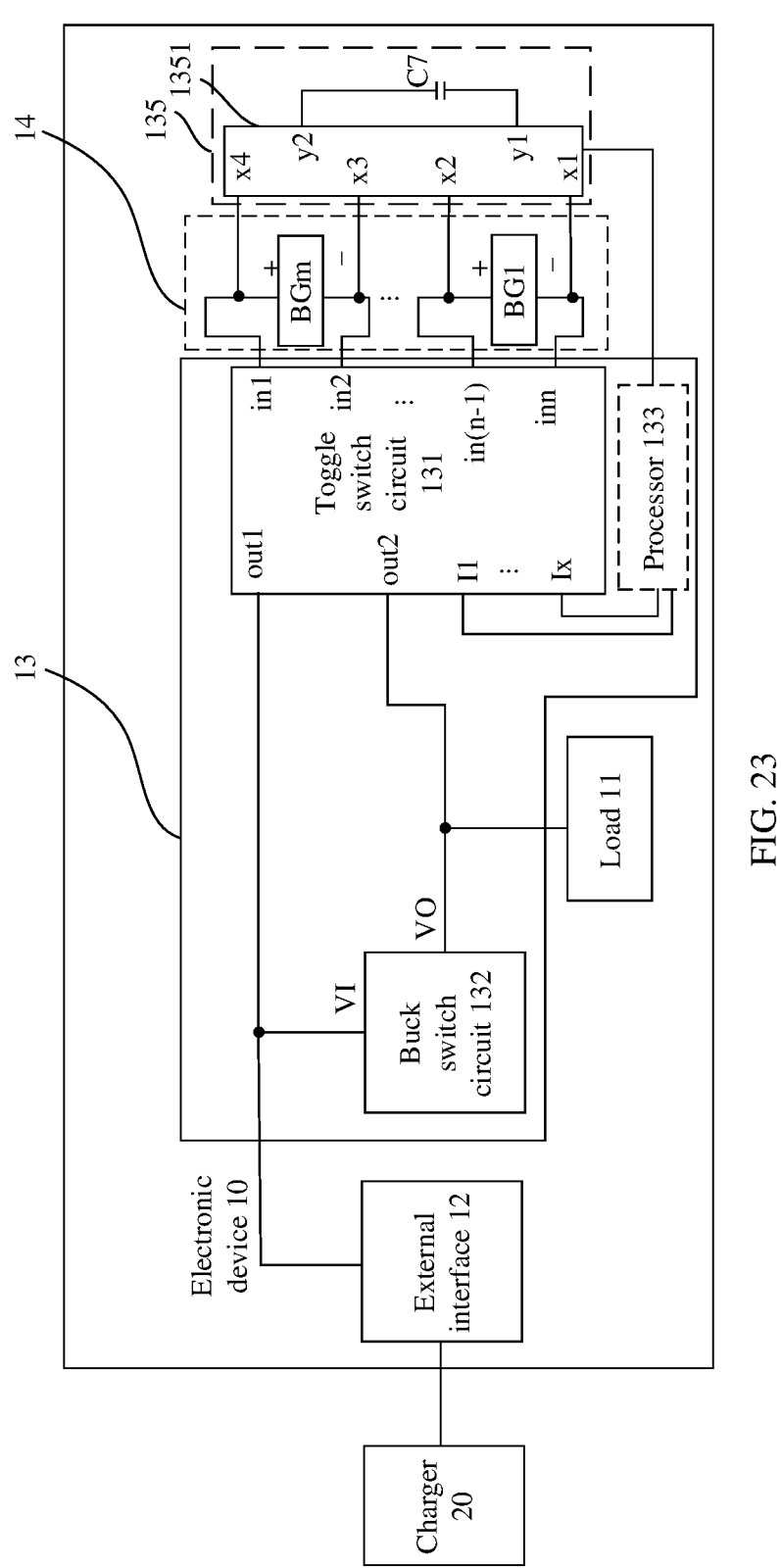
FIG. 23 is a schematic structural diagram of a power supply system according to yet another embodiment of this application.

In addition, an embodiment of this application further provides an equalization circuit 135. As shown in FIG. 23, the equalization circuit 135 includes an equalization switch circuit 1351 and a capacitor C7, a first input end x1 of the equalization switch circuit 135 is coupled to the positive pole of the cell group BG1, a second input end x2 of the equalization switch circuit 135 is coupled to the negative pole of the cell group BG1, a third input end x3 of the equalization switch circuit 135 is coupled to the positive pole of the cell group BG2, and a fourth input end x4 of the equalization switch circuit 135 is coupled to the negative pole of the cell group BG2. The capacitor C7 is coupled between the first output end y1 and a second output end y2 of the equalization switch circuit 135. The cell group BG1 and the cell group BG2 are adjacent cell groups when the at least two cell groups are connected in series. A control end of the equalization switch circuit 135 is coupled to the control end of the processor 133. When it is determined that the voltage difference between the cell group BG1 and the cell group BGm satisfies a first predetermined condition, for example, when the voltage of the cell group BG1 exceeds the voltage of the cell group BGm by a value greater than the first voltage difference threshold value, it indicates that there is severe imbalance between the plurality of cell groups in the charging process, the equalization switch circuit 1351 is controlled to connect the capacitor C7 in parallel with the cell group BG1. In this case, the capacitor C7 shunts a charging current of the cell group BG1, thereby reducing the charging current of the cell group BG1 and reducing the charging speed of the BG1. When it is determined that the voltage of the capacitor C7 is equal to the voltage of the cell group BG1, it indicates that the capacitor C7 is charged to saturation, and the equalization switch circuit 1351 is controlled to connect the capacitor C7 in parallel with the cell group BGm. In this way, the capacitor C7 may charge the cell group BGm. C7 is switched between parallelly-connected with the cell group BG1 and parallelly-connected with the cell group BGm several times as in the above cycle, until when the voltage difference between BG1 and BGm is less than the second voltage difference threshold, in particular, when the voltage of BG1 is less than the voltage of BG2 and the voltage difference is less than the second voltage difference threshold, or when the voltage of BG2 is less than the voltage of BG1 and the voltage difference is less than the second voltage difference threshold, the equalization circuit 135 is controlled to stop shunting the charging current of the cell group BG1, where the first voltage difference threshold is greater than the second voltage difference threshold.

Figure 24:
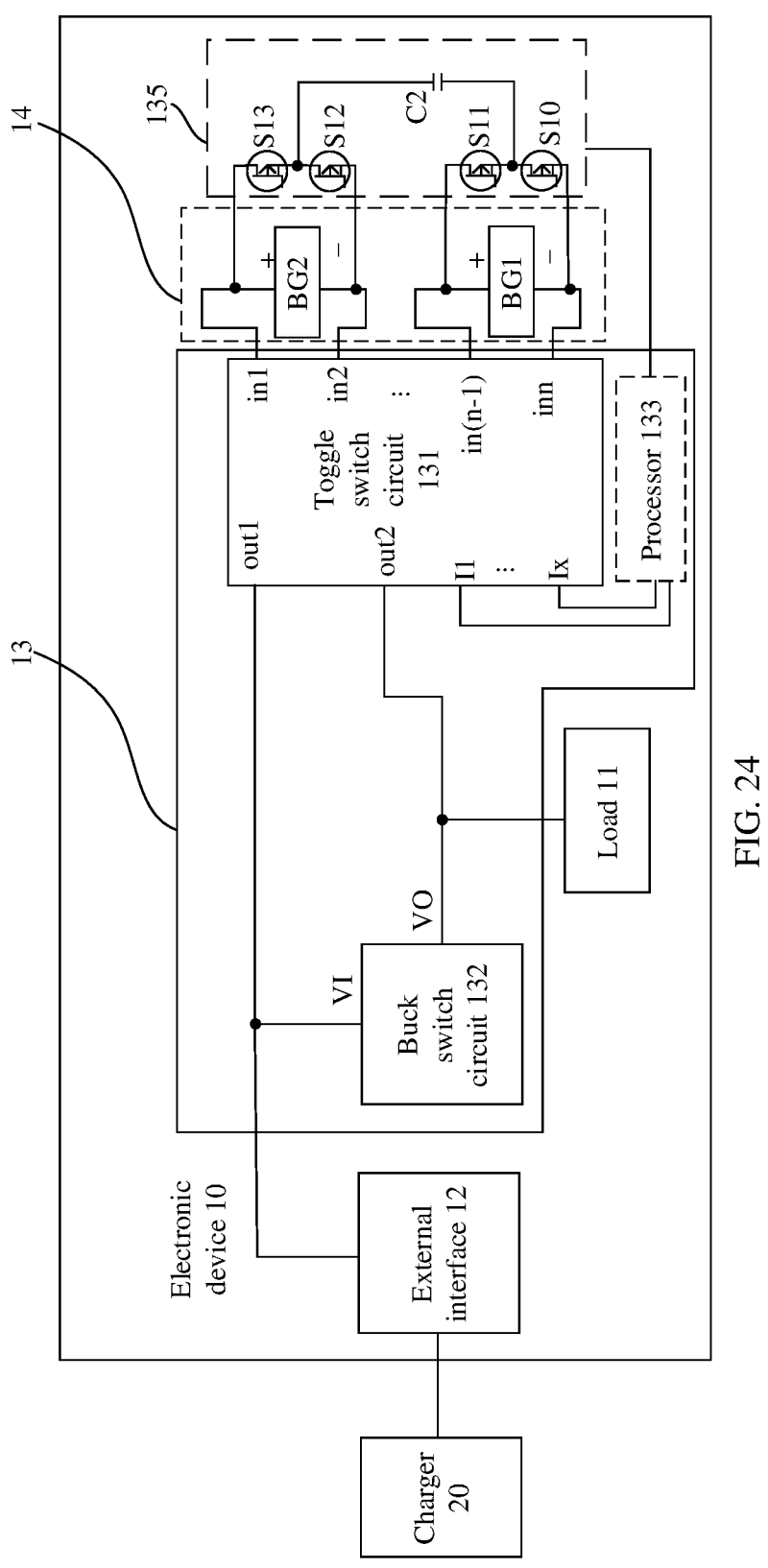
FIG. 24 is a schematic structural diagram of a power supply system according to another embodiment of this application.

Specifically, referring to FIG. 24, the equalization switch circuit 1351 includes four switches: a switch S10, a switch S11, a switch S12, and a switch S13. In combination with FIG. 23 and FIG. 24, a first end of the switch S10 is coupled to the first input end x1 of the equalization switch circuit 1351, a second end of the switch S10 is coupled to the first output end y1 of the equalization switch circuit 1351, and a control end of the switch S10 is coupled to a control end of the equalization switch circuit; a first end of the switch S11 is coupled to the second input end x2 of the equalization switch circuit 1351, a second end of the switch S11 is coupled to the first output end y1 of the equalization switch circuit 1351, and a control end of the switch S11 is coupled to a control end of the equalization switch circuit 1351; a first end of the switch S12 is coupled to the third input end x3 of the equalization switch circuit 1351, a second end of the switch S12 is coupled to the second output end y2 of the equalization switch circuit 1351, and a control end of the switch S12 is coupled to a control end of the equalization switch circuit 1351; a first end of the switch S13 is coupled to the fourth input end x4 of the equalization switch circuit 1351, a second end of the switch S13 is coupled to the second output end y2 of the equalization switch circuit 1351, and a control end of the switch S13 is coupled to a control end of the equalization switch circuit 1351; when it is determined that the voltage difference between the cell group BG1 and the cell group BG2 satisfies the first predetermined predetermined condition, the switches S10 and S12 are controlled to be turned on, and the switches S11 and S13 are controlled to be turned off; when it is determined that the voltage of the capacitor C7 is equal to the voltage of the cell group BG1, the switches S10 and S12 are controlled to be turned off, and the switches S11 and S13 are controlled to be turned on. When the voltage difference between BG1 and BG2 is less than the second voltage difference threshold value, the switches S10, S12, S11, and S13 are controlled to be turned off.

Figure 25:
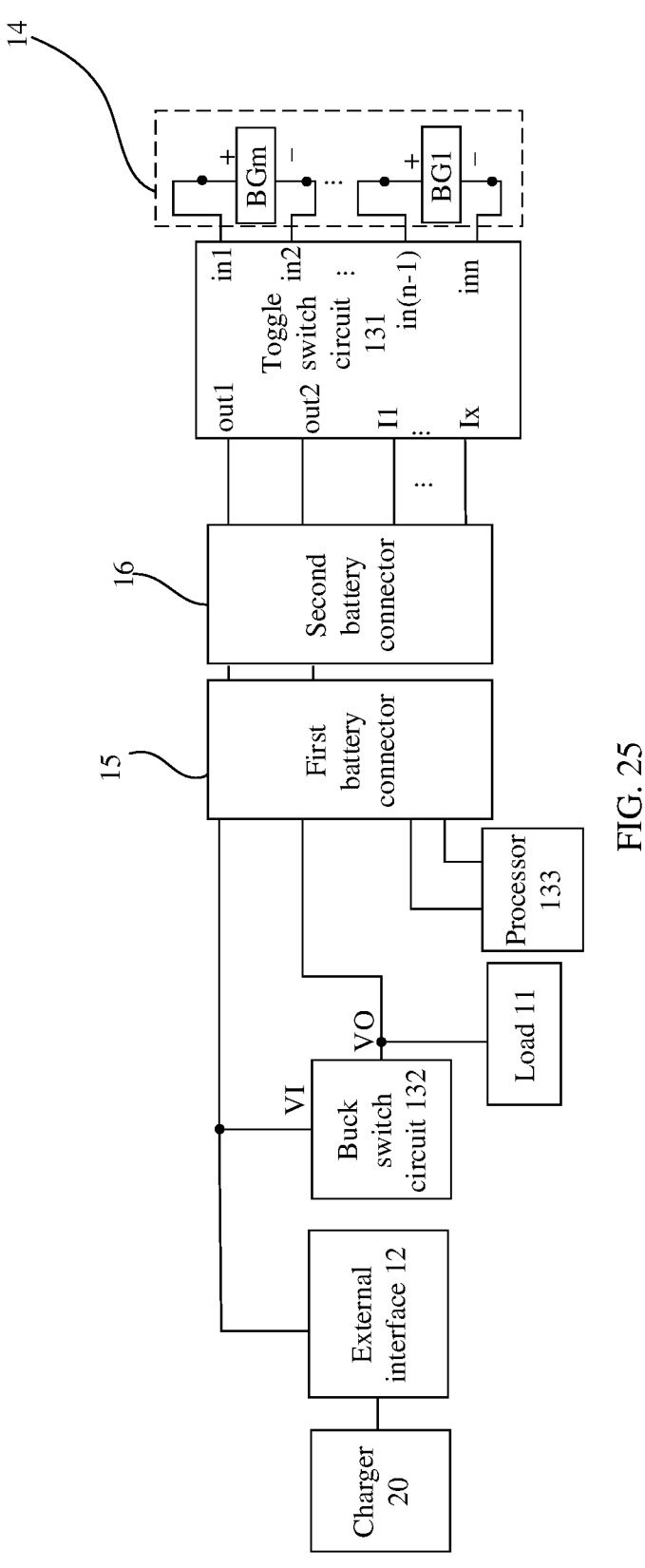
FIG. 25 is a schematic structural diagram of a power supply system according to still another embodiment of this application.

To implement modularization of a battery, referring to FIG. 25, the power supply system according to the embodiment of this application further includes a first battery connector 15 and a second battery connector 16. The input end VI of the buck switch circuit 132, the output end VO of the buck switch circuit 131, and the control end of the processor 133 are respectively coupled to terminals of the first battery connector 14. The first output end out1 of the toggle switch circuit 132, the second output end out2 of the toggle switch circuit 132, and the plurality of control ends (I1-Ix) of the toggle switch circuit 132 are respectively coupled to terminals of the second battery connector 16.

When the first battery connector 15 and the second battery connector 16 are plugged together, the first battery connector 15 is coupled to terminals in the second battery connector 16. In this way, modularization of a battery can be implemented. For example, when a battery needs to be replaced, the first battery connector 15 and the second battery connector 16 may be directly disconnected to replace the battery.

Figure 26:
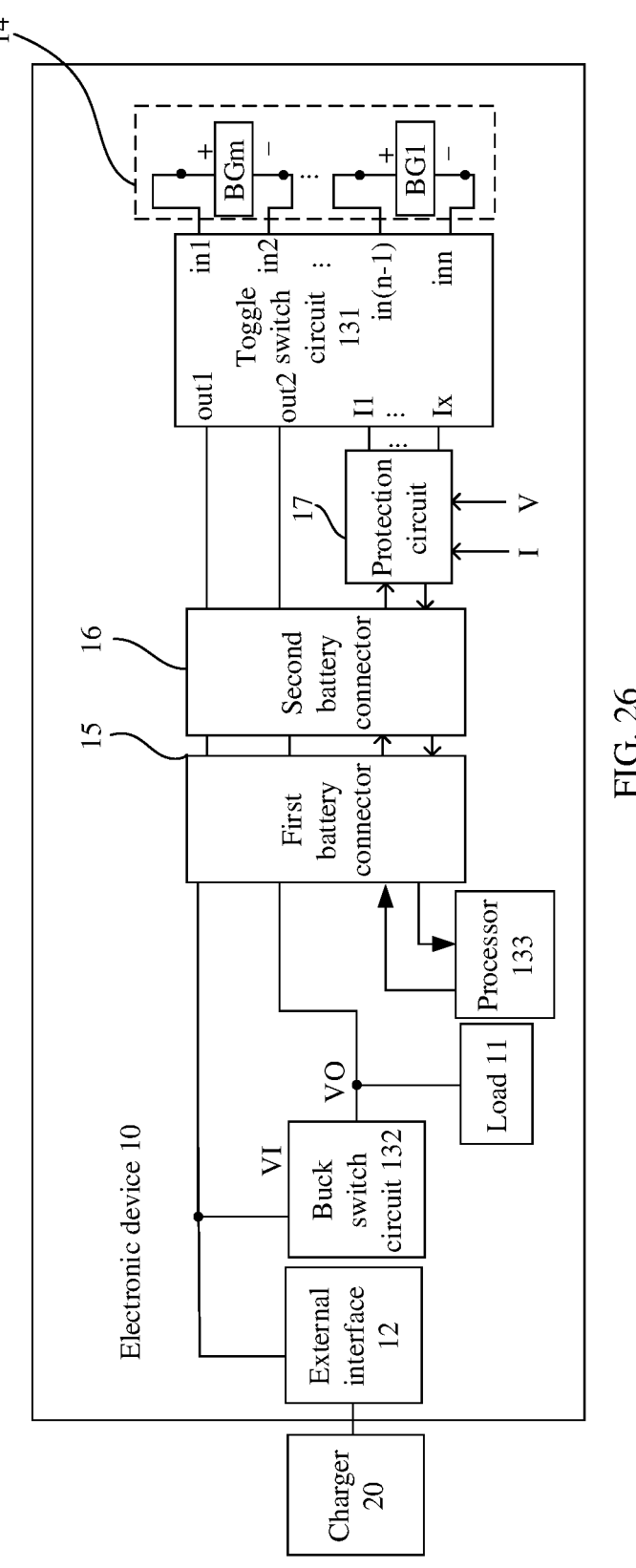
FIG. 26 is a schematic structural diagram of a power supply system according to yet another embodiment of this application.

In another embodiment, as shown in FIG. 26, a protection circuit 17 is further included. The plurality of control ends (I1-Ix) of the toggle switch circuit 131 are each coupled to an output end of the protection circuit 17. The protection circuit 17 is configured to sample working parameters of the cell groups, and when it is determined, based on the working parameters, that the working status of any cell group is abnormal, the protection circuit 17 controls the toggle switch circuit 131 to turn off the cell group. Specifically, the protection circuit 17 may sample working parameters such as a current I and a voltage V of the cell group, and control a status of a switch in the toggle switch circuit to disconnect the cell group when it is determined that there are abnormal working states such as undervoltage, overvoltage, and overcurrent short circuit based on the working parameters of the cell group. In this way, the switches in the toggle switch circuit are directly reused in the abnormal protection process such as undervoltage, overvoltage, and overcurrent short circuit, which can save devices and reduce costs as much as possible. The protection circuit 17 may be in the form of a chip.

In addition, the protection circuit 17 may further be coupled to the processor 133, for example, the input end or output end of the protection circuit 17 may be coupled to the control end of the processor 133. Specifically, the protection circuit 17 may be coupled to the processor 133 through the first battery connector 15 and the second battery connector 16 when the protection circuit 17 and the battery are modularly disposed together. In this way, the processor 133 may send a control signal for switches in the toggle switch circuit 131 to the protection circuit 17, and the protection circuit 17 further controls the status of the switches in the toggle switch circuit 131 based on the control signal. In some embodiments, the protection circuit 17 may further report the working parameters of the cell groups to the processor 133, so that the processor 133 can perform the above-mentioned equalization control based on the working parameters.

It can be understood that, to implement the method for switching the connection status of a cell, an apparatus for switching the connection status of a cell is further provided, which includes a corresponding hardware structure and/or software module for executing various functions. A person skilled in the art may be easily aware that, in combination with the units and algorithm operations in the examples described in the embodiments disclosed in this specification, this application may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiment of this application, division of functional modules of the apparatus for switching the connection status of the cell may be performed according to the method embodiment. For example, each functional module may be divided corresponding to each function, and two or more functions may alternatively be integrated to one processing module. The integrated module may be implemented in a form of hardware, or may be implemented in a form of a software functional module. It should be noted that the division of the modules in the embodiment of this application is schematic and is merely logical function division, and there can be other division modes in actual implementation.

Figure 27:
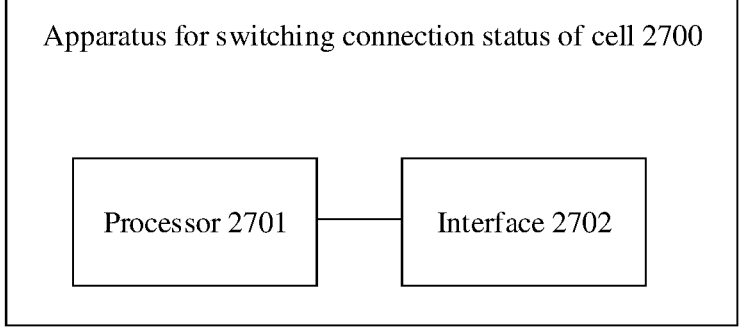
FIG. 27 is a schematic structural diagram of an apparatus for switching a connection status of a cell according to an embodiment of this application.

For example, when each functional module is divided in an integrated manner, FIG. 27 shows a schematic structural diagram of an apparatus for switching a connection status of a cell 2700. The apparatus for switching a connection status of a cell 2700 may be a chip or a system-on-chip in the mobile phone, or other combined devices and components that can implement the functions of the mobile phone. The "module" herein may refer to a particular ASIC, circuit, processor and memory that execute one or more software or firmware programs, integrated logic circuit, and/or other devices that may provide the above-mentioned function.

As a possible implementation, the apparatus for switching a connection status of a cell 2700 in FIG. 27 includes a processor 2701 and an interface 2702. The processor 2701 is coupled to the interface 2702 and a memory 3, and executes one or more computer programs stored in the memory to cause the control apparatus of the power supply system to execute the above-mentioned method for switching the connection status of a cell. The processor 2701 may be coupled to the toggle switch circuit 131, the buck switch circuit 132, the equalization circuit 134, the equalization circuit 135, the first battery connector 15, the protection circuit 17 and the like through an interface 2702.

All related content of the operations related to the above method embodiment may be quoted to the functional description of the corresponding functional modules, and will not be repeated herein.

In a possible design, the apparatus for switching a connection status of a cell 2700 further includes a memory. The memory is configured to store necessary program instructions and data, and the processor may 2700 invoke program code stored in the memory to instruct the apparatus for switching a connection status of a cell 2700 to perform the method in any of the above method embodiments. Certainly, the memory may not be in the apparatus for switching a connection status of a cell 2700. When the apparatus for switching a connection status of a cell 2700 is a chip system, the apparatus may be composed of a chip or may include a chip and other discrete devices which are not specifically limited in the embodiments of this application.

Figure 28:
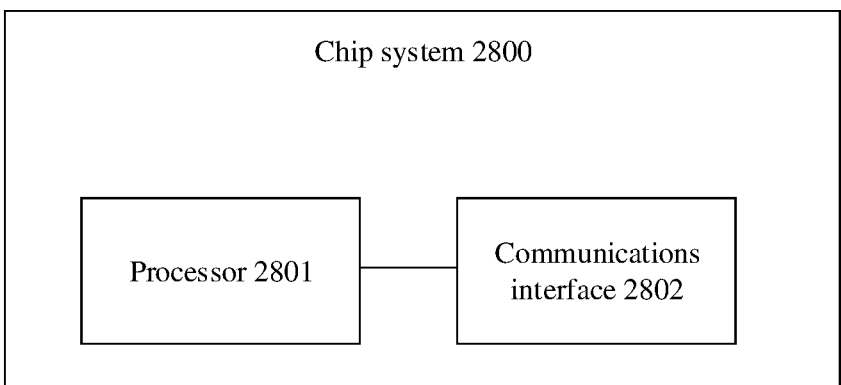
FIG. 28 is a schematic structural diagram of a chip system according to another embodiment of this application.

FIG. 28 shows a schematic diagram of the composition of a chip system 2800. The chip system 2800 may include a processor 2801 and a communications interface 2802 for supporting related devices to implement the functions described in the above-mentioned embodiments. In a possible design, the chip system further includes a memory configured to store program instructions and data necessary for the electronic device. The chip system may be composed of a chip or may include a chip and other discrete devices. It should be noted that in some implementations of this application, the communications interface 2802 may alternatively be referred to as an interface circuit.

It should be noted that all related content of the solution shown in FIG. 27 and FIG. 28 may be quoted to the functional description of the corresponding functional modules, and therefore corresponding beneficial effects can be obtained, and will not be repeated herein.

All or some of the functions, or actions, or operations, or steps in the foregoing embodiments may be implemented by using software, hardware, firmware, or any combination thereof. When software program is used to implement the embodiments, the embodiments may be implemented completely or partially in a form of a computer program product. The computer program product includes one or more computer instructions or program code. When the computer instructions or program code are loaded and executed on a computer, the procedure or functions according to the embodiments of this application are all or partially generated. The computer may be a general-purpose computer, a dedicated computer, a computer network, or other programmable apparatuses. The computer instructions or program code may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, or an optical fiber, or a digital subscriber line (digital subscriber line, DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application has been described in combination with specific features and embodiments thereof, it is apparent that various modifications and combinations may be made thereto without departing from the spirit and scope of this application. Accordingly, the specification and drawings of this application are merely exemplary illustrations of the application as defined by the appended claims and are deemed to have covered any and all modifications, variations, combinations, or equivalents within the scope of this application. Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A power supply system, applicable to an electronic device, wherein the electronic device comprises at least two cell groups, an external interface, and a load, each of the cell groups comprises at least one cell, and the at least one cell is coupled between two poles of the cell group;

the power supply system comprises a control processor, a toggle switch circuit, and a buck switch circuit; the toggle switch circuit comprises a first output end, a second output end, and a plurality of input ends; the two poles of the cell group are each coupled to an input end of the toggle switch circuit; the first output end of the toggle switch circuit is coupled to an input end of the buck switch circuit, the second output end of the toggle switch circuit is coupled to an output end of the buck switch circuit, and the input end of the buck switch circuit is coupled to the external interface; the output end of the buck switch circuit is further coupled to a load, and the external interface is configured to connect a charger;

wherein the control processor is configured to:

when the control processor detects that charging is completed, configure, in sequence: the buck switch circuit to adjust a voltage outputted from the output end of the buck switch circuit to a voltage of a first cell group among the at least two cell groups; the toggle switch circuit such that the first cell group outputs a voltage to the second output end of the toggle switch circuit; and the toggle switch circuit to switch the connection status of the at least two cell groups to be parallelly-connected, so that the at least two cell groups are connected in parallel between the second output end of the toggle switch circuit and a grounding end and so that power is continuously supplied to the load throughout a time period from when the control processor detects that charging is completed to when the at least two cell groups are connected in parallel between the second output end of the toggle switch circuit and the grounding end;

when the control processor detects that the external interface is connected to the charger, configure, in sequence: the buck switch circuit to adjust the voltage outputted by the output end of the buck switch circuit to the voltage of the first cell group; the toggle switch circuit to disconnect other cell groups of the at least two cell groups except the first cell group from the load; and subsequently the toggle switch circuit to switch the connection status of the at least two cell groups to the serially-connected state, wherein the at least two cell groups is connected in series between the first output end of the toggle switch circuit and the grounding end and so that power is continuously supplied to the load throughout a time period from when the control processor detects that the external interface is connected to the charger to when the at least two cell groups are connected in series between the first output end of the toggle switch circuit and the grounding end;

when the control processor detects that the charger is disconnected from the external interface, configure, in sequence: the buck switch circuit to adjust the voltage outputted from the output end of the buck switch circuit to the voltage of the first cell group among the at least two cell groups; the toggle switch circuit such that the first cell group outputs the voltage to the second output end of the toggle switch circuit; and the toggle switch circuit is to switch the connection status of the at least two cell groups to be parallelly-connected, so that the at least two cell groups are connected in parallel between the second output end of the toggle switch circuit and the grounding end and so that power is continuously supplied to the load throughout a time period from when the control processor detects that the charger is disconnected from the external interface to when the at least two cells groups are connected in parallel between the second output end of the toggle switch circuit and the grounding end.

2. The power supply system according to claim 1, wherein the toggle switch circuit comprises a plurality of switches, and a control end of any one of the switches is coupled to a control end of the toggle switch circuit;

the toggle switch circuit is specifically configured to control a status of one or more of the switches such that the first cell group outputs the voltage to the second output end of the toggle switch circuit; and the toggle switch circuit is specifically configured to control the status of one or more of the switches to switch the connection status of the at least two cell groups to be parallelly-connected.

3. The power supply system according to claim 1, wherein the power supply system comprises two cell groups; the toggle switch circuit comprises a first switch, a second switch, a third switch, a fourth switch, and a fifth switch;

a first end of the first switch is coupled to the second output end of the toggle switch circuit, a second end of the first switch is coupled to a third input end of the toggle switch circuit, and a control end of the first switch is coupled to a control end of the toggle switch circuit;

a first end of the second switch is coupled to a fourth input end of the toggle switch circuit, a second end of the second switch is coupled to a second input end of the toggle switch circuit, and a control end of the second switch is coupled to a control end of the toggle switch circuit;

a first end of the third switch is coupled to the second input end of the toggle switch circuit, a second end of the third switch is coupled to a third input end of the toggle switch circuit, and a control end of the third switch is coupled to a control end of the toggle switch circuit;

a first end of the fourth switch is coupled to the first output end of the toggle switch circuit, a second end of the fourth switch is coupled to a first input end of the toggle switch circuit, and a control end of the fourth switch is coupled to a control end of the toggle switch circuit;

a first end of the fifth switch is coupled to the second output end of the toggle switch circuit, a second end of the fifth switch is coupled to the first input end of the toggle switch circuit, and a control end of the fifth switch is coupled to a control end of the toggle switch circuit;

wherein a positive pole of the first cell group is coupled to the third input end of the toggle switch circuit, a negative pole of the first cell group is coupled to the fourth input end of the toggle switch circuit, a positive pole of a second cell group is coupled to the first input end of the toggle switch circuit, a negative pole of the second cell group is coupled to the second input end of the toggle switch circuit, and the fourth input end of the toggle switch circuit is coupled to the grounding end;

wherein the power supply system is configured to, when the external interface is connected to the charger to charge the at least two cell groups:

turn on the third switch and the fourth switch, turn off the first switch, the second switch, and the fifth switch, and switch the connection status of the at least two cell groups to be serially-connected; or turn off the third switch and the fourth switch, turn on the first switch, the second switch, and the fifth switch, and switch the connection status of the at least two cell groups to be parallelly-connected.

4. The power supply system according to claim 1, wherein the power supply system further comprises a plurality of equalization circuits, wherein two ends of one of the equalization circuits are respectively coupled to two poles of one of the cell groups; and when it is determined that a voltage difference between the first cell group and a second cell group satisfies a predetermined condition, the equalization circuit corresponding to the first cell group is configured to shunt the first cell group.

5. The power supply system according to claim 4, wherein the equalization circuit comprises a sixth switch and a first resistor;

a series structure of the sixth switch and the first resistor is connected in parallel with one of the cell groups; and when it is determined that the voltage difference between the first cell group and the second cell group satisfies a first predetermined condition, the sixth switch in the equalization circuit corresponding to the first cell group is turned on.

6. The power supply system according to claim 1, further comprising: an equalization circuit, wherein the equalization circuit comprises an equalization switch circuit and a capacitor, a first input end of the equalization switch circuit is coupled to the positive pole of the first cell group, a second input end of the equalization switch circuit is coupled to the negative pole of the first cell group, a third input end of the equalization switch circuit is coupled to the positive pole of second cell group, and a fourth input end of the equalization switch circuit is coupled to the negative pole of the second cell group; the capacitor is coupled between the first output end and the second output end of the equalization switch circuit; the first cell group and the second cell group are adjacent cell groups when the at least two cell groups are connected in series;

when it is determined that a voltage difference between the first cell group and the second cell group satisfies a first predetermined condition, the equalization switch circuit is configured to connect the capacitor in parallel with the first cell group; and when it is determined that a voltage of the capacitor is equal to the voltage of the first cell group, the equalization switch circuit is configured to connect the capacitor in parallel with the second cell group.

7. The power supply system according to claim 6, wherein the equalization switch circuit comprises a sixth switch, a seventh switch, an eighth switch, and a ninth switch;

a first end of the sixth switch is coupled to the first input end of the equalization switch circuit, a second end of the sixth switch is coupled to the first output end of the equalization switch circuit, and a control end of the sixth switch is coupled to a control end of the equalization switch circuit;

a first end of the seventh switch is coupled to the second input end of the equalization switch circuit, a second end of the seventh switch is coupled to the first output end of the equalization switch circuit, and a control end of the seventh switch is coupled to a control end of the equalization switch circuit;

a first end of the eighth switch is coupled to the third input end of the equalization switch circuit, a second end of the eighth switch is coupled to the second output end of the equalization switch circuit, and a control end of the eighth switch is coupled to a control end of the equalization switch circuit;

a first end of the ninth switch is coupled to the fourth input end of the equalization switch circuit, a second end of the ninth switch is coupled to the second output end of the equalization switch circuit, and a control end of the ninth switch is coupled to a control end of the equalization switch circuit;

wherein the power supply system is configured to, when it is determined that the voltage difference between the first cell group and the second cell group satisfies a first predetermined condition, turn on the sixth switch and the eighth switch, and turn off the seventh switch and the ninth switch; and when it is determined that the voltage of the capacitor is equal to the voltage of the first cell group, turn off the sixth switch and the eighth switch, and turn on the seventh switch and the ninth switch.

8. The power supply system according to claim 1, further comprising:
a first battery connector and a second battery connector;
wherein the input end of the buck switch circuit and the output end of the buck switch circuit are respectively coupled to terminals of the first battery connector;
the first output end of the toggle switch circuit and the second output end of the toggle switch circuit are respectively coupled to the terminals of the first battery connector; and
wherein the power supply system is configured to, when the first battery connector and the second battery connector are plugged together, couple the first battery connector to terminals in the second battery connector.

9. The power supply system according to claim 1, further comprising a protection circuit, wherein a control end of the toggle switch circuit is coupled to an output end of the protection circuit; and
the protection circuit is configured to sample a working parameter of the cell group, and when a working status of any one of the cell groups is determined to be abnormal based on the working parameter, the protection circuit controls the toggle switch circuit to disconnect any one of the cell groups.

10. An electronic device, wherein the electronic device comprises at least two cell groups, an external interface, and a load, each of the cell groups comprises at least one cell, and the at least one cell is coupled between two poles of the cell group; and the electronic device further comprises the power supply system according to claim 1.

11. A power supply system, applicable to an electronic device, wherein the electronic device comprises at least two cell groups, an external interface, and a load, each of the cell groups comprises at least one cell, and the at least one cell is coupled between two poles of the cell group;
the power supply system comprises a control processor, a toggle switch circuit, and a buck switch circuit; the toggle switch circuit comprises a first output end, a second output end, and a plurality of input ends; the two poles of the cell group are each coupled to an input end of the toggle switch circuit; the first output end of the toggle switch circuit is coupled to an input end of the buck switch circuit, the second output end of the toggle switch circuit is coupled to an output end of the buck switch circuit, and the input end of the buck switch circuit is coupled to the external interface; the output end of the buck switch circuit is further coupled to a load, and the external interface is configured to connect a charger;
wherein the toggle switch circuit is configured to switch a connection status of the at least two cell groups to be serially-connected or parallelly-connected;
wherein the control processor is configured to:
when supplying power to the load through the at least two cell groups, configure the toggle switch circuit to switch the connection status of the at least two cell groups to be parallelly-connected, so that the at least two cell groups are connected in parallel between the second output end of the toggle switch circuit and a grounding end;
when the control processor detects that the external interface is connected to the charger, configure, in sequence:

the buck switch circuit to adjust a voltage outputted by the output end of the buck switch circuit to a voltage of a first cell group;
the toggle switch circuit to disconnect other cell groups of the at least two cells except the first cell group from the load; and
the toggle switch circuit to switch the connection status of the at least two cell groups to the serially-connected state, wherein the at least two cell groups is connected in series between the first output end of the toggle switch circuit and the grounding end, so that power is continuously supplied to the load throughout a time period from when the control processor detects that the external interface is connected to the charger to when the at least two cell groups are connected in series between the first output end of the toggle switch circuit and the grounding end.

12. The power supply system according to claim 11, wherein the toggle switch circuit comprises a plurality of switches, and a control end of any one of the switches is coupled to a control end of the toggle switch circuit;
the toggle switch circuit is specifically configured to control a status of one or more of the switches to disconnect other cell groups of the at least two cells except the first cell group from the load; and
the toggle switch circuit is specifically configured to control the status of one or more of the switches to switch the connection status of the at least two cell groups to be serially-connected.

13. The power supply system according to claim 11, wherein the power supply system comprises two cell groups; the toggle switch circuit comprises a first switch, a second switch, a third switch, a fourth switch, and a fifth switch;
a first end of the first switch is coupled to the second output end of the toggle switch circuit, a second end of the first switch is coupled to a third input end of the toggle switch circuit, and a control end of the first switch is coupled to a control end of the toggle switch circuit;
a first end of the second switch is coupled to a fourth input end of the toggle switch circuit, a second end of the second switch is coupled to a second input end of the toggle switch circuit, and a control end of the second switch is coupled to a control end of the toggle switch circuit;
a first end of the third switch is coupled to the second input end of the toggle switch circuit, a second end of the third switch is coupled to a third input end of the toggle switch circuit, and a control end of the third switch is coupled to a control end of the toggle switch circuit;
a first end of the fourth switch is coupled to the first output end of the toggle switch circuit, a second end of the fourth switch is coupled to a first input end of the toggle switch circuit, and a control end of the fourth switch is coupled to a control end of the toggle switch circuit;
a first end of the fifth switch is coupled to the second output end of the toggle switch circuit, a second end of the fifth switch is coupled to the first input end of the toggle switch circuit, and a control end of the fifth switch is coupled to a control end of the toggle switch circuit;
wherein a positive pole of the first cell group is coupled to the third input end of the toggle switch circuit, a negative pole of the first cell group is coupled to the fourth input end of the toggle switch circuit, a positive pole of a second cell group is coupled to the first input end of the toggle switch circuit, a negative pole of the second cell group is coupled to the second input end of the toggle switch circuit, and the fourth input end of the toggle switch circuit is coupled to the grounding end;

wherein the power supply system is configured to, when the at least two cell groups supply power to the load, turn off the third switch and the fourth switch, and control the first switch, the second switch, and the fifth switch to be turned on;

turn on the first switch, turn off the second switch, the third switch, the fourth switch, and the fifth switch, and disconnect other cell groups in the at least two cell groups except the first cell group from the load; and turn on the third switch and the fourth switch, turn off the first switch, the second switch, and the fifth switch, and switch the connection status of the at least two cell groups to be serially-connected.

\* \* \* \* \*